(12) United States Patent
Chang et al.

(10) Patent No.: US 11,181,994 B2
(45) Date of Patent: Nov. 23, 2021

(54) TRANSMITTER AND CONTROLLING METHOD THEREOF

(71) Applicant: EGALAX_EMPIA TECHNOLOGY INC., Taipei (TW)

(72) Inventors: Chin-Fu Chang, Taipei (TW); Shang-Tai Yeh, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 686 days.

(21) Appl. No.: 15/154,313

(22) Filed: May 13, 2016

(65) Prior Publication Data
US 2016/0252981 A1    Sep. 1, 2016

Related U.S. Application Data

(63) Continuation-in-part of application No. 14/537,082, filed on Nov. 10, 2014, now Pat. No. 9,851,816.

(60) Provisional application No. 62/055,995, filed on Sep. 26, 2014, provisional application No. 61/992,340, filed on May 13, 2014, provisional application No. 61/945,397, filed on Feb. 27, 2014, provisional application No. 61/902,137, filed on Nov. 8, 2013.

(30) Foreign Application Priority Data

May 13, 2015   (TW) ................................ 104115209

(51) Int. Cl.
*G06F 3/041*   (2006.01)
*G06F 3/038*   (2013.01)
*H04B 1/02*    (2006.01)
*G06F 3/0354*  (2013.01)
*G06F 3/044*   (2006.01)

(52) U.S. Cl.
CPC ........ *G06F 3/0383* (2013.01); *G06F 3/03545* (2013.01); *G06F 3/0442* (2019.05); *G06F 3/0446* (2019.05); *G06F 3/04162* (2019.05); *G06F 3/04166* (2019.05); *H04B 1/02* (2013.01); *G06F 2203/04103* (2013.01); *G06F 2203/04108* (2013.01)

(58) Field of Classification Search
CPC ... G06F 3/0383; G06F 3/03545; G06F 3/0416
See application file for complete search history.

(56) References Cited

U.S. PATENT DOCUMENTS 6,744,426 B1 *  6/2004  Okamoto ............ G06F 3/03545
                                                  178/18.07
7,148,882 B2    12/2006  Kamrath et al.
7,292,229 B2 * 11/2007  Morag ................ G06F 3/03545
                                                  178/18.07
(Continued)

FOREIGN PATENT DOCUMENTS

CN    202563463    11/2012
CN    103620529    3/2014
(Continued)

*Primary Examiner* — Towfiq Elahi
(74) *Attorney, Agent, or Firm* — WPAT, PC

(57) ABSTRACT

The present application provides a transmitter including a first sensor and a processing module electrically coupled to the first sensor. The processing module is configured to transmit a first electric signal during a first time period. The first electric signal represents at least one part of a digital sensing value of the first sensor.

26 Claims, 46 Drawing Sheets

(56) References Cited

U.S. PATENT DOCUMENTS

| | | |
|---|---|---|
| 2012/0242603 A1 | 9/2012 | Engelhardt et al. |
| 2012/0331546 A1* | 12/2012 | Falkenburg ......... G06F 3/03545 |
| | | 726/16 |
| 2015/0199035 A1 | 7/2015 | Chang et al. |
| 2016/0357343 A1 | 12/2016 | Falkenburg et al. |

FOREIGN PATENT DOCUMENTS

| | | |
|---|---|---|
| JP | 05-233127 | 9/1993 |
| TW | M255462 | 1/2005 |
| TW | 200508580 | 3/2005 |
| TW | M387304 | 8/2010 |
| TW | 201040797 | 11/2010 |
| TW | 201106239 | 2/2011 |
| TW | 201209654 | 3/2012 |
| TW | 201234226 | 8/2012 |
| TW | 201235884 | 9/2012 |
| TW | 201237692 | 9/2012 |
| TW | M439852 | 10/2012 |
| TW | 201305859 | 2/2013 |
| TW | 201308129 | 2/2013 |
| TW | 201339904 | 10/2013 |
| TW | 201342175 | 10/2013 |

\* cited by examiner

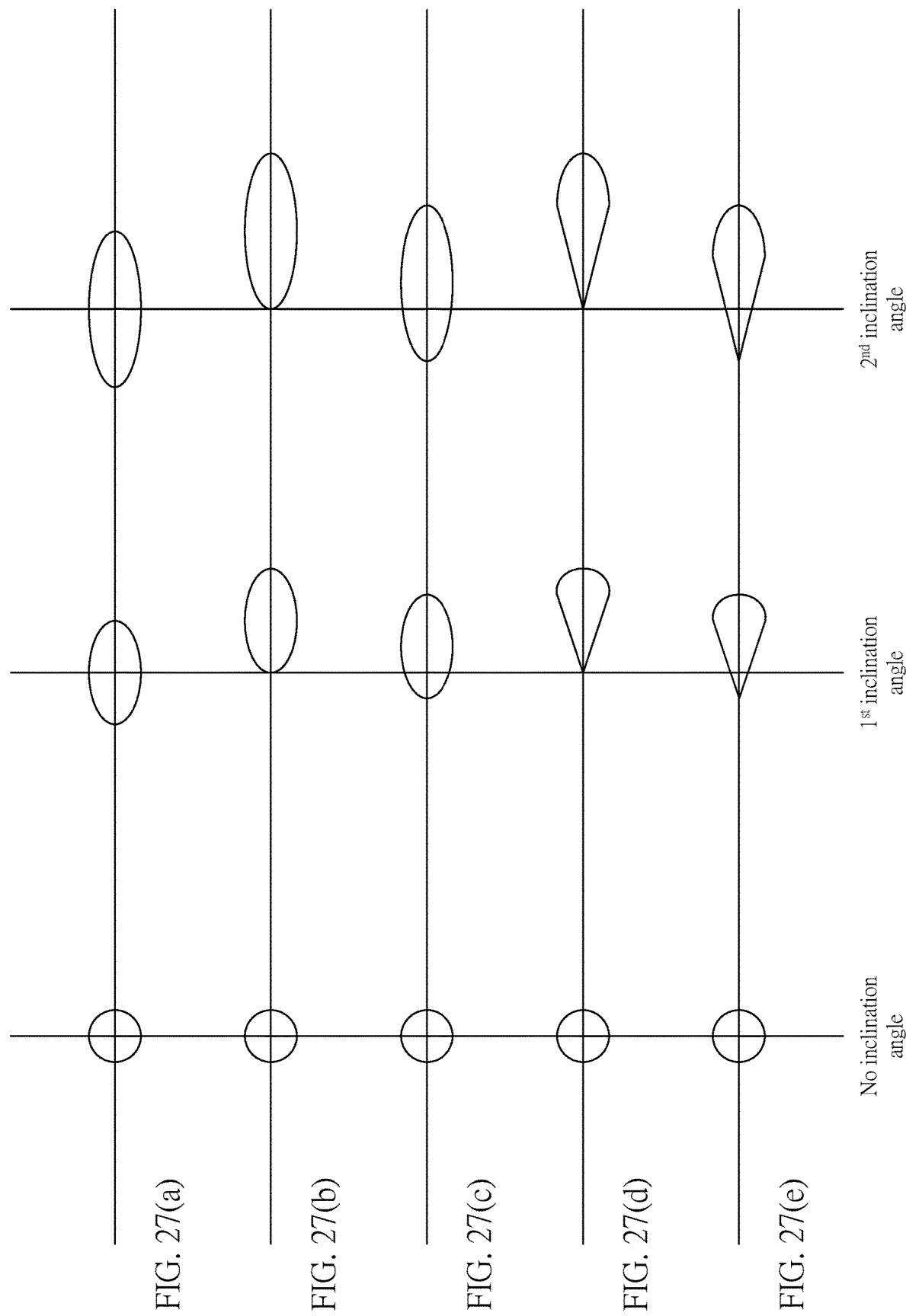

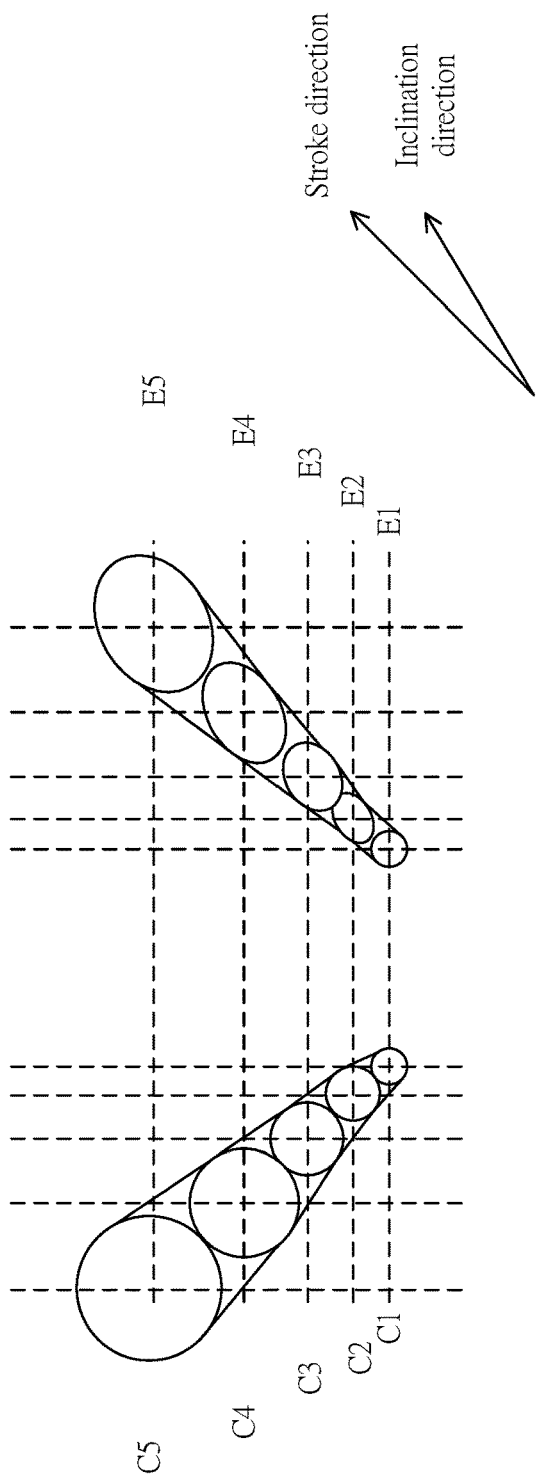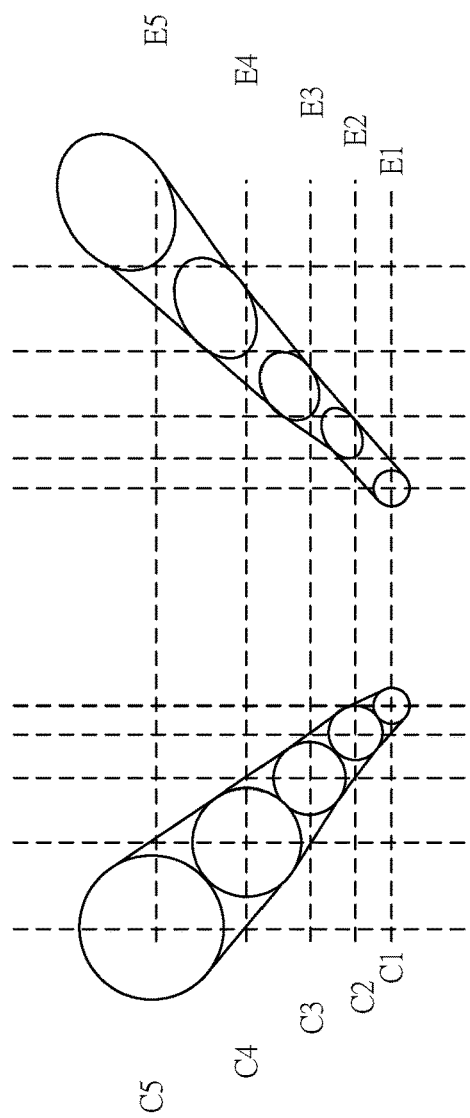
FIG. 28(a)
FIG. 28(b)

TRANSMITTER AND CONTROLLING METHOD THEREOF

CROSS REFERENCE TO RELATED APPLICATIONS

This application claims benefits of Taiwan patent application, No. 104115209, filed on May 13, 2015 and this application is also a continuation-in-part application of Ser. No. 14/537,082, filed on Nov. 10, 2014, which claims priorities under 35 U.S.C. 119 to U.S. provisional patent application, 61/902,137, filed on Nov. 8, 2013, U.S. provisional patent application, 61/945,397, filed on Feb. 27, 2014, U.S. provisional patent application, 61/992,340, filed on May 13, 2014, and U.S. provisional patent application, 62/055,995, filed on Sep. 26, 2014, the disclosures of which are incorporated herein by reference.

BACKGROUND OF THE INVENTION

1. Field of the Invention

The present invention relates to a transmitter, and more particularly, to the transmitter which is able to actively transmit an electric signal precisely representing a pressure on the transmitter.

2. Description of the Prior Art

Touch panel or touch sensitive screen is an important human machine interface in modern age. In addition to detecting approximation or touch of human body, touch panel is also used for detecting approximation or touch of stylus or tip of stylus such that user is able to precisely control a trace painted by a touching tip.

Stylus may actively emit electric signal via its tip. In the present application, it is called an active stylus. When the tip approximating to or touching on a touch panel, electromagnetic response of the electric signal occurs to electrodes of the touch panel. By detecting the electromagnetic response corresponding to the electric signal, the stylus approximating to or touching on the sensing electrodes could be detected. Therefore, a position of the tip relative to the touch panel could be concluded accordingly.

Traditional active stylus includes wired and wireless types. Wired active stylus is electrically supplied via a connection cable to the touch panel. Besides, signals such as one representing tip pressure could be transmitted to the touch panel via the connection cable. The most noticeable shortcoming of wired active stylus is inconvenience of the connection cable. However, wireless active stylus has to solve synchronization problem between the active stylus and the controller detecting the active stylus. Wired active stylus does not have such problem.

Moreover, a difference between active and passive stylus is that active stylus may sense pressure on itself. Since pressure sensor of active stylus could sense pressure level the tip is pressed, the controller detecting the active stylus or the host may gather the information. However, how to transmit the pressure level to the controller is another problem required to be solved in this field. For example, in case the information is transmitted wirelessly, cost and power consumption would be increased accordingly. Besides, the controller and the host needs to have wireless communication capability. Thus, the system gets complicated accordingly. In another instance, the pressure level of the tip could be modulated and represented by amplitude of analogue signal. It may be easily misjudged or erroneous demodulated by environmental changes of temperature or moisture, various distance between the tip and the touch panel, and noise interference.

Hence, it is required to have active stylus transmitting electric signal which precisely reflects the pressure level.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

One aspect of the present invention is to provide a transmitter including a first sensor and a processing module electrically coupled to the first sensor. The processing module is configured to transmit a first electric signal during a first time period. The first electric signal represents at least one part of a digital sensing value of the first sensor.

One aspect of the present invention is to provide a method for controlling a transmitter, which includes a first sensor. The method includes transmitting a first electric signal during a first time period, and wherein the first electric signal represents at least one part of a digital sensing value of the first sensor.

One aspect of the present invention is to provide a touch sensitive processing apparatus, which electrically couples to multiple first electrodes and multiple second electrodes of a touch panel to detect the status of a first sensor of a transmitter, which approximates to or touches on the touch panel. The apparatus includes a signal-detecting module configured to detect a first electric signal received by one of the first and/or the second electrodes during a first time period, and a processing module configured to receive the first electric signal from the signal-detecting module and to determine a first digital value based on the first electric signal so as to represent at least one part of a digital sensing value of the first sensor of the transmitter.

One aspect of the present invention is to provide a method for detecting the status of a transmitter. The method includes detecting a first electric signal received by one of multiple first electrodes and/or multiple second electrodes of a touch panel during a first time period, and determining a first digital value based on the first electric signal so as to represent at least one part of a digital sensing value of a first sensor of the transmitter.

One aspect of the present invention is to provide a touch sensitive system including a transmitter, a touch panel, and a touch sensitive processing apparatus, which electrically coupled to multiple first electrodes and multiple second electrodes of the touch panel. The transmitter includes a first sensor and a transmitter processing module electrically coupled to the first sensor. The transmitter processing module is configured to transmit a first digital electric signal during a first time period. The first digital electric signal represents at least one part of a digital sensing value of the first sensor. The touch sensitive processing apparatus includes a signal-detecting module configured to detect the first electric signal received by one of the multiple first and/or second electrodes during the first time period, and a touch processing module configured to receive the first electric signal from the signal-detecting module and to determine a first digital value based on the first electric signal so as to represent at least one part of a digital sensing value of the first sensor.

One object of the present invention is to provide an active stylus which is able to transmit an electric signal precisely representing a pressure on the active stylus.

The above description is only an outline of the technical schemes of the present invention. Preferred embodiments of the present invention are provided below in conjunction with the attached drawings to enable one with ordinary skill in the art to better understand said and other objectives, features and advantages of the present invention and to make the present invention accordingly.

BRIEF DESCRIPTION OF THE DRAWINGS

The present invention can be more fully understood by reading the following detailed description of the preferred embodiments, with reference made to the accompanying drawings, wherein:

FIGS. 27(a)-(e) illustrate embodiments of how display interface reflecting strobe according to the inclination angle and/or pressure of the tip section;

FIGS. 28(a)-(b) illustrates other embodiments of how display interface reflecting strobe according to the inclination angle and/or pressure of the tip section;

DETAILED DESCRIPTION OF THE PREFERRED EMBODIMENTS

Figure 1:
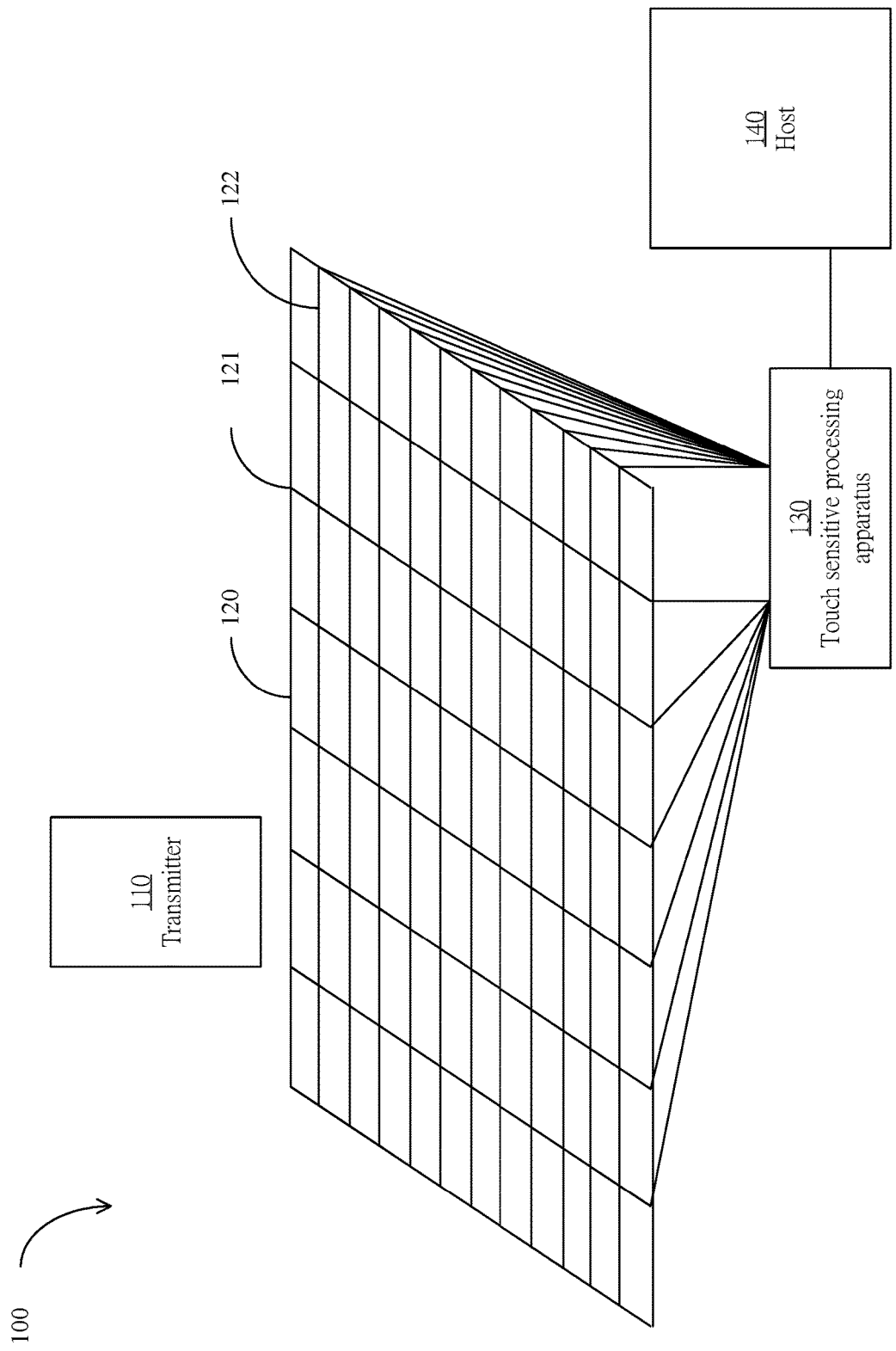
FIG. 1 illustrates a diagram of a touch sensitive system 100 in accordance with an embodiment of the present invention.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Please refer to FIG. 1, which illustrates a diagram of a touch sensitive system 100 in accordance with an embodiment of the present invention. The touch sensitive system 100 includes at least one transmitter 110, a touch panel 120, a touch sensitive processing apparatus 130, and a host 140. The transmitter 110, e.g. in one embodiment of the present invention, may be an active stylus which emits electric signal. However, the implementations of the transmitter 110 are not restricted to that. The touch sensitive system 100 may include multiple transmitters 110. The touch panel 120 is formed on a substrate. The touch panel 120 may be a touch sensitive screen. The present application does not limit implementations of the touch panel 120.

In one embodiment, the touch sensitive area of the touch panel 120 includes multiple first electrodes 121 and multiple second electrodes 122. Multiple capacitive coupling sensing points are located where the intersections of these two kinds of electrodes. The first and the second electrodes 121 and 122 are connected to the touch sensitive processing apparatus 130, respectively. In a mutual capacitance detecting mode, the first electrodes 121 may be called as first conductive strips or driving electrodes, the second electrodes 122 may be called as second conductive strips or sensing electrodes. The touch sensitive processing apparatus 130 provides driving voltage (voltage of driving signal) to those first electrodes 121 and measures signal variation occurred to the second electrodes 122 to detect external conductive object approximating to or touching on the touch panel 120. Ordinary people skilled in the art could understand that the touch sensitive processing apparatus 130 could use self-capacitance mode or mutual-capacitance mode to detect approximating or touching event and object. No description is elaborated further. In addition to self-capacitance mode or mutual-capacitance mode, the touch sensitive processing apparatus 130 could further detect the electric signal emitted from the transmitter 110 to calculate a position of the transmitter 110 in relative to the touch panel 120. In one embodiment, signal variations occurred to the first electrodes 121 and the second electrodes 122 are measured, respectively, to detect the electric signal and the position of the transmitter 110 in relative to the touch panel 120. Since frequency of the electric signal emitted from the transmitter 110 is not identical or harmonic to frequency of driving signals in self-capacitance mode or mutual-capacitance mode, the touch sensitive processing apparatus 130 could distinguish the electric signals from the transmitter 110 and the driving signals during self-capacitance mode or mutual-capacitance mode. In another embodiment, the touch panel 120 may be surface capacitance touch sensitive panel which has four electrodes attaching to four corners or four sides. The touch sensitive processing apparatus 130 detects the position of the transmitter 110 in relative to the touch panel 120 by measuring signal variations of these four electrodes.

A host 140 is also shown in FIG. 1. It could be a central processing unit, a master processor in an embedded system, or any other form of computer. In one embodiment, the touch sensitive system 110 could be a tablet computer. The host 140 could be a CPU which runs an operating system of the tablet computer. For example, the tablet computer relies on Android operating system and the host 140 is an ARM processor which runs Android operating system. The present application does not limit the format of information transmitted between the host 140 and the touch sensitive processing apparatus 130. It only requires that the information is related to approximating or touching event occurred to the touch panel 120.

Since electric signals are emitted, the transmitter 110 or active stylus needs electric power to supply the energy of electric signals. In one embodiment, power source of the transmitter 110 may be battery or a rechargeable battery. Alternatively, power source of the transmitter 110 may be capacitor, especially an ultra-capacitor or a super-capacitor, such as one of EDLC (Electrical Double Layered Capacitor), pseudo-capacitor, and hybrid capacitor. The charging time of ultra-capacitor is counted in seconds and the discharging time is counted in hours. In other words, active stylus endures long requiring short charging time.

In one embodiment, the touch panel 120 periodically emits a beacon signal. When the tip of the transmitter 110 or active stylus approximates to the touch panel 120, the transmitter 110 could detect the beacon signal via the tip. In response to the detection, the transmitter 110 begins to emit the electric signal for a while to the touch panel 120. Consequently, the transmitter 110 may stop emitting the electric signal if no beacon signal is detected. Thus the operating time of the transmitter 110 could be extended accordingly.

The beacon signal could be emitted via the first electrodes 121 and/or the second electrodes 122. In one embodiment, in case driving signals are transmitted from the first electrodes for mutual capacitance detection, frequency of the driving signals is not identical or harmonic to frequency of the beacon signal. Therefore, it is possible to transmit the driving signals and the beacon signals simultaneously. In other words, mutual-capacitance detection and the electric signal detection could be performed simultaneously. Alternatively, it takes turn to transmit the driving signals and the beacon signals. Thus mutual-capacitance detection and the electric signal detection are done in time-sharing fashion. In such case, frequency of the driving signals may or may not be identical to frequency of the beacon signals.

In one embodiment, in order to make the transmitter 110 detecting the beacon signals further away above the touch panel 120, the touch sensitive processing apparatus 130 commands all of the first and the second electrodes 121 and 122 of the touch panel 120 emitting the driving signals simultaneously, such that the total signal strength emitted from the touch panel 120 could be maximized.

Figure 2:
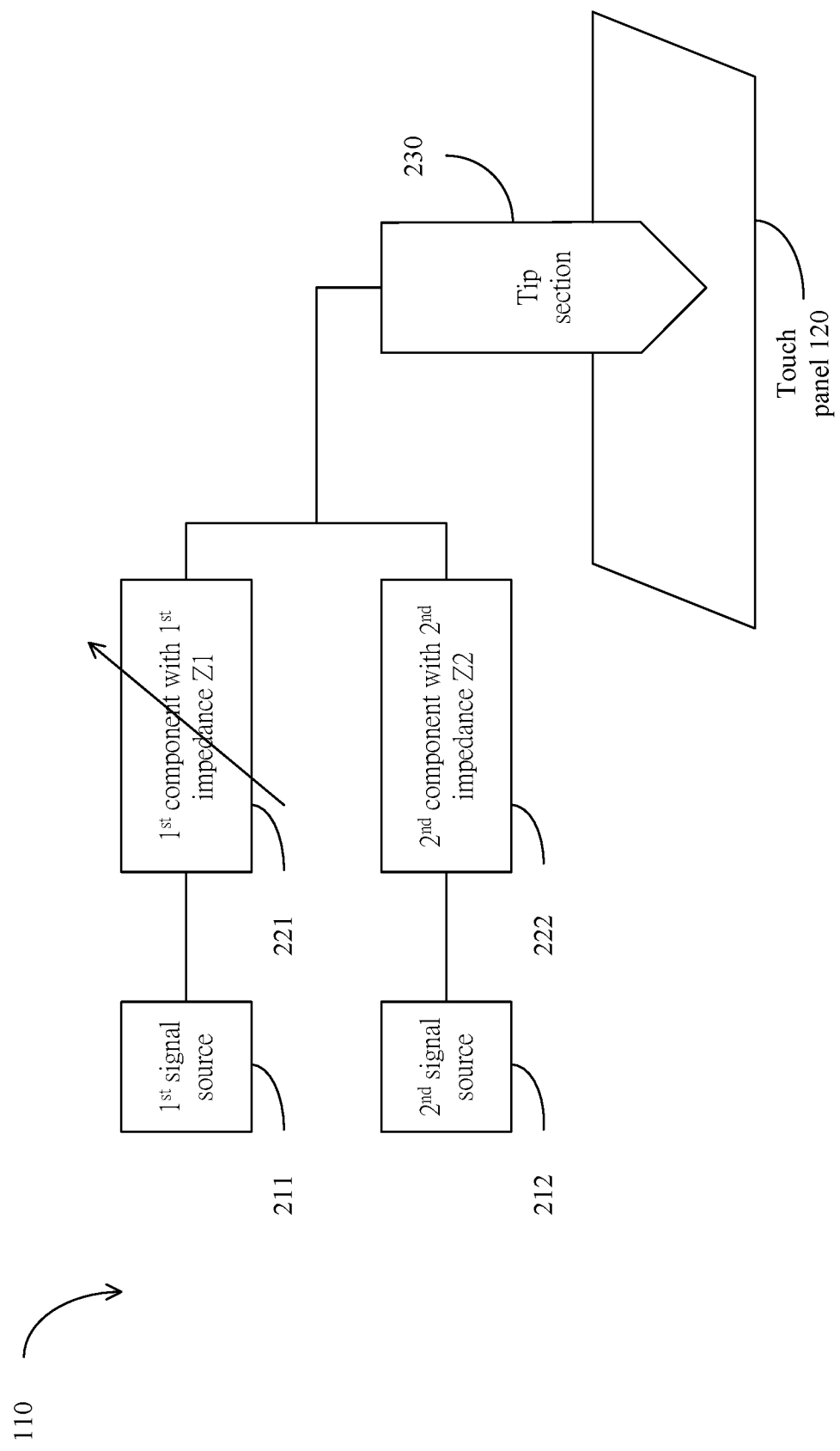
FIG. 2 illustrates a diagram of a transmitter 110 in accordance with an embodiment of the present invention.

Please refer to FIG. 2, which depicts a diagram of a transmitter 110 in accordance with an embodiment of the present invention. The transmitter 110 includes a first signal source 211, a second signal source 212, a first component 221 with a first impedance Z1, a second component 222 with a second impedance Z2, and a tip section 230. A first signal emitted from the first signal source 211 transmits to the touch panel 120 via the first component 221 and the tip section 230. Similarly, a second signal emitted from the second signal source 212 transmits to the touch panel 120 via the second component 222 and the tip section 230.

In one embodiment, the first signal includes a signal with a first frequency f1, the second signal includes a signal with a second frequency f2. The first signal with frequency f1 and the second signal with frequency f2 may be square-wave signals, sinuous signals, or PWM (pulse width modulation) signals. In one embodiment, the first frequency f1 is not identical or harmonic to frequency of the beacon signal and frequency of the driving signal. The second frequency f2 does not equal to the first frequency f1. Furthermore, the second frequency f2 is not identical or harmonic to frequency of the beacon signal and frequency of the driving signal.

These signals with two frequencies get mixed and fed into the tip section 230 via the first component 221 with the first impedance Z1 and the second component 222 with the second impedance Z2, respectively. The first and second components 221 and 222 could be any combination of resistor, inductor, and capacitor (e.g. solid state capacitor). In the embodiment as shown in FIG. 2, the second impedance Z2 is fixed or constant; the first impedance Z1 is variable or adjustable corresponding to a sensing variation of a sensor.

In another embodiment, both the first and second impedances Z1 and Z2 are variable or adjustable. A ratio of these two impedances is corresponding to a sensing variation of a sensor. In one embodiment, the sensor may be a contractible and flexible tip. The first impedance Z1 changes corresponding to the stroke or the pressure level of the flexible tip. In some examples, the first impedance Z1 is linearly proportional to the variation of the sensing value of the sensor. In alternative examples, the first impedance Z1 is non-linearly proportional to the variation of the sensing value of the sensor.

The first and second components 221 and 222 may not be the same kind of electric component. For example, the first component 221 is a resistor and the second component 222 is a capacitor, and vice versa. In another example, the first component 221 is a resistor and the second component 222 is an inductor, and vice versa. Alternatively, the first component 221 is an inductor and the second component 222 is a capacitor, and vice versa. At least one of the first impedance Z1 and the second impedance Z2 is variable or adjustable. For example, it may be resistor with variable resistance, capacitor with variable capacitance, or inductor with variable inductance. In case of one of the first impedance Z1 and the second impedance Z2 is fixed or constant; the component may be one of the following: resistor with fixed resistance, capacitor with fixed capacitance, or inductor with fixed inductance.

In one embodiment, the first component 221 may be a FSR, force sensing resistor, with a variable and determinable resistance corresponding to an applied force, and the second component 222 may be a resistor with fixed resistance. In alternative embodiment, the first component may be a resistor with variable resistance. Hence, while other conditions are the same, a ratio of a first strength M1 of signal component with the first frequency f1 and a second strength M2 of signal component with the second frequency f2 in the electric signals emitted from the tip section 230 is proportional to an inverse ratio of the first and the second impedances Z1 and Z2. In other words, M1/M2=k(Z2/Z1).

When the transmitter 110 hovers above the touch panel 120, since the tip section 230 is not pressed or moved, the ratio between strength M1 of signal component with the first frequency f1 and strength M2 of signal component with the second frequency f2 is a constant or a predetermined value in the electric signals detected by the touch panel 120. Or alternatively, a ratio of (M1−M2)/(M1+M2) or another ratio of (M2−M1)/(M1+M2) is also a constant or a predetermined value. In addition, the pressure level may be represented as M1/(M1+M2) or M2/(M1+M2). Except for those four ratios mentioned above, ordinary people skilled in the art could use any other ratio involving strengths M1 and M2. In other words, when the detected ratio is the constant or the predetermined value, it is concluded that the sensor did not sense any variation. In one embodiment, it means that the transmitter 110 does not contact the touch panel 120.

When the transmitter 110 contacts the touch panel 120, the tip section 230 is pressed to move. The first impedance Z1 of the first component 221 changes according to the movement or the pressure of the tip section 230 such that the ratio of M1 and M2 is varied accordingly from the constant or the predetermined value. The touch panel 120 could generate corresponding sensing (pressure) value according to the ratio. The fore-mentioned constant or predetermined value may not be a number but a range with a tolerable error.

It is noticeable that the relation between the ratio and the sensing value may not be linear. Furthermore, the sensing value may not be linearly proportional to the movement or the pressure of the sensor. The sensing value is just a value sensed by the touch panel 120. The present application does not limit the correspondence of the sensing value. For example, the touch panel 120 could generate the sensing value according to the ratio by looking into a look-up table or by calculations.

Figure 3:
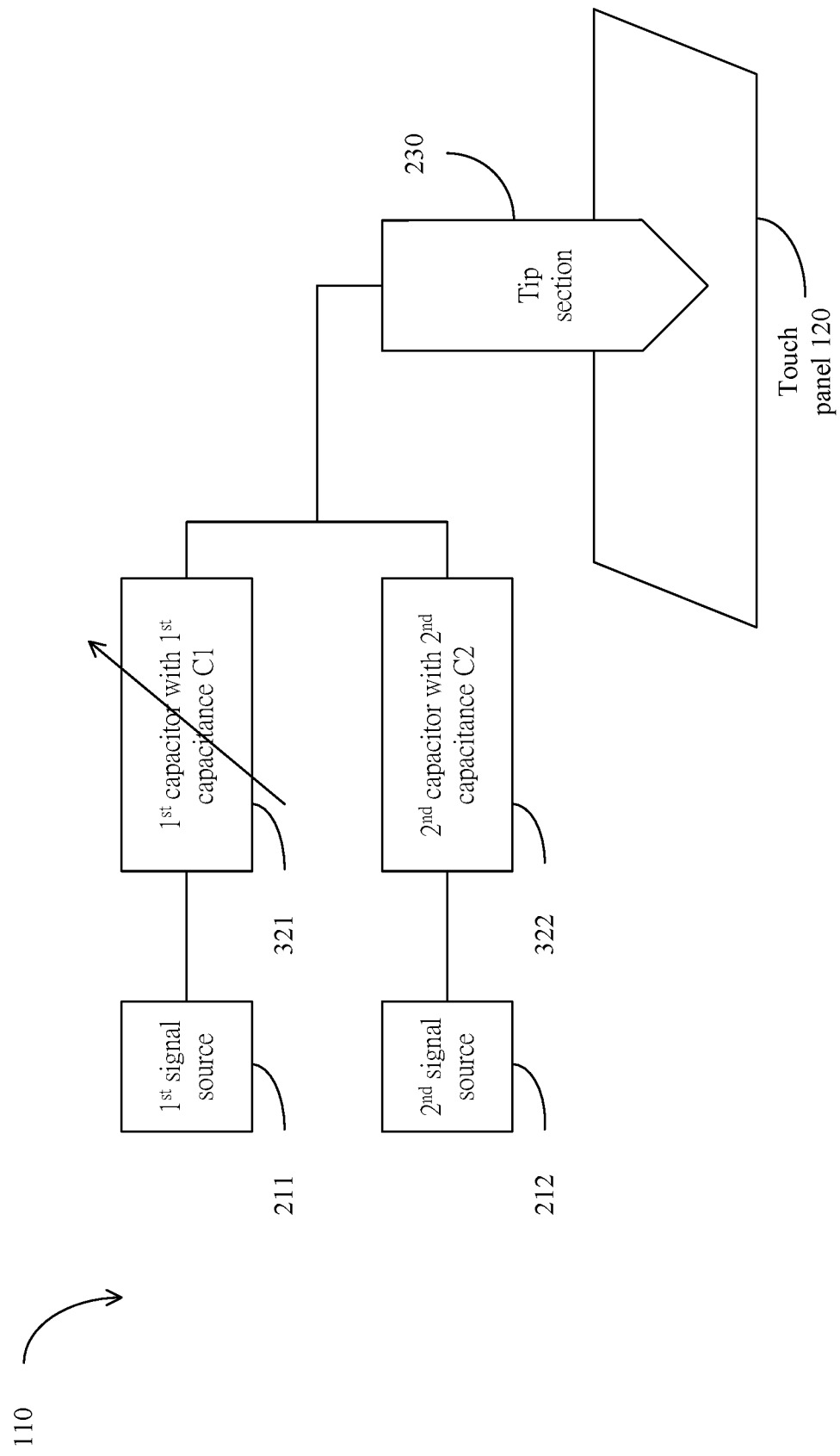
FIG. 3 illustrates a diagram of a transmitter 110 in accordance with an embodiment of the present invention.

Please refer to FIG. 3, which shows a diagram of a transmitter 110 in accordance with an embodiment of the present invention. Similar to the embodiment shown in FIG. 2, the transmitter 110 includes the first signal source 211, the second signal source 212, a first capacitor 321 with a first capacitance C1, a second capacitor 322 with a second capacitance C2, and the tip section 230.

The two signal sources 211 and 212 may be a first PWM signal source PWM1 and a second PWM signal source PWM2, respectively. These two signal sources 211 and 212 may emit signals with the same frequency or not. The transmitter 110 includes the second capacitor 322 with fixed second capacitance C2 and the first capacitor 321 with a variable first capacitance C1, which are connected to the signal sources PWM2 212 and PWM1 211, respectively. Since the first capacitance C1 changes according to the pressure level of the tip section 230, the embodiment shown in FIG. 3 may include a capacitive force sensor or a FSC, force sensing capacitor. In one embodiment, the capacitive force sensor may be implemented by PCB (printed circuit board) or any other material. The structure of the FSC would be described in paragraphs below.

The strength ratio of these two signal sources is inversely proportional to the impedance ratio of these two capacitors 321 and 322. When the tip section 230 of the stylus does not touch to any object, or the force sensor does not sense any force, the resistance of the first capacitor 321 remains the same. The impedance ratio of these two capacitors 321 and 322 keeps unchanged. When the transmitter 110 hovers above the touch panel 120 and the emitted electric signals are detected, the strength ratio of these two signal sources is constant or fixed.

However, if the tip section 230 of the transmitter 110 is touched or the force sensor does sense force, the impedance of the first capacitor 321 changes accordingly such that the impedance ratio of these two capacitors 321 and 322 also changes accordingly. When the transmitter 110 contacts the touch panel 120 and the emitted electric signals are detected, the strength ratio of these two signal sources is varied according to the force sensed by the force sensor.

Figure 4A:
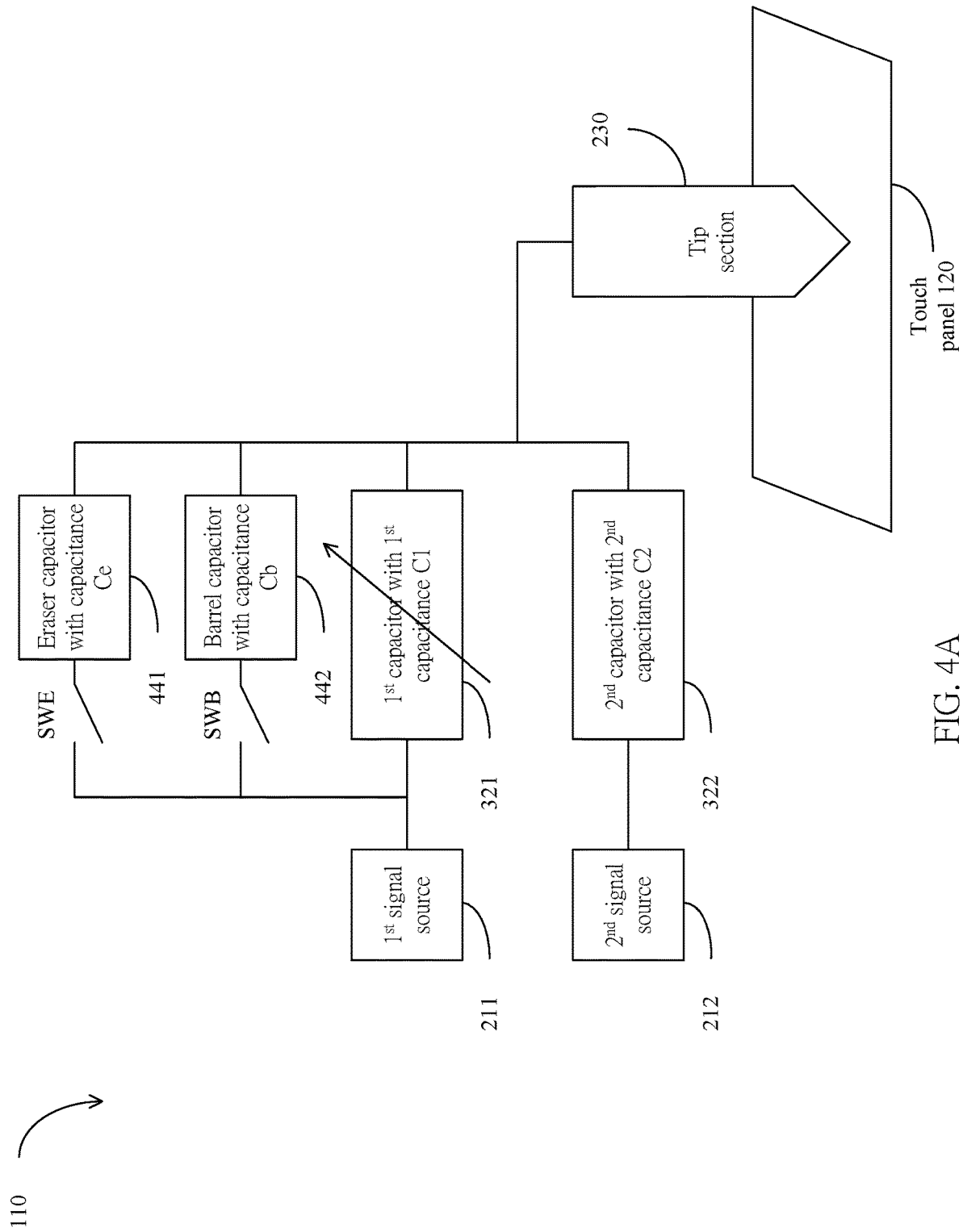
FIG. 4A depicts a diagram of a transmitter 110 in accordance with an embodiment of the present invention.

Please refer to FIG. 4A, which depicts a diagram of a transmitter 110 in accordance with an embodiment of the present invention. Similar to the embodiment as shown in FIG. 3, the transmitter 110 includes the first signal source 211, the second signal source 212, the first capacitor 321 with the first capacitance C1, the second capacitor 322 with the second capacitance C2, and the tip section 230. The transmitter 110 may include multiple sensors to detect multiple states. In one embodiment, the tip section 230 includes a force sensor for detecting the pressure level of the tip and reflecting the pressure level to the emitted electric signal. In another embodiment, the transmitter 110 may include multiple buttons, such as eraser button and barrel button. Alternatively, the transmitter 110 may further include a switch to reflect whether the tip is touched by the touch panel or anything else. Ordinary people skilled in the art could understand that the transmitter 110 may include more buttons and other forms of sensors but not limited to those mentioned.

In the embodiment shown in FIG. 4A, the first capacitor 321 connects to an eraser capacitor 441 and a barrel capacitor 442 in parallel, which are connected in series to the eraser button and the barrel button, or switch SWE and switch SWB, respectively. When the corresponding button is pressed or the corresponding switch is shorted, the capacitor 441 or 442 is connected to the first capacitor 321 in parallel, such that it changes the capacitance of the PWM1 signal path and the impedance ratio between the PWM1 signal path and the PWM2 signal path is changed accordingly. Thus the strength ratio of these two signal sources is varied in consequence.

Since the capacitance C1 and impedance of the first capacitor 321 is variable, in case it is connected in parallel with the eraser capacitor 441 and the barrel capacitor 442, the impedance ratio of the connected circuit and the second capacitor 322 resides in a range. In the embodiment as shown in FIG. 4A, assuming the signal strength ratio of PWM1 and PWM2 falls into a first range in response to the variable range of the first capacitor 321. In case the first capacitor 321 is connected with the barrel capacitor 442 in parallel, i.e., the barrel button is pressed, the signal strength ratio of PWM1 and PWM2 falls into a second range. In case the first capacitor 321 is connected with the eraser capacitor 441 in parallel, i.e., the eraser button is pressed, the signal strength ratio of PWM1 and PWM2 falls into a third range. Further, in case the first capacitor 321 is connected with the barrel capacitor 442 and the eraser capacitor 441 in parallel, i.e., the barrel button and the eraser button are pressed, the signal strength ratio of PWM1 and PWM2 falls into a fourth range. In the implementation, the capacitance and impedance of the barrel capacitor 442 and the eraser capacitor 441 could be adjusted such that the first, second, third, and four ranges are not overlapped. Because the ranges are not overlapped, it is able to determine which button is pressed according to which range the signal strength ratio falls into. In consequence, the pressure level of the force sensor could be concluded according to the signal strength ratio.

Figure 4B:
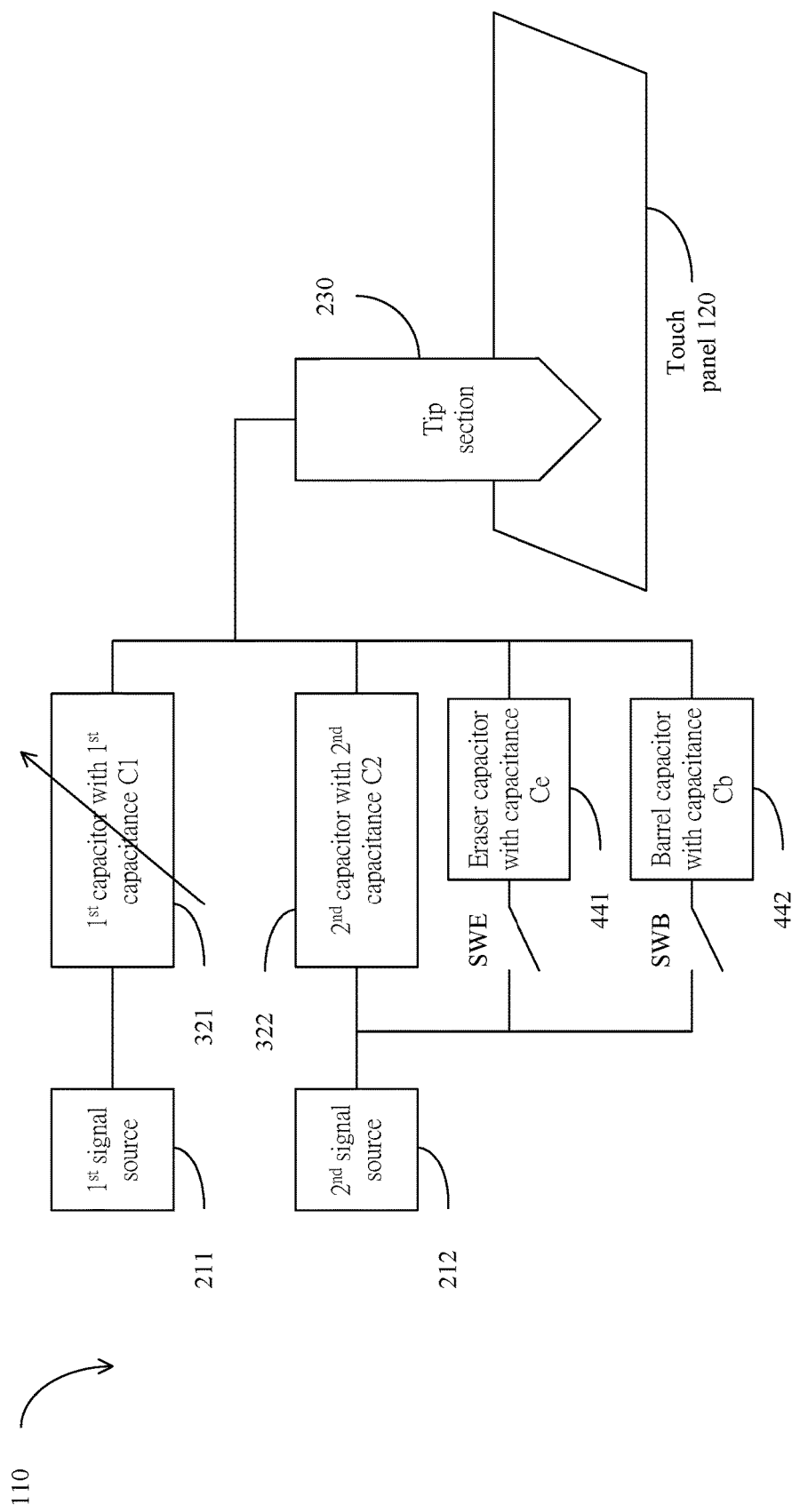
FIG. 4B depicts a diagram of a transmitter 110 in accordance with an embodiment of the present invention.

Please refer to FIG. 4B, which depicts a diagram of a transmitter 110 in accordance with an embodiment of the present invention. Comparing with the embodiment shown in FIG. 4A, the second capacitor 322 in the embodiment of FIG. 4B is configured to connect with the eraser capacitor 441 and the barrel capacitor 442, which are connected in series to the eraser button and the barrel button, or switch SWE and switch SWB, respectively. When the corresponding button is pressed or the corresponding switch is shorted, the capacitor 441 or 442 is connected to the second capacitor 322 in parallel, the impedance ratio between the PWM1 signal path and the PWM2 signal path is changed accordingly. Thus the strength ratio of these two signal sources is varied in consequence.

Since the capacitance C1 and impedance of the first capacitor 321 is variable, in case the second capacitor 322 is connected in parallel with the eraser capacitor 441 and the barrel capacitor 442, the impedance ratio of the connected circuit and the first capacitor 321 resides in a range. In the embodiment shown in FIG. 4B, assuming the signal strength ratio of PWM1 and PWM2 falls into a first range in response to the variable range of the first capacitor 321. In case the second capacitor 322 is connected with the barrel capacitor 442 in parallel, i.e., the barrel button is pressed, the signal strength ratio of PWM1 and PWM2 falls into a fifth range. In case the second capacitor 322 is connected with the eraser capacitor 441 in parallel, i.e., the eraser button is pressed, the signal strength ratio of PWM1 and PWM2 falls into a sixth range. Further, in case the second capacitor 322 is connected with the barrel capacitor 442 and the eraser capacitor 441 in parallel, i.e., the barrel button and the eraser button are pressed, the signal strength ratio of PWM1 and PWM2 falls into a seventh range.

Utilizing the same spirit embodied in FIG. 4A, the capacitance and impedance of the barrel capacitor 442 and the eraser capacitor 441 in FIG. 4B could be adjusted such that the first, fifth, sixth, and/or seventh ranges are not overlapped. Because the ranges are not overlapped, it is able to determine which button is pressed according to which range the signal strength falls into. In consequence, the pressure level of the force sensor could be concluded according to the signal strength ratio.

Figure 5:
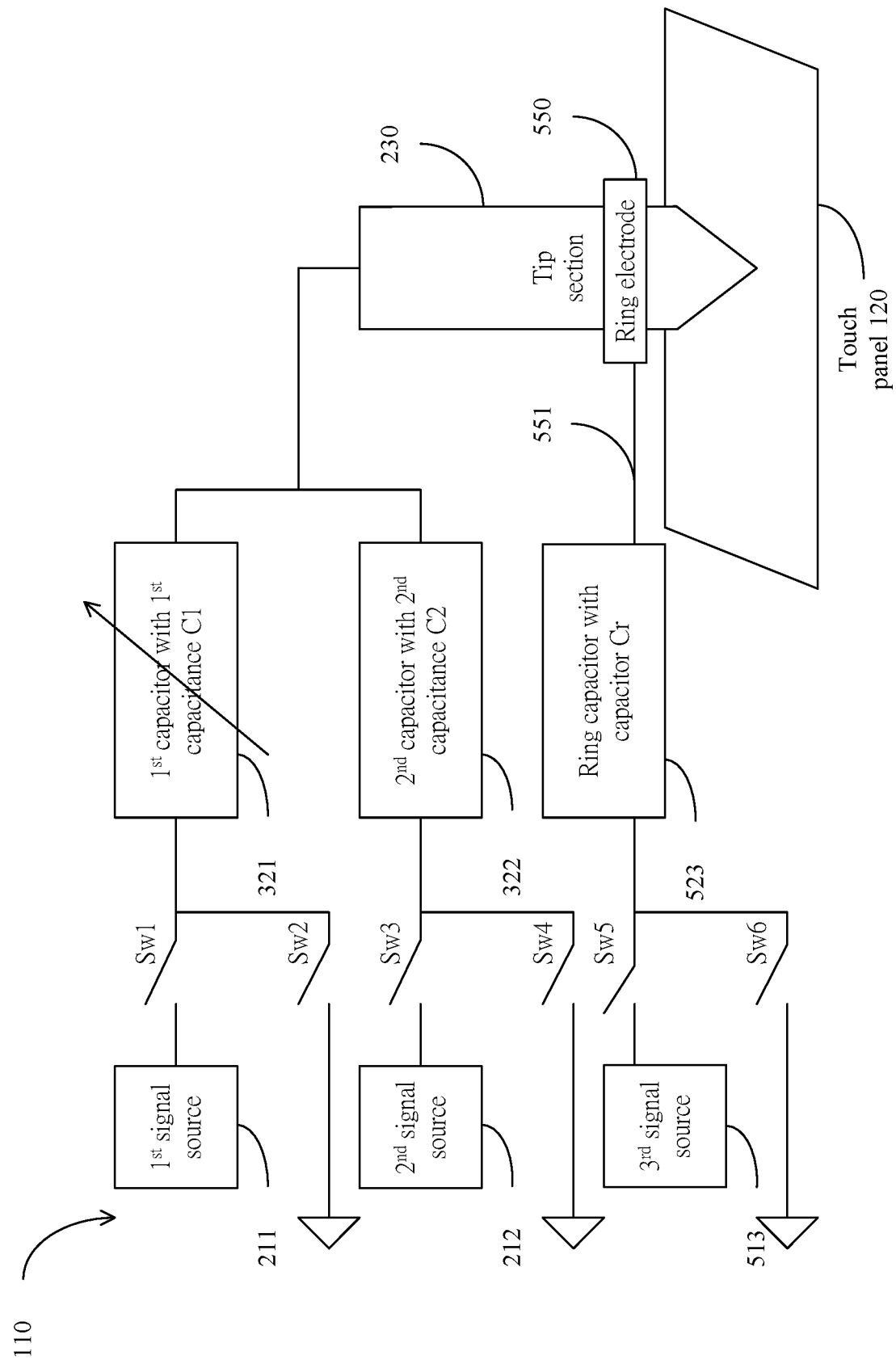
FIG. 5 depicts a diagram of a transmitter 110 in accordance with an embodiment of the present invention.

Please refer to FIG. 5, which depicts a diagram of a transmitter 110 in accordance with an embodiment of the present invention. The embodiment shown in FIG. 5 may be variation of embodiments shown in FIGS. 2, 3, 4A, and 4B. Reversely, the variation of the embodiment shown in FIG. 5 apply to the embodiments shown in FIGS. 2, 3, 4A, and 4B.

Comparing with the embodiment shown in FIG. 2, the embodiment shown in FIG. 5 further includes a ring electrode 550 and a ring wire 551. The ring wire 551 as shown in FIG. 5 connects to a third signal source 513 via a ring capacitor 523 with a fixed capacitance Cr. The tip section 230 is surrounded by the ring electrode 550 which is electrically coupled to the ring wire 551 and the printed circuit board in the back-end. Although it is called "ring" electrode 550 in the present application, the ring electrode 550 may include multiple electrodes in some embodiments. The present invention does not limit the number of the ring electrode 550. For convenience, they are collectively called ring electrode 550. The ring electrode 550 is electrically insulated to the tip section. They are not electrically coupled with each other.

Six switches Sw1 through Sw6 are shown in FIG. 5. The tip section 230 radiates signals from the first signal source 211 if the switch Sw1 is shorted and the switch Sw2 is opened. Otherwise, it could be done if the switch Sw1 is opened or in case the switches Sw1 and Sw2 are shorted at the same time. Similarly, the tip section 230 radiates signals from the second signal source 212 if the switch Sw3 is shorted and the switch Sw4 is opened. Otherwise, it could be done if the switch Sw3 is opened or in case the switches Sw3 and Sw4 are shorted simultaneously. The ring electrode 550 radiates signals from the third signal source 513 if the switch Sw5 is shorted and switch Sw6 is opened. Otherwise, it could be done if the switch Sw5 is opened or in case the switches Sw5 and Sw6 are shorted concurrently.

The first signal source 211 and the second signal source 212 may emit signals with different frequencies or signals with different frequency groups. Analogously, the third signal source 513 shown in FIG. 5 may emit signals with frequency or frequency group different to those from the first signal source 211 and the second signal source 212. Similarly, the first signal source 211 and the second signal source 212 may transmit PWM signals. The frequency of signals transmitted from these two signal sources 211 and 212 may be identical or not. Comparably, the third signal source 513 shown in FIG. 5 may transmit PWM signals. The frequency of signals transmitted from these three signal sources 211, 212 and 513 may be identical or not.

Figure 6:
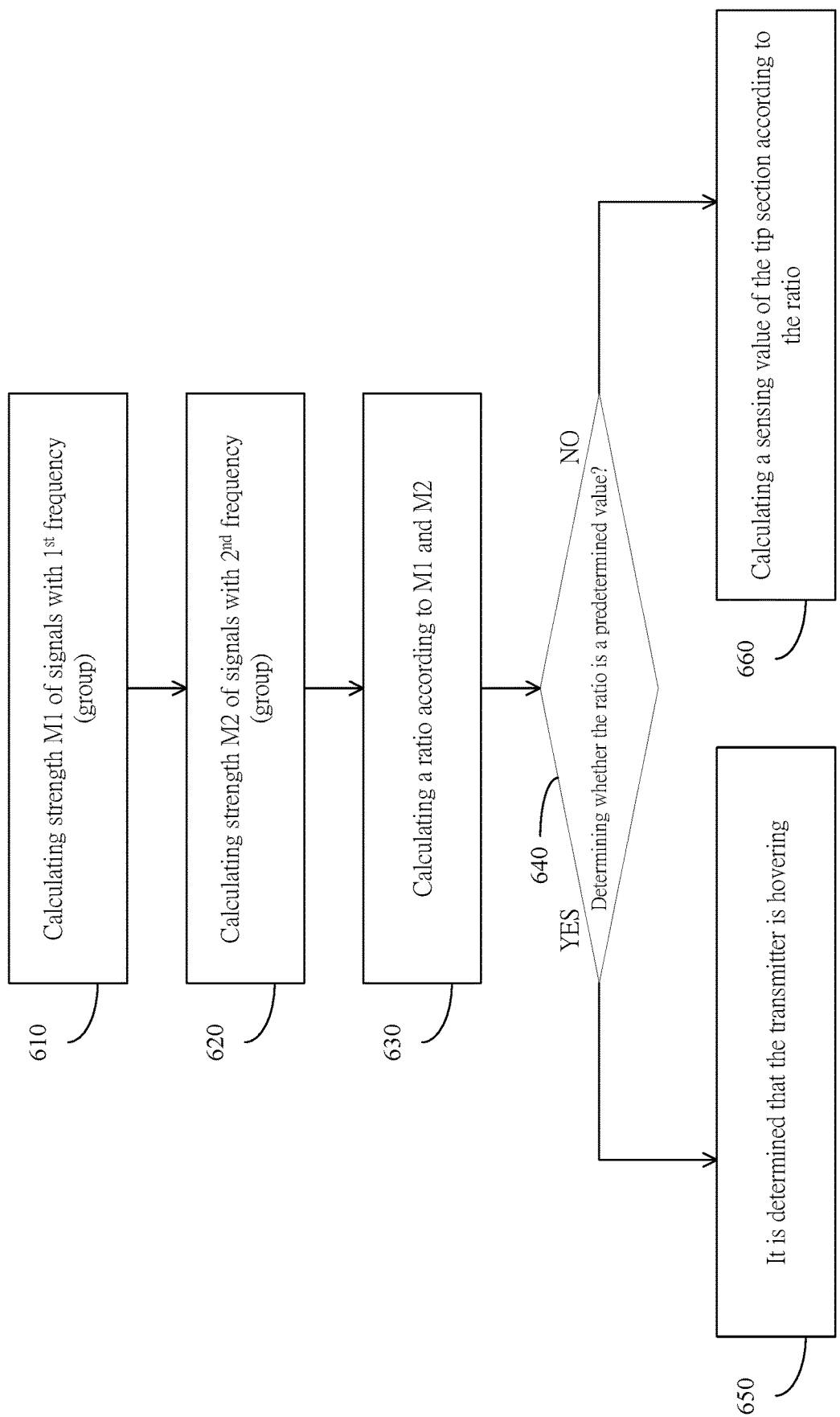
FIG. 6 shows a flow chart of determining the sensing value of the tip of transmitter or active stylus performed by a touch sensitive apparatus in accordance with an embodiment of the present invention.

Please refer to FIG. 6, which shows a flow chart of a method for determining the sensing value of the tip of transmitter or active stylus performed by a processing apparatus in accordance with an embodiment of the present invention. The method could be executed by the touch sensitive processing apparatus 130 as shown in FIG. 1. The touch sensitive processing apparatus 130 connects multiple first electrodes 121 and second electrodes 122 of the touch panel 120 for detecting the electric signals emitted by the tip section 230 of the transmitter 110. The touch sensitive processing apparatus 130 is able to determine a position the transmitter 100 in relative to the touch panel 120 according to signal strengths received by individual first electrode 121 and second electrode 122. In addition, the method shown in FIG. 6 could be used to determine the force sensing value of the transmitter 110. In one instance, the force sensing value is the pressure level of the tip section 230.

The embodiment shown in FIG. 6 may be corresponding to the embodiments shown in FIG. 2 through FIG. 5. The first two steps 610 and 620 calculate signal strength M1 and M2 of the first signal source 211 and the second signal source 212, respectively. These two steps 610 and 620 could be done simultaneously or in any order. In case the signal from the first signal source 211 with first frequency f1 and the signal from the second signal source 212 with second frequency f2, the signal strength M1 is the strength of signal with first frequency f1 and the signal strength M2 is the strength of signal with second frequency f2. In case the signal from the first signal source 211 with first frequency group F1 and the signal from the second signal source 212 with second frequency group F2, the signal strength M1 is sum of strength of signals with each frequency in first frequency group F1 and the signal strength M2 is sum of strength of signals with each frequency in second frequency group F2. As mentioned above, the frequency in this embodiment could be PWM frequency.

Then in step 630, calculating a ratio according to M1 and M2. Five examples of the ratio are already enumerated above, such as M1/M2, (M1−M2)/(M1+M2), (M2−M1)/(M1+M2), M1/(M1+M2), and M2/(M1+M2). Ordinary people skilled in the art could use any other ratio involving M1 and M2 in addition to those examples. Next, step 640 is performed for determining whether the ratio is a predetermined value or falls into a predetermined range. If the result is true, the flow goes to step 650. It is determined that the transmitter 110 is hovering above the touch panel 120. Otherwise, the flow executes step 660 for calculating a sensing value of the tip section 230 according to the ratio. The sensing value may or may not be relevant to the pressure level or moving distance of the tip section 230. The calculations of the sensing value could be done by looking into a lookup table, linear interpolation, and/or quadratic curve interpolation. It depends on the relation between the ratio and the sensing value.

When the method shown in FIG. 6 applies to the embodiments shown in FIGS. 4A and 4B, additional steps could be performed in step 660. For example, when it applies to the embodiment shown in FIG. 4A, the flow may further determine which one of the first, second, third, and fourth ranges the ratio calculated in step 630 falls into. Hence, it is able to determine whether the barrel button and/or the eraser button are pressed or not in addition to the sensing value of the tip section 230. Analogously, when it applies to the embodiment shown in FIG. 4B, the flow may further determine which one of the first, fifth, sixth, and seventh ranges the ratio calculated in step 630 falls into. Hence, it is able to determine whether the barrel button and/or the eraser button are pressed or not in addition to the sensing value of the tip section 230.

In one embodiment of the present application, the controller or circuit inside the transmitter 110 does not need to determine the pressure level of the tip section 230. It simply requires that one or both the first impedance Z1 of the first component 221 and the second impedance Z2 of the second component 222 change according to the pressure level of the tip section 230 such that one of the signal strength of first frequency f1 or first frequency group F1 and the signal strength of second frequency f2 or second frequency group F2 change in consequence. Therefore, the pressure level of the tip section 230 could be calculated according to a ratio between the strength M1 of signals with first frequency f1 or first frequency group F1 and the strength M2 of signals with second frequency f2 or second frequency F2 is demodulated from the electric signals received by the touch panel 120.

Figure 7A:
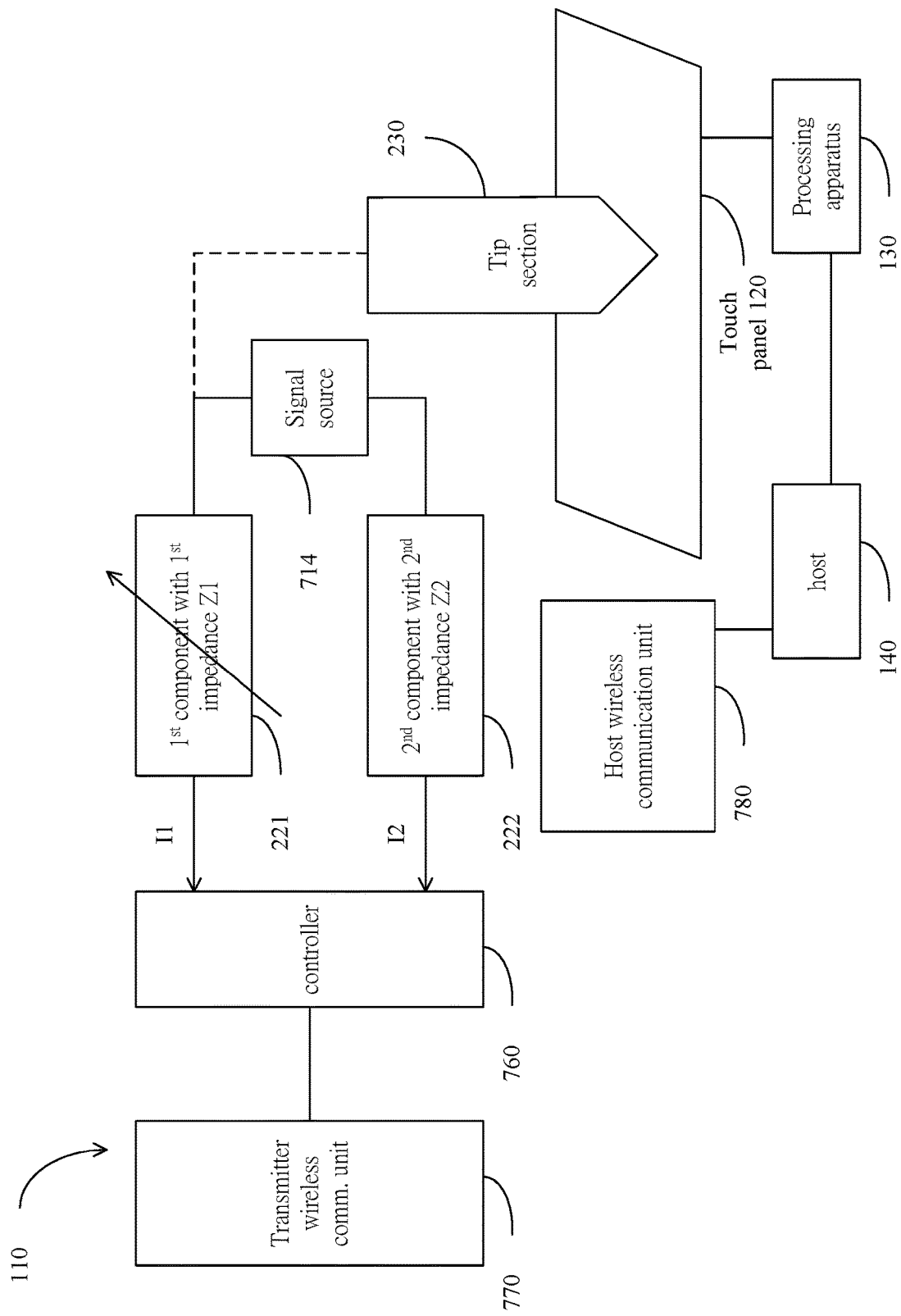
FIG. 7A illustrates a diagram of a transmitter 110 in accordance with an embodiment of the present invention.

Please refer to FIG. 7A, which illustrates a diagram of a transmitter 110 in accordance with an embodiment of the present invention. Comparing with embodiments shown in FIG. 2 through FIG. 5, the transmitter 110 shown in FIG. 7A also includes a first component 221 with a first impedance Z1, a second component 222 with a second impedance Z2, and a tip section 230. The first component 221 and the second component 222 may be any or any combination of resistor, inductor, and capacitor. In the embodiment as shown in FIG. 7A, the second impedance Z2 may be fixed and the first impedance Z1 is variable or adjustable corresponding to a variation of a sensor, such as pressure level of the tip section 230. The first component 221 and the second component 222 as shown in FIG. 7A could adopt those components with same numerals shown in FIG. 2 through FIG. 5. No duplicated description is elaborated here.

Comparing with the previous embodiments, the difference resides in the embodiment shown in FIG. 7A is including a single signal source 714 which is configured to transmit electric signals to the first component 221 and the second component 222 and a controller 760 which is configured to measure a first current value I1 and a second current value I2 outputted from the first component 221 and the second component 222, respectively. The controller 760 is further configured to calculated a ratio which may be one of the followings: I1/(I1+I2), I2/(I1+I2), I1/I2, I2/I1, (I1−I2)/(I1+I2), (I2−I1)/(I1+I2) and etc. Ordinary people skilled in the art can calculated any other ratio involving the current values I1 and I2.

The calculated ratio could be used to conclude the pressure level of the tip section 230. The controller 760 can transmit information derived from the calculation of the first current value I1 and the second current value I2 through a transmitter wireless communication unit 770. The host 140 may receive the information via a host wireless communication unit 780 to get the pressure level of the tip section 230.

Figure 7B:
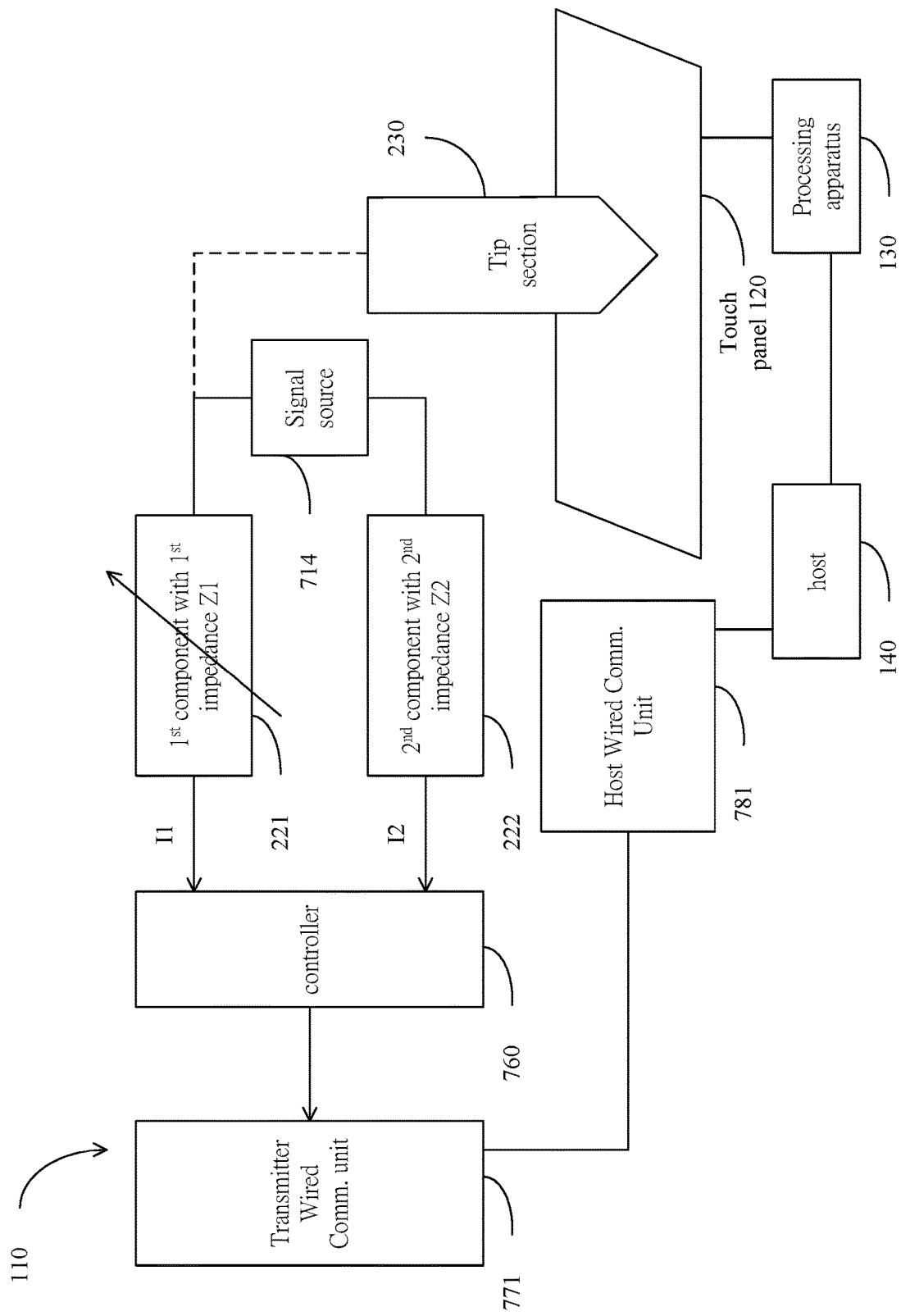
FIG. 7B illustrates a diagram of a transmitter 110 in accordance with an embodiment of the present invention.

Please refer to FIG. 7B, which illustrates a diagram of a transmitter 110 in accordance with an embodiment of the present invention. The difference to the embodiment shown in FIG. 7A resides that the controller 760 may transmit information derived from the calculation of the first current value I1 and the second current value I2 via a transmitter wired communication unit 771. The host 140 may receive the information via a host wired communication unit 781 to get the pressure level of the tip section 230.

Figure 7C:
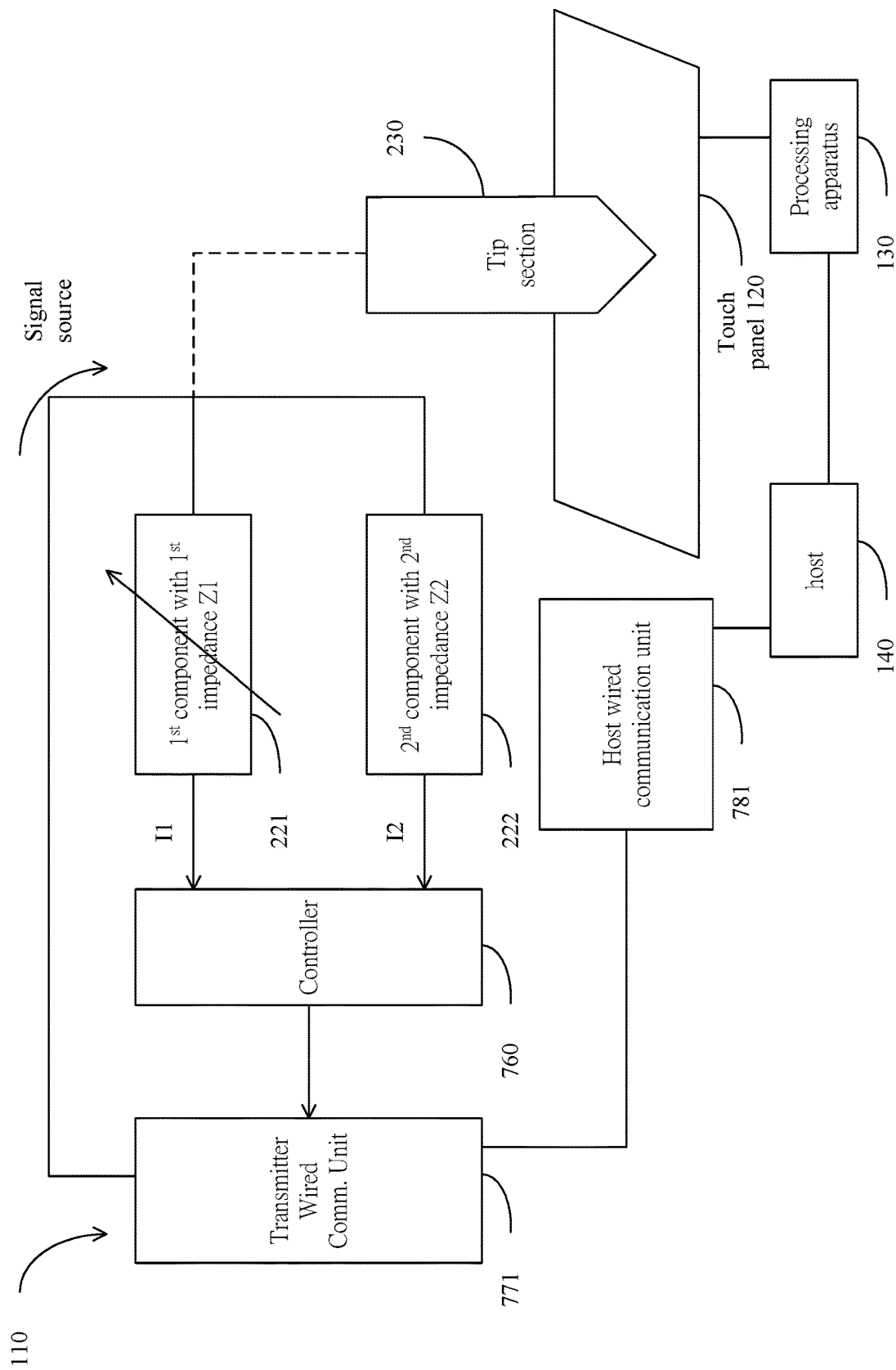
FIG. 7C illustrates a diagram of a transmitter 110 in accordance with an embodiment of the present invention.

Please refer to FIG. 7C, which illustrates a diagram of a transmitter 110 in accordance with an embodiment of the present invention. The difference to the embodiment shown in FIG. 7B resides that the transmitter 110 no longer has the single signal source 714. Instead, the transmitter 110 uses the electric signal from the transmitter wired communication unit 771 as the signal source. Since the transmitter wired communication unit 771 is connected to the host wired communication unit 781, the electric signal is supplied by the power of the host 140.

Figure 7D:
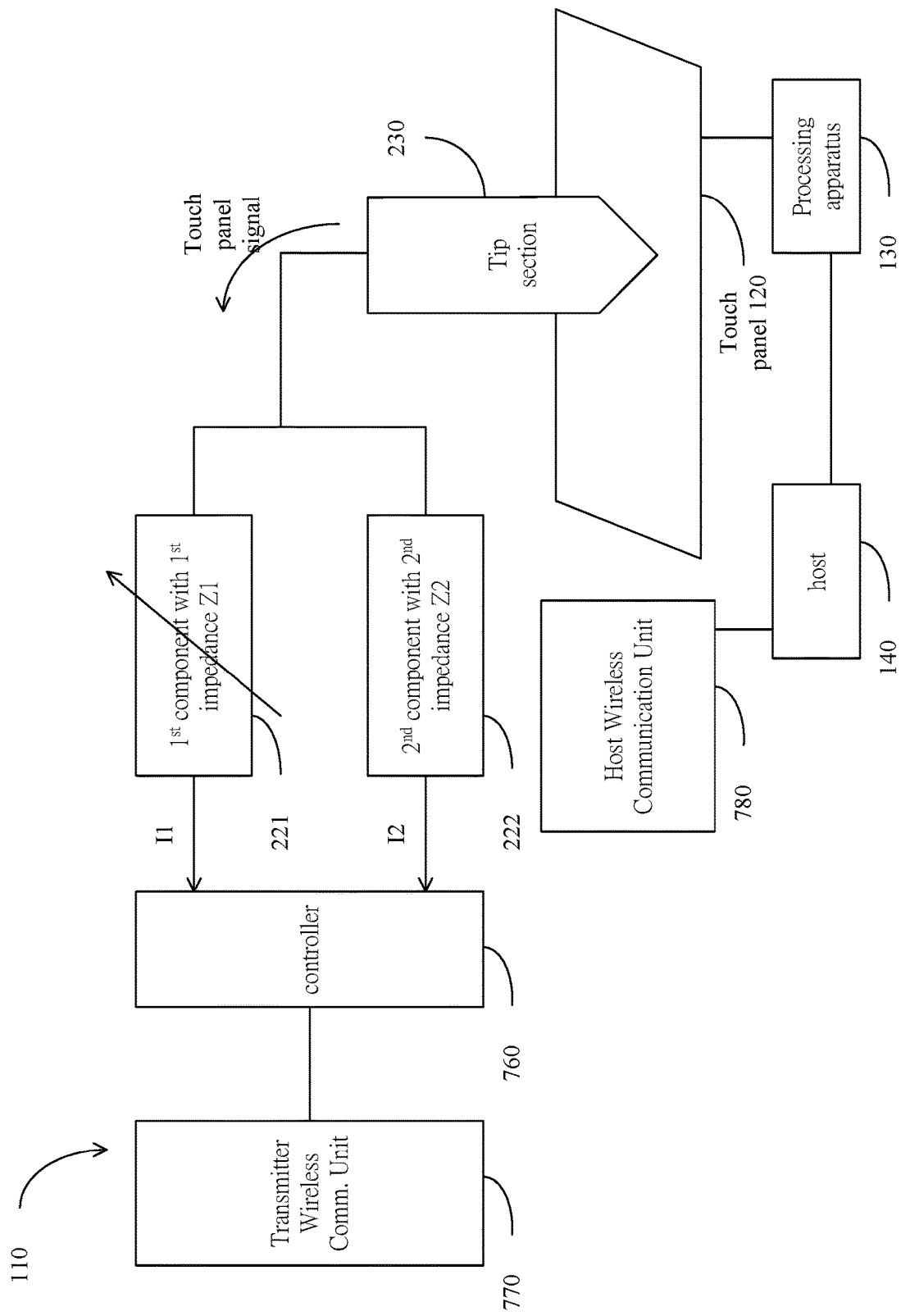
FIG. 7D illustrates a diagram of a transmitter 110 in accordance with an embodiment of the present invention.

Please refer to FIG. 7D, which illustrates a diagram of a transmitter 110 in accordance with an embodiment of the present invention. The difference to the embodiment shown in FIG. 7A resides that the transmitter 110 no longer has the single signal source 714. Instead, the transmitter 110 uses received signal from the first electrodes 121 and/or the second electrodes 122 of the touch panel 120 as the signal source when the tip section 230 approximates to or touches on the touch panel 120.

It is worthy mentioned that the embodiments shown in FIGS. 7A through 7D could use the variation shown in FIG. 3. The first component 221 may be the fore-mentioned first capacitor 321. The second component 222 may be the fore-mentioned second capacitor 322. Similarly, the embodiments shown in FIGS. 7A through 7D could use the variations shown in FIGS. 4A and 4B. The first component 221 may be connected with component corresponding to other switch in parallel, or the second component 222 may be connected with components corresponding to other switch in parallel, such that the controller 760 could conclude the state of the switch according to which range where the calculated ratio falls into.

Figure 8:
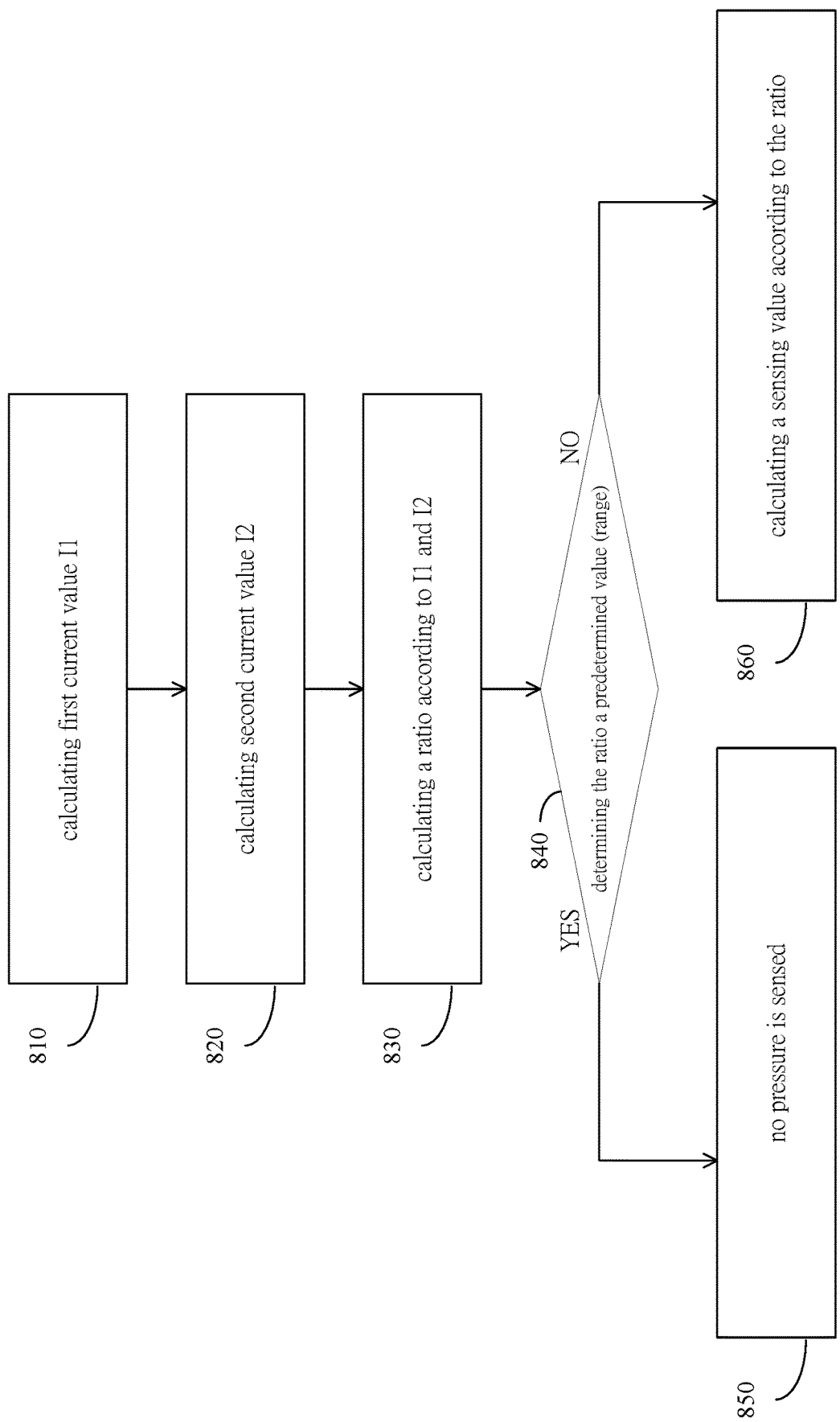
FIG. 8 shows a flow chart of determining the sensing value of the tip of transmitter performed by a touch sensitive apparatus in accordance with an embodiment of the present invention.

Please refer to FIG. 8, which shows a flow chart of a method for determining a sensing value of the tip section of the transmitter performed by a touch sensitive processing apparatus in accordance with an embodiment of the present invention. The embodiment shown in FIG. 8 is quite similar to the embodiment shown in FIG. 6, which is configured to calculate the sensing value according to a ratio between a signal strength M1 of a first frequency (group) and a signal strength M2 of a second frequency (group). The embodiment shown in FIG. 8 is configured to apply to implementation with a single signal source, which is configured to calculate the ratio between a first current value I1 through the first component 221 and a second current value I2 through the second component 222.

The method may be executed by the controller 760 of the embodiments shown in FIGS. 7A through 7D. The first two steps 810 and 820 are configured for calculating a first current value I1 through the first component 221 and a second current value I2 through the second component 222, respectively. These two steps 810 and 820 may be performed simultaneously, or in any order. Next, in step 830, calculating a ratio of I1 and I2. Several examples of the ratio are already enumerated above, such as I1/(I1+I2), I2/(I1+I2), I1/I2, I2/I1, (I1−I2)/(I1+I2), (I2−I1)/(I1+I2), and etc. Next, in step 840, determining whether the ratio is a predetermined value or falls into a predetermined range. If the result is true, the flow goes to step 850, it is determined that the transmitter is hovering above the touch panel 120. Otherwise, the flow goes to step 860, calculating a sensing value of the tip section 230 according to the ratio. The sensing value may or may not be relevant to the pressure level or moving distance of the tip section 230. The calculations of the sensing value could be done by looking into a lookup table, linear interpolation, and/or quadratic curve interpolation. It depends on the relation between the ratio and the sensing value.

When the method shown in FIG. 8 applies to the embodiments shown in FIGS. 4A and 4B, additional steps could be performed in step 860. For example, when it applies to the embodiment shown in FIG. 4A, the flow may further determine which one of the first, second, third, and fourth ranges the ratio calculated in step 830 falls into. Hence, it is able to determine whether the barrel button and/or the eraser button are pressed or not in addition to the sensing value of the tip section 230. Analogously, when it applies to the embodiment shown in FIG. 4B, the flow may further determine which one of the first, fifth, sixth, and seventh ranges the ratio calculated in step 830 falls into. Hence, it is able to determine whether the barrel button and/or the eraser button are pressed or not in addition to the sensing value of the tip section 230.

Figure 9A:
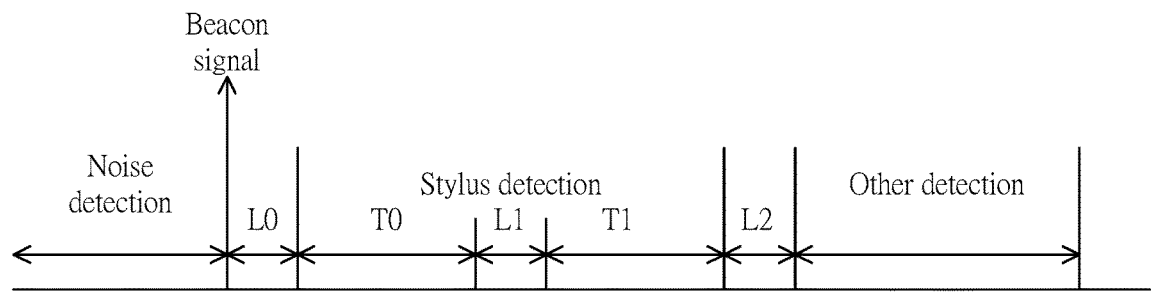
FIG. 9A shows a timing sequence of signal modulation for a transmitter 110 in accordance with an embodiment of the present invention.

Please refer to FIG. 9A, which shows a timing sequence of signal modulation of the transmitter 110 in accordance with an embodiment of the present invention. The embodiment shown in FIG. 9A may apply to the transmitter 110 as shown in FIG. 2 through FIG. 5. The horizontal axis of FIG. 9A is a time axis by order from left to right. As shown in FIG. 9A, an optional noise detection period is included prior to a beacon signal is emitted by the touch panel/screen 120. The noise detected during the period may come from the touch panel/screen, the electronic system thereof, and/or background environment. The touch panel/screen 120 and the touch sensitive processing apparatus 130 may detect one or more frequencies of noise signals. Noise detection would be described later.

Figure 29:
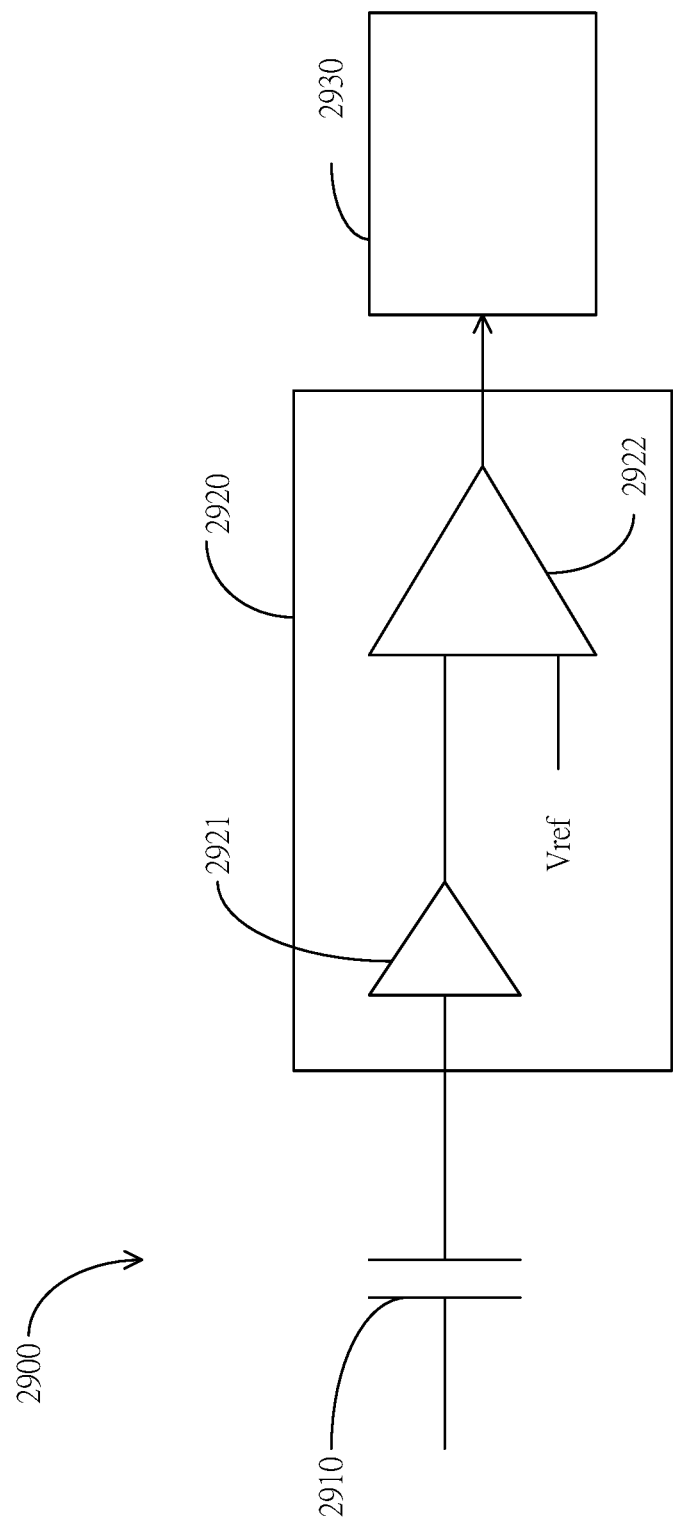
FIG. 29 illustrates a block diagram of a system for detecting beacon signal in accordance with an embodiment of the present invention.

In one embodiment, the touch panel/screen 120 transmits beacon signals. The transmitter 110 includes a demodulator for detecting the beacon signal. Please refer to FIG. 29, which illustrates a block diagram of a system for detecting beacon signal in accordance with an embodiment of the present invention. The system 2900 includes a receiving electrode 2910, a detecting module 2920, and a demodulator 2930. In one embodiment, the receiving electrode 2910 may be the ring electrode 550, the tip section 230, or any other electrodes. The receiving electrode 2910 forwards the received signal to the detecting module 2920.

The detecting module 2920 includes an analogous front end 2921 and a comparator 2922. Ordinary people skilled in the art could understand what the analogous front end 2921 does which is not elaborated here. In this embodiment, the analogous 2921 outputs a voltage signal representing the signal strength. The comparator 2922 is configured to compare a reference voltage Vref and a voltage signal representing the signal strength. If the voltage signal is higher than the reference voltage, it means that the received signal is strong enough. Thus, the comparator 2922 outputs an activation signal or an enable signal to the demodulator 2930 which is configured to demodulate the received signal to determine whether the received signal contains the frequency of the beacon signal. If the voltage signal is lower than the reference voltage, the comparator 2922 may output a disable signal to the demodulator 2930. Consequently, the demodulator 2930 stops demodulating the received signal.

When the transmitter 110 did not receive the beacon signal for a while, it could be switched to a sleep mode for shutting the demodulator 2930 down to reduce power consumption. However, since the power consumption of the detecting module 2920 is not significant, the detecting module 2920 could continue detecting whether the signal strength of the received signal is over a predetermined value in the sleep mode. Once the signal strength of the received signal is more than the predetermined value, the transmitter 110 may switch from the sleep mode to an energy saving mode which consumes more power for activating the demodulator 2930. In the same time, the rest parts of the transmitter 110 may still rest in the power down state. If the demodulator 2930 determines that the received signal does not contain the beacon signal, the demodulator 2930 may be shut down after some time and the transmitter 110 switches from the energy saving mode back to the sleep mode which consume less power. Instead, if the demodulator 2930 determines that the received signal does contain the beacon signal, the demodulator 2930 can wake up the rest parts of the transmitter 110 such that the transmitter switches from the energy saving mode to normal working mode.

Now, back to embodiment of FIG. 9A, after a delay period enduring L0 length, the transmitter 110 emits electric signal during T0 and T1 periods. There may exist a delay period enduring L1 length between the T0 and T1 periods. The length of T0 period may or may not equal to the length of T1 period. The T0 and T1 periods are collectively called a signal frame. The touch sensitive processing apparatus 130 detects the electric signals emitted from the transmitter 110 during T0 and T1 periods. Next, after another optional delay time enduring L2 length, the touch sensitive processing apparatus 130 may perform optional other detection, e.g., fore-mentioned capacitance detection mode for detecting passive stylus or finger.

The present invention does not limit the lengths of delay times L0, L1, and L2, which may be zero or any other duration. The lengths of delay times L0, L1 and L2 may or may not be relevant. In one embodiment, among those periods shown in FIG. 9A, only the T0 and T1 periods of the signal frame are mandatory, other periods are optional.

TABLE 1

| State | Signal Source | Period | Barrel button pressed | Eraser button pressed | Other state |
|---|---|---|---|---|---|
| Hovering | 1$^{st}$ signal source | T0 | F0 | F1 | F0 |
|  |  | T1 | F1 | F2 | F2 |
|  | 2$^{nd}$ signal source | T0 | F0 | F1 | F0 |
|  |  | T1 | F1 | F2 | F2 |

Please refer to Table 1, which shows a modulation table of electric signals emitted by the transmitter 110 in accordance with an embodiment of the present invention. As shown in Table 1, the state of the transmitter 110 is hovering, i.e., no pressure is measured by the force sensor. Since the tip section 230 of the transmitter 110 does not contact the touch panel/screen 120, the first and second signal sources 211 and 212 emit the same frequency group Fx simultaneously in the same period in order to enhance the signal strength in the embodiment shown in Table 1. For example, in case the barrel button is pressed, these two signal sources both emits frequency group F0 during the T0 period and frequency F1 during the T1 period. If the touch sensitive processing apparatus 130 detects signals with frequency group F0 during the T0 period and signals with frequency group F1 during the T1 period, it determines that the barrel button of the hovering transmitter 110 is pressed.

The frequency group Fx includes at least one frequency. Frequencies classified in the same frequency group are interchangeable. For example, frequency group F0 includes f0 and f3 frequencies; frequency group F1 includes f1 and f4 frequencies; and frequency group F2 includes f2 and f5 frequencies. No matter which one of f0 and f3 frequencies is detected, the touch sensitive processing apparatus 130 takes that frequency group F0 is received.

In another embodiment, it is not required to have both signal sources 211 and 212 of the transmitter 110 emitting signals with the same frequency group. Table 1 is just an example of the present embodiment. Besides, the transmitter 110 may include more buttons or sensors. The present invention does not limit to two buttons.

TABLE 2

| State | Signal Source | Period | Barrel button pressed | Eraser button pressed | Other state |
|---|---|---|---|---|---|
| Touching | 2$^{nd}$ signal source | T0 | F0 | F1 | F0 |
|  |  | T1 | GND | GND | GND |
|  | 1$^{st}$ signal source | T0 | GND | GND | GND |
|  |  | T1 | F1 | F2 | F2 |

Please refer to Table 2, which shows a modulation table of electric signals emitted by the transmitter 110 in accordance with an embodiment of the present invention. As shown in Table 2, the state of the tip section 230 of the transmitter 110 is touching, i.e., pressure is measured by the force sensor.

With regard to the embodiment shown in FIG. 4A, the following describes what happened if the barrel button SWB is pressed. During the T0 period, the output of the first signal source 211 is grounded and the second signal source 212 emits signals with frequency group F0. Hence, the electric signals of the transmitter 110 during the T0 period only have the frequency group F0 emitted from the second signal source 212. During the T1 period, the output of the second signal source 212 is grounded and the first signal source 211 emits signals with frequency group F1. Furthermore, since the impedance of the first capacitor 321 is changed in the touching state, the pressure level of the tip section 230 could be calculated according to the ratio of the signal strengths with regard to the received frequency groups F0 and F1 during the T0 and T1 periods, respectively. Besides, because the touch sensitive processing apparatus 130 detects frequency group F0 during the T0 period and detects frequency group F1 during the T1 period, it determines that the barrel button is pressed.

With regard to the embodiment shown in FIG. 4B, the following describes what happened if the barrel button SWB is pressed. During the T0 period, the output of the first signal source 211 is grounded and the second signal source 212 emits signals with frequency group F0. The second capacitor 322 is connected with the barrel capacitor 442 in parallel. Although the electric signals emitted from the transmitter 110 during the T0 period only contains signals with frequency group F0 from the second signal source 212, the signal strength is different from the one which the barrel button is not pressed. During the T1 period, the output of the second signal source 212 is grounded and the first signal source 211 emits signals with frequency group F1. Furthermore, since the impedance of the first capacitor 321 is changed in the touching state, the pressure level of the tip section 230 could be calculated according to the ratio of the signal strengths with regard to the received frequency groups F0 and F1 during the T0 and T1 periods, respectively. Besides, because the touch sensitive processing apparatus 130 detects frequency group F0 during the T0 period and detects frequency group F1 during the T1 period, it determines that the barrel button is pressed.

TABLE 3

| State | Signal Source | Period | Barrel button pressed | Eraser button pressed | Other state |
|---|---|---|---|---|---|
| Hovering | 2$^{nd}$ signal source | T0 | F0 | F1 | F2 |
|  |  | T1 | F0 | F1 | F2 |
|  | 1$^{st}$ signal source | T0 | F0 | F1 | F2 |
|  |  | T1 | F0 | F1 | F2 |

Please refer to Table 3, which shows a modulation table of electric signals emitted by the transmitter 110 in accordance with an embodiment of the present invention. In this embodiment, according to the received frequency group, it is able to know which button is pressed.

TABLE 4

| State | Signal Source | Period | Barrel button pressed | Eraser button pressed | Other state |
|---|---|---|---|---|---|
| Touching | 2$^{nd}$ signal source | T0 | F0 | F1 | F2 |
|  |  | T1 | GND | GND | GND |
|  | 1$^{st}$ signal source | T0 | GND | GND | GND |
|  |  | T1 | F0 | F1 | F2 |

Please refer to Table 4, which shows a modulation table of electric signals emitted by the transmitter 110 in accordance with an embodiment of the present invention. In this embodiment, according to the received frequency group, it is able to know which button is pressed. The pressure level of the tip section could be calculated according to a ratio of received signal strength between the T0 and T1 periods.

Figure 9B:
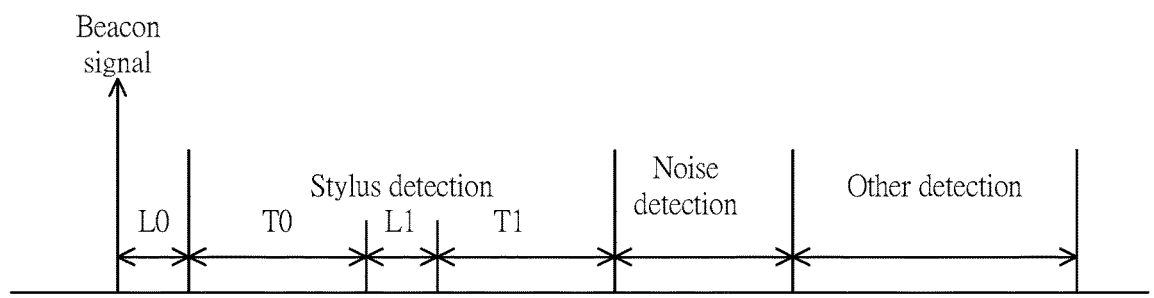
FIG. 9B shows a timing sequence of signal modulation for a transmitter 110 in accordance with an embodiment of the present invention.

Please refer to FIG. 9B, which shows a timing sequence of signal modulation of the transmitter 110 in accordance with an embodiment of the present invention. The embodiment is a variation of the embodiment shown in FIG. 9A. The difference between these two embodiments shown in FIGS. 9A and 9B is a noise detection taking place after the T1 period. After that, other detection is performed.

Figure 9C:
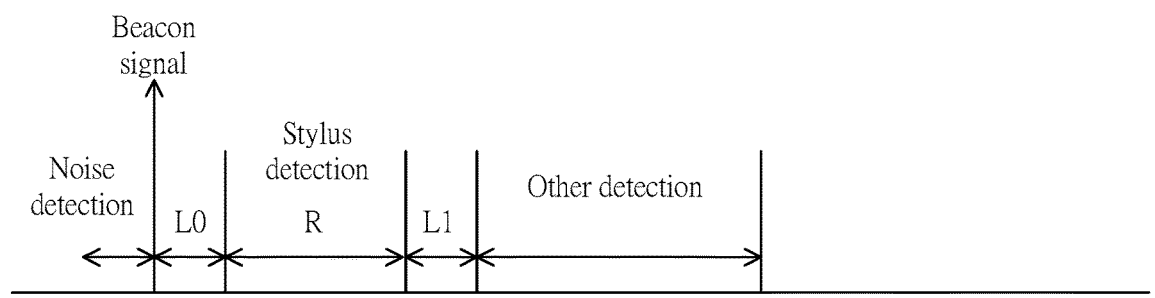
FIG. 9C shows a timing sequence of signal modulation for a transmitter 110 in accordance with an embodiment of the present invention.

Please refer to FIG. 9C, which shows a timing sequence of signal modulation of the transmitter 110 in accordance with an embodiment of the present invention. The modulation shown in FIG. 9C may apply to the transmitter 110 shown in FIG. 5. One additional function of the ring electrode 550 is to enhance the signal strength of active stylus in hovering state. Thus the detection range of the hovering active stylus could be increased consequently.

The modulation shown in FIG. 9C is when the transmitter 110 is hovering. In this state, the time period which the transmitter 110 emits signals contains the R time period, merely. During this R period, both the ring electrode 550 and the tip section 230 transmit electric signals together. In one embodiment, the electric signals may come from the same signal source with the same frequency and/or modulation. For example, both the ring electrode 550 and the tip section 230 transmit signals from the third signal source 513. In another instance, both the ring electrode 550 and the tip section 230 may simultaneously transmit signals from the first, the second, and the third signal sources in turns, such that the maximum power for each signal sources can be utilized. The touch sensitive processing apparatus 130 can conclude the position the transmitter 110 is hovering above the touch panel 120 by detecting the electric signals emitted from the ring electrode 550 during the R period. If the electric signals from the ring electrode 550 and the tip section 230 comes from the same signal source or have the same frequency group, the signal strength would be maximized. In consequence, the range of the hovering transmitter 110 detected by the touch panel 120 would be maximized. Alternatively, the transmitter 110 transmits electric signals via only the ring electrode 550 during the R period.

Figure 9D:
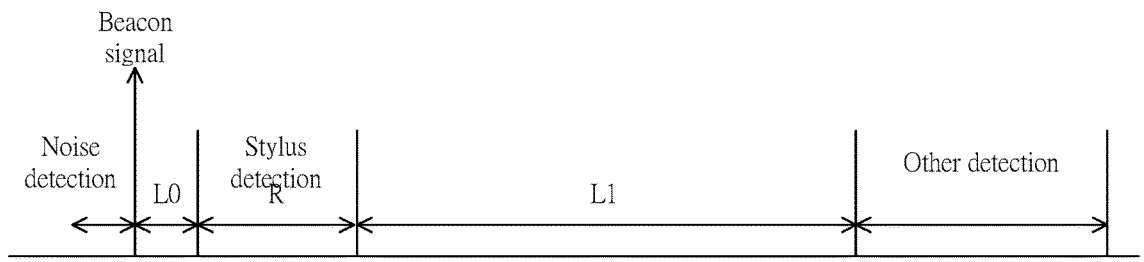
FIG. 9D shows a timing sequence of signal modulation for a transmitter 110 in accordance with an embodiment of the present invention.

Please refer to FIG. 9D, which shows a timing sequence of signal modulation of the transmitter 110 in accordance with an embodiment of the present invention. The modulation shown in FIG. 9D may apply to the transmitter 110 shown in FIG. 5. In the embodiment shown in FIG. 9C, a delay time or blank period L1 is included after the R period. The touch panel 120 performs other detection after the L1 period. Comparing with the embodiment shown in FIG. 9C, the L1 period in the embodiment shown in FIG. 9D is extended. Comparing with the embodiment shown in FIG. 9E, the L1 period in the embodiment shown in FIG. 9D equals to the sum of L1, T0, L2, T1, and T3 periods. Thus, if no further electric signal could be detected by the touch sensitive processing apparatus 130 shown in FIG. 9D, it is determined that the transmitter 110 is in the state of hovering.

Figure 9E:
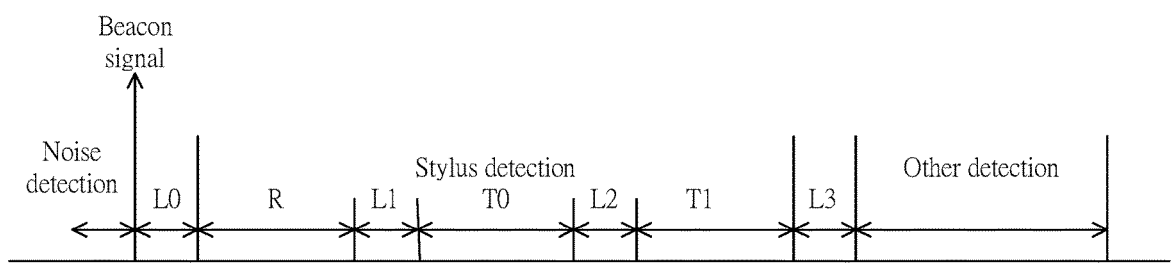
FIG. 9E shows a timing sequence of signal modulation for a transmitter 110 in accordance with an embodiment of the present invention.

Please refer to FIG. 9E, which shows a timing sequence of signal modulation of the transmitter 110 in accordance with an embodiment of the present invention. The modulation shown in FIG. 9E may apply to the transmitter 110 shown in FIG. 5. The embodiment shown in FIG. 9E is equivalent to add an R period prior to the time frame of the embodiment shown in FIG. 9A. In this embodiment, no matter whether the tip section 230 is touched or not, the transmitter 110 always transmits electric signal from the tip section 230 during the T0 and T1 periods such that some logic design for controlling could be omitted. However, comparing with the embodiments shown in FIGS. 9C and 9D, the embodiment shown in FIG. 9E would waste power consumption during the T0 and T1 periods. On the other hand, the touch sensitive processing apparatus 130 no longer needs to perform detection during the R period as long as the electric signals from the tip section 230 could be detected during the T0 and T1 periods. It could be determined that whether the tip section 230 is pressed or not and further determined that the transmitter 110 is in the state of hovering or not.

Figure 9F:
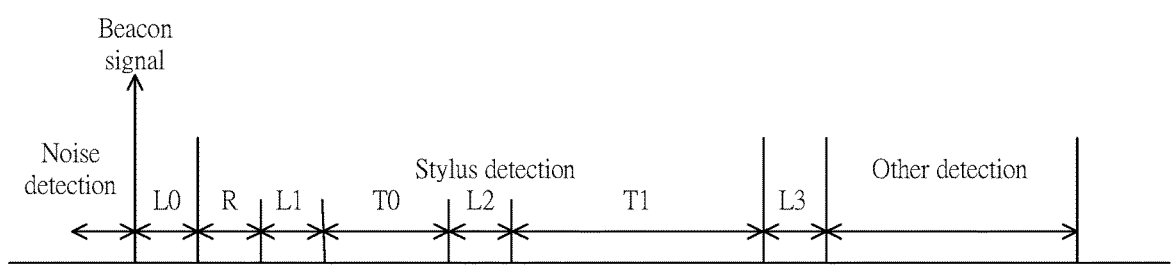
FIG. 9F shows a timing sequence of signal modulation for a transmitter 110 in accordance with an embodiment of the present invention.

Please refer to FIG. 9F, which shows a timing sequence of signal modulation of the transmitter 110 in accordance with an embodiment of the present invention. The modulation shown in FIG. 9F may apply to the transmitter 110 shown in FIG. 5. In the embodiment shown in FIG. 9E, no proportional relation is defined over lengths of the R, T0, and T1 periods. Instead, in the embodiment shown in FIG. 9F, the ratios between lengths of the R, T0, and T1 periods is 1:2:4. Assuming that the touch sensitive processing apparatus 130 could perform N sampling during one time unit, where N is a positive integer. Hence, the touch sensitive processing apparatus 130 could perform N, 2N, and 4N samplings during the R, T0, and T1 periods, respectively. The present invention does not limit the ratios among the lengths of these three periods. In one instance, the period with the most powerful electric signal endures the shortest time; the period with the weakest electric signal endures the longest time. For examples, the ratios may be 1:3:2, 1:2:3, or etc. The design of ratios depends on the implementation. Although the paragraphs above enumerate modulations in two periods T0 and T1 merely, the present invention does not limit to that. More periods are applicable to the present invention.

In those FIGS. 9A-9F mentioned above, the pressure value sensed by the tip section 230 can be calculated based on the strength ratios of different signals received in different periods. In some embodiments of the present invention, the transmitter 110 does not need to sense the pressure value on the tip section 230 and it can make the electric signal transmitted from the tip section 230 reflect the pressure value.

In other embodiments, the transmitter 110 could include an apparatus for measuring the pressure value on the tip section 230, and this could be implemented through those mentioned in FIG. 6 or FIG. 8. Or, it could be fulfilled by a manometer, the parts of capacitor, resistor, and inductor for measuring pressure, and analog-to-digital converters (ADCs). The present invention does not limit to the used apparatus, and the requirement is that the transmitter 110 can measure and acquire a digital representing value or pressure digital value of the pressure the tip section 230 being pressed.

According to the requirement of design accuracy, the pressure digital value mentioned above could have several accuracy degrees. For example, 10 accuracy degrees or resolutions, in a sample case, could be included but thousands of accuracy degrees or resolutions could be applied in a complex case. The present invention does not limit to the accuracy or resolution of the pressure digital value. In one embodiment, the pressure digital value may include 256 accuracy degrees; the pressure digital value, in another embodiment, may include 16 accuracy degrees; and still another embodiment, the press digital value may include 1024 accuracy degrees.

The accuracy degree mentioned above may be represented in many manners, such as decimal system. Assumed the pressure digital value has 256 accuracy degrees, 3 decimal digitals may be used to denote it or 2 hexadecimal digitals may be used to represent it as well or even 8 binary digitals may be applied to denote it. Assumed the pressure digital value has 512 accuracy degrees, 3 decimal digitals may be used to denote it or 3 hexadecimal digitals may be used to represent it as well. The present invention does not limit to the representing manner of the pressure digital value.

One of the features of the present invention is that the transmitter 110 adopts at least one or multiple periods to send out electric signals representing pressure values. It is noted that the electric signals sent here don't need to be traditional square wave signals. They can also be sine wave signals or other types of signals. The present invention is not limited if the electric signals have any coded or modulated forms. It is only required the touch sensitive processing apparatus 130 can detect whether the transmitter 110 sends electric signals or not. In short, the touch sensitive processing apparatus 130 only determines whether the transmitter 110 sends out electric signals or not instead of its coded or modulated forms of electric signals. And further, when the touch sensitive processing apparatus 130 determines that the transmitter 110 sends out electric signals, the starting time and the time length of the sent electric signals can be decided.

In one embodiment, as shown in FIG. 9A, the transmitter 110 adopts two periods T0 and T1 to send out electric signals representing pressure values. Assumed the pressure digital value includes 256 accuracy degrees, two hexadecimal digitals can be used to represent it, and these two digitals can be represented by the electric signals of the periods T0 and T1, respectively. The electric signals of period T0 can represent a higher digital, and the electric signals of period T1 can represent a lower digital. In other words, this invention doesn't restrict to the digital orders of each period. Namely, it can be Big Endian or Little Endian.

Assumed the period T0 is used to denote the hexadecimal digital, the form of the sent and unsent electric signals can be used to represent a hexadecimal digital. In one embodiment, the period T0 can be divided into 15 sub-periods. When the transmitter 110 sends electric signals in each sub-period, 15 is the represented number. When the transmitter 110 doesn't send electric signals in the 15 sub-periods, 0 is the represented number. Among the 15 sub-periods, 7 sub-periods show the sent electric signals, 7 is the represented number. For example, 001111111000000 represents 7; 101010101010100 also stands for 7; 000000001111111 also means 7. Among the 15 sub-periods, 12 sub-periods show the sent electric signals, 12 is the represented number. In this embodiment, the present invention is not limited if the sub-periods of the sent electric signals are continuous or separated. Also, the positions or the orders of the sub-periods are not restricted. As long as the number of the sent electric signals of the sub-periods can be counted when the touch sensitive processing apparatus 130 is receiving electric signals, one digital of the pressure value can be explained.

In some embodiments, each period of the present invention isn't necessarily provided with the same length. For example, when three decimal numbers are used to represent the pressure digital value 256, the period of the hundred digital only needs three sub-periods, the three possibilities 0, 1, 2 can be represented. When decimal numbers are used to stand for the pressure digital value 512, the period of the hundred digital is divided into 5 sub-periods, the three possibilities 0~5 can be shown. In this case, the sub-period to represent the hundred digital is then shorter than the other two periods.

In some embodiments, one period of the hexadecimal numbers represented can be divided into more than 15 sub-periods in order to add redundancy code, error detecting and/or correcting code, check code, etc. Moreover, one period of the decimal numbers represented can be divided into more than 9 sub-periods in order to add fault-tolerant code, error detecting and/or correcting code, check code, etc. In one embodiment, the code type of asynchronous transmission is adopted in each period. In short, the present invention is not limited to the signal types of modulation and demodulation.

In this application, concerning the related description of the previous FIG. 9A to FIG. 9F, except for the differences of the modulated types of the electric signals, the rest can be used to send out the pressure value by the digital signals in the embodiments. For instance, the delayed time of the above-mentioned periods L1, L2, L3 can be 0 or any length.

As shown in FIG. 9D, when the tip section 230 doesn't touch any object, that is, the transmitter 110 is in hovering state, the transmitter 110 doesn't send out any signal in L1 period. The touch sensitive processing apparatus 130 through R period detected by the transmitter detects the transmitter 110 sending signals in hovering state. A shown in FIG. 9 E, when the tip section 230 touches the touch panel 120, the touch sensitive processing apparatus 130 in FIG. 9E detects the pressure digital value sent by the transmitter 110 in corresponding of L1, T0, L2, T1, L3 periods of L1 period in FIG. 9A. Although only the periods T0 and T1 are shown in the embodiment of FIG. 9A to FIG. 9F, this application can be applied to at least one period's or more than three periods' emitting periods for the pressure digital values.

In this application, when the transmitter 110 sends out the digital signals of the pressure digital value represented through multiple periods, the transmitter 110 can adopt different modulated forms among these periods. For instance, the above-mentioned pressure digital values 256 or 512, in which their represented hundred digital's period and other two periods have different modulated ways and time. In another embodiment, the represented hundred digital's period and other two periods can have the same modulated time but by different ways of modulation.

Although in the above-mentioned embodiment of this application, the pressure values of tip section 230 serve as the sending target of the electric signals, this application is not limited to this. The present invention can send any receiving digital values of many possibly stated sensors from the transmitter 110 through this way. For instance, when the transmitter 110 has two buttons, these two buttons can include four statuses. Accordingly, the transmitter 110 can send 0~3 electric signals in one period to represent the detecting situations of these buttons. In another embodiment, when the transmitter 110 is equipped with three buttons, these three buttons can include eight statuses. As a result, the transmitter 110 can send 0~7 electric signals in one period to show the detecting situations of these buttons. In one embodiment, the period to send these button statuses can be the above-mentioned R period detected by the transmitter. When the digital values of button statuses are sent in R period, the touch sensitive processing apparatus 130 can simultaneously detect the hovering state of the transmitter 110, which notably shows the button states of the transmitter 110.

In one embodiment, the digital values transmitted in R period can be sent out through the tip section 230, and it can also be sent out through the ring electrode 550. Also, they can be simultaneously sent out through both the tip section 230 and the ring electrode 550 in order for the detection of the touch sensitive processing apparatus 130. Please refer to the descriptions of the embodiments in FIG. 25 and FIG. 26.

In one embodiment, the above-mentioned electric signals can consist of one signal frequency group or signals with only one signal frequency. Therefore, the touch sensitive processing apparatus 130 can lock the frequency group or single frequency by filters or demodulators to detect if the transmitter 110 sends out the electronic signals or not. In FIG. 9A to FIG. 9F, the transmitter 110 and/or the touch sensitive processing apparatus 130 can implement the noise detection. When the transmitter 110 and/or the touch sensitive processing apparatus 130 detect(s) that the frequency of noise is the same as the frequency of the electric signals, the transmitter 110 can use another frequency group or another frequency to transmit electric signals. This part refers to the following related illustration.

The touch sensitive processing apparatus 130 can adopt many ways to detect the transmitter 110. In one embodiment, filters, integrators and comparators can be used to deal with the receiving signals from the first electrodes 121 and the second electrodes 122. The filters are used to filter noise of other frequencies, the integrators are applied to sample the signals, and the comparators are used to compare the sampling results to see if they are over the default value. The default value can be the interior noise value of the touch sensitive processing apparatus 130 or the frequently-receiving noise value of the touch panel 120. When the sampling results are over the default value, that is, the receiving signals are larger than noise value, it means the sampling result is the electric signals detected and it shows 1 otherwise 0. Similarly, the filtering procedure, integrating procedure and comparing procedure can be used to cope with the receiving signals of the first electrodes 121 and the second electrodes 122 to judge if the sampling result is the detected electric signals.

In one embodiment, the integrator adopted can be dual slope integrator, whose integrating procedure used can be the method of dual slope integration. In one embodiment, the above-mentioned default value can be 0 or the comparators or the comparing procedure can be omitted.

In some embodiments, the touch sensitive processing apparatus 130 can use a demodulator to handle the signals received by the first and the second electrodes 121 and 122. The demodulator has multiple embodying ways. To put it simply, the demodulator can multiply the sampling signals and intended receiving frequency signals together and then add them up. When the total number is larger than one certain default value, it means the sampling result is the electric signals detected and it shows 1 otherwise 0.

In the above-mentioned embodiments, each period to represent pressure digital value has its fixed length, so through the time that the transmitter sends out the electronic signals, it can use the ratio of occupying the period to show certain value of the pressure digital value. In another embodiment of the present invention, the unfixed length of the transmitting period of the electronic signals can be adapted to represent one certain value of the pressure digital value. When the transmission of the electronic signals was interrupted, it represents that the transmitting time of the digital value is over and the next transmission of the electronic signal represents next digital value.

Figure 9G:
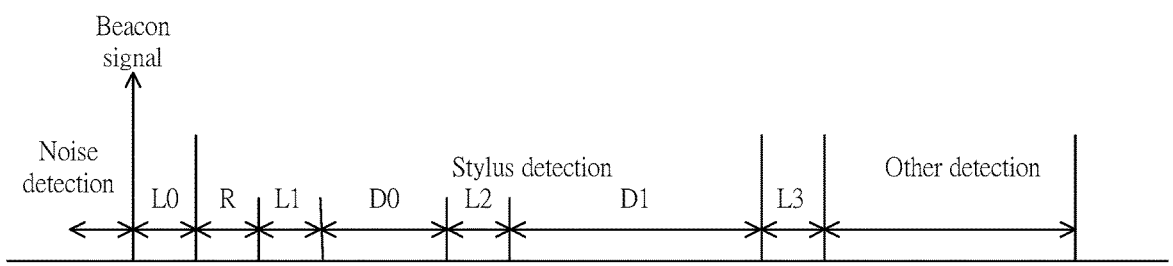
FIG. 9G shows a timing sequence of signal modulation for a transmitter 110 in accordance with an embodiment of the present invention.

Referring to FIG. 9G, it shows a timing sequence of signal modulation for a transmitter 110 in accordance with an embodiment of the present invention. The signal modulation in FIG. 9G could apply to the transmitter 110 shown in FIG. 5. The embodiment in FIG. 9G can adopt the length of the transmitting time of the two electric signals D0 and D1, which respectively show the two values of the digital pressure value. As shown in FIG. 9G, the length of the transmitting time of the electric signal D0 is 4 units, while the length of the transmitting time of the electric signal D1 is 8 units. If the decimal system is used to represent the numbers, the pressure values can be explained as 48.

In this embodiment, period R is optional. When the transmitter 110 has to send out the electric signals in R period to offer the touch sensitive processing apparatus 130 to detect its location, and R period is used to represent sensing states of other sensors, the digital values of sensing states of these sensors cannot be coded from 0, or not including 0. That is, the electronic signals cannot but be transmitted. For instance, when the transmitter 110 intends to send out digital state values of two buttons, in one embodiment, the four digital state values can be 1, 2, 3, and 4. In another embodiment, the values can be 2, 3, 4, and 5. In still another embodiment, the values can be 2, 4, 6, and 8. In yet another embodiment, the values can be 1, 3, 5, and 7. The transmitter 110 sends out several units of time length of the electric signals based on the above-mentioned digital state values.

Similarly, when the transmitting periods of the electric signals D0 and D1 are used to represent the digital values, the modulated form of none-zero length can be adopted as well. For example, a decimal value can stand for 1~10 or 2~11 instead of 0~9. A hexadecimal value can stand for 1~16 or 2~17 instead of 0~15. For instance, when the transmitter 110 sends out the pressure digital values representing 8, the electric signal (D0 period) of one timing length can be sent out first and after the electric signals are interrupted, the electric signals (D1 period) of nine timing lengths can then be sent out.

As shown in FIG. 9G, the period of pausing transmitting electric signals between D0 and D1 is called L2. The length of L2 period can be a default value, such as the timing length of two units. The present invention is not limited to the timing length of transmitting electric signals of pause among each period. These timing lengths of pause can be the same and can also be different.

Figure 9H:
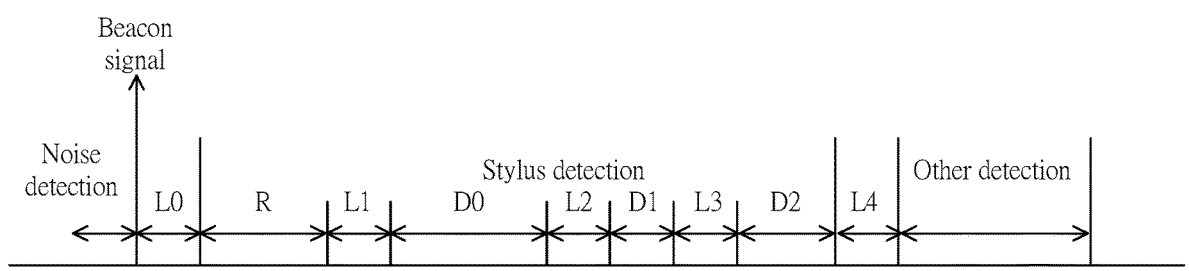
FIG. 9H shows a timing sequence of signal modulation for a transmitter 110 in accordance with an embodiment of the present invention.

Referring to FIG. 9H, it shows a timing sequence of signal modulation for a transmitter 110 in accordance with an embodiment of the present invention. The signal modulation in FIG. 9H can apply to the transmitter 110 shown in FIG. 5. In this embodiment, the periods R, D0, D1, and D2 used for the transmitter 110 to transmit electric signals are unfixed length. Based on the timing length of the detected electric signals, the touch sensitive processing apparatus 130 determines the digital sensing values of each sensor on the transmitter 110. As mentioned above, the transmitter 110 sends out electric signals in periods R, D0, D1, and D2. This invention is not limited to the modulated forms of electric signals.

In the embodiments shown in FIG. 9G and FIG. 9H, the transmitter 110 represents certain value based on the timing length of continuous electric signals sent in one period. This value can be used to represent certain digits in numeral system based on certain number, which represents digital sensing values of certain sensor on the transmitter 110.

Figure 9I:
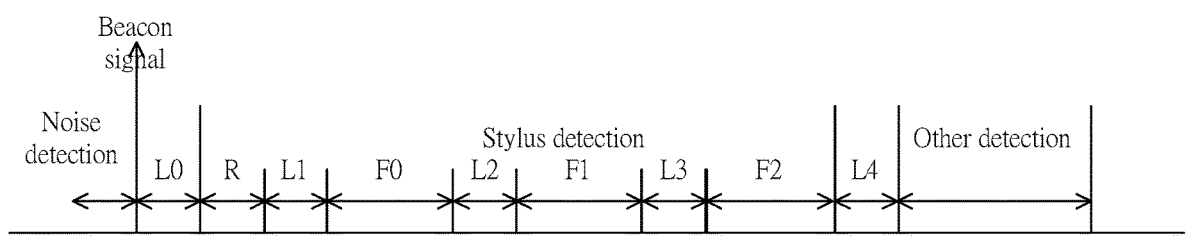
FIG. 9I shows a timing sequence of signal modulation for a transmitter 110 in accordance with an embodiment of the present invention.

As shown in FIG. 9I, it shows a timing sequence of signal modulation for a transmitter 110 in accordance with an embodiment of the present invention. The signal modulation in FIG. 9I can apply to the transmitter 110 shown in FIG. 5. In this embodiment, three fixed timing lengths, the periods F0, F1, and F2, are used respectively to represent three digits in numeral system based on certain number. As shown in FIG. 9I, these three periods can have the same timing lengths and they can have different ones as well.

In this embodiment, the transmitter 110 uses certain frequent signal to represent certain digital in numeral system based on certain number, which represents digital sensing values of certain sensor on the transmitter 110. In one embodiment, the frequency of the signal can be PRF (Pulse Repetition Frequency). For instance, certain PRFx is used as a base, standing for 0. The multiple PRFxN stands for N−1. In addition, the fraction 1/PRFxN stands for N−1. Moreover, the method of looking lookup instead of the multiple can be used to represent certain digital in numeral system based on certain number. The present invention is not limited to the relation between the two PRFs representing the two values. Since PRF is the number of pulse within one period, whether periods F0, F1, and F2 are long or short, as long as the sampling rate of the touch sensitive processing apparatus 130 is high enough, the PRF of signals within these periods can be estimated.

Similarly, the transmitter 110 can use the same way through modulating PRF in period R to modulate the sensing values of other sensors to enable the touch sensitive processing apparatus 130 to acquire the sensing values of other sensors through PRF of period R. The timing length of period R can have the same length to other periods, or it can be different as well.

In one embodiment, the transmitter 110 could transmit stronger electric signals in the state of hovering and transmit weaker electric signals in the state of touching. Consequently, it increases the chance for the touch sensitive processing apparatus 130 detects the transmitter 110 hovering above the touch panel 120. When the transmitter 110 contacts the touch panel 120, it further reduces the power consumption of the transmitter 110.

For examples, in the embodiments shown in FIGS. 9C and 9D, when the tip section 230 is not touched, the electric signal emitted during the R period is stronger than the electric signal emitted during the L1 period which corresponding to the T0 and T1 periods. For instance, during the R period, the electric signals transmitted from the tip section 230 and the ring electrode 550 are from the first signal source 211, the second signal source 212, and the third signal source 513. Therefore, the electric signals transmitted out in the R period are the sum of the outputs of these three signal sources 211, 212, and 513.

In the Table 1 embodiment shown in FIG. 9A, when the transmitter 110 is in the state of hovering, output powers come from the first signal source 211 and the second signal source 212. In the Table 2, when the transmitter 110 is in the state of touching, output powers come from one of the first signal source 211 and the second signal source 212 during the T0 and T1 periods. Hence, the transmitter 110 emits stronger electric signal if the tip section is not touched and emits weaker electric signal if the tip section is pressed.

Similarly, in the Table 3, the transmitter 110 utilizes output powers from both the first signal source 211 and the second signal source 212 in the state of hovering. Instead, in the Table 4, the transmitter 110 in the state of touching makes use of one of the first signal source 211 and the second signal source 212 during the T0 and T1 periods. Hence, the transmitter 110 emits stronger electric signal if the tip section is not touched and emits weaker electric signal if the tip section is pressed.

Figure 10:
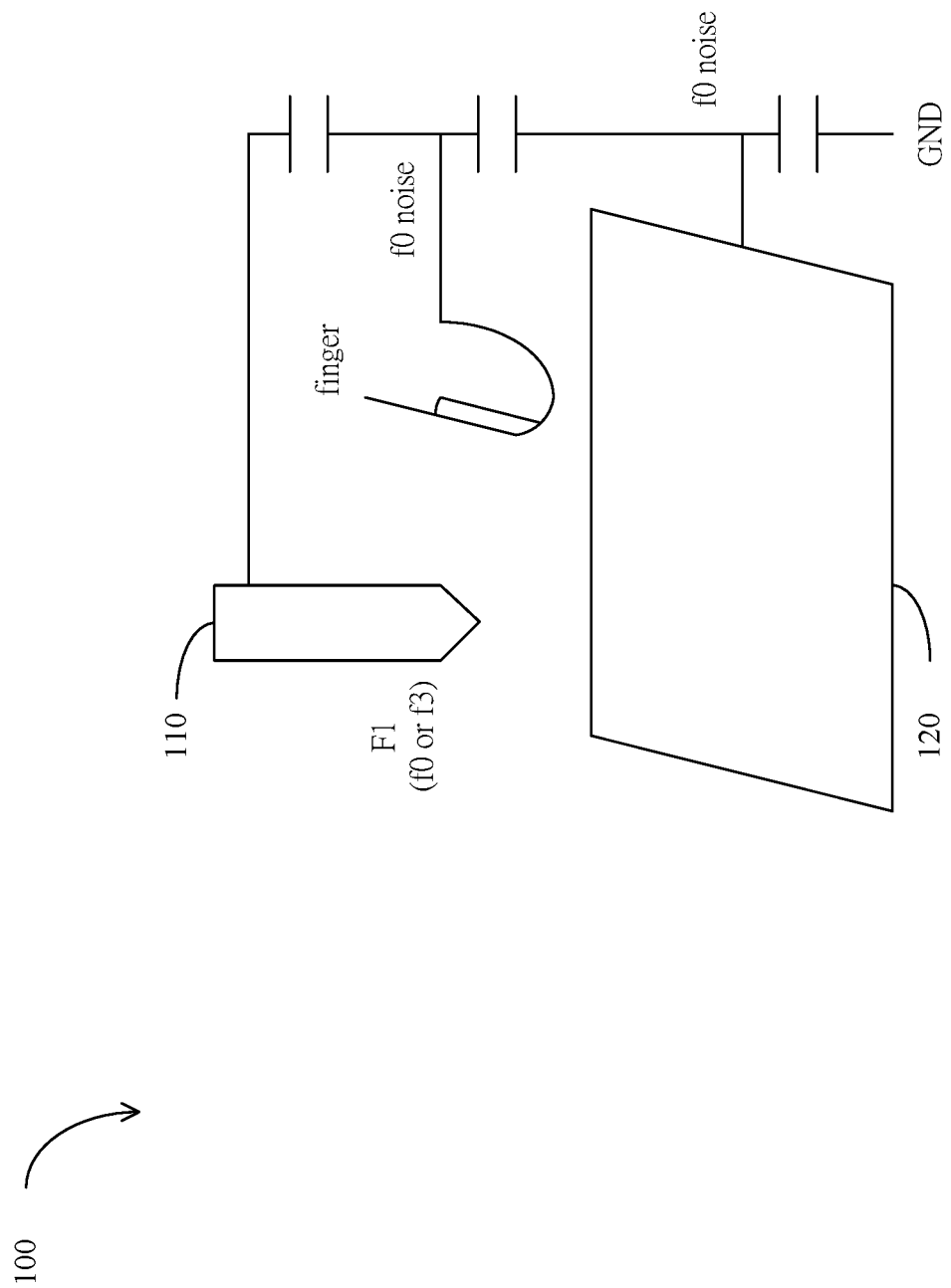
FIG. 10 illustrates noise propagation path in accordance with an embodiment of the present invention.

The reason for adding noise detection process and period in the embodiments shown in FIGS. 9A through 9I is described below. Please refer to FIG. 10, which shows noise propagation path in accordance with an embodiment of the present invention. As shown in FIG. 10, the electronics 100 including the touch panel 120 emits noise signals with frequency f0, which is a member of frequency group F0. It is assumed that the frequency group F0 contains another member frequency f3. When user holds the electronics 100, the noise with frequency f0 would propagate to the touch panel 120 via the user's finger. If no noise detection is performed, the touch panel 120 may take the noise with frequency f0 from the finger as the electric signal emitted by the transmitter 110. Hence, if the noise with frequency f0 could be detected in advanced, it could be filtered out from the signal frame.

In case the transmitter 110 is capable to change frequency, it can automatically transmit signal with another member frequency f3 of the frequency group F0 if the noise with frequency f0 emitted from the touch panel 120 is detected. Consequently, during the periods of signal frame, the touch sensitive processing apparatus 130 detects signal with frequency f3 from the transmitter 110 and noise signal with frequency f0 from the finger. This confuses the touch sensitive processing apparatus 130. Therefore, it can perform a noise detection after the T1 period or the signal frame as the embodiment shown in FIG. 9B. At this moment, since the transmitter 110 ceases transmitting signals with frequency f3 while the noise signal with frequency f0 from the finger and the touch panel 120 stands still, it could be determined by the touch sensitive processing apparatus 130 that the signal with frequency f3 detected during the time frame is the signal come from the transmitter 110.

In one embodiment of this invention, the transmitter 110 receives beacon signals from the touch panel 120 and sends out electric signals to the touch panel 120. On the other hand, the touch panel 120 receives the electric signals from the transmitter 110 and sends out the beacon signals to the transmitter 110. The transmitter 110 and the touch panel 120 can be viewed as two transceivers of the wireless communications, which can both transmit and receive signals. Among the wireless communications, receiving interfering signals or receiving no signal is two situations that need to be taken into consideration when the transceivers receive signals.

In one embodiment, when the transmitter 110 is so far away from the touch panel 120 so that the transmitter 110 couldn't receive the beacon signal from the touch panel 120, the transmitter 110 then stops sending out electric signals. On the other hand, after the touch sensitive processing apparatus 130 sends out beacon signals, if the electric signals from the transmitter 110 are not detected, the power-saving mode will be launched to pause transmitting the beacon signals or reducing sending out the frequency of the beacon signals.

The above-mentioned beacon signals can have many varieties of frequencies and specific modulated ways, such as the modulated ways of ASK, QPSK or BPSK, etc. According to the specifically frequency and modulated ways, the transmitter 110 can determine if it is interfered by the noise. For example, if the signals demodulated by the transmitter 110 include not only the signals defined in advance but also other signals, the beacon signals can be regarded as being interfered. In other examples, if the demodulated signals only include one part of the previously-defined signals without other parts included, the beacon signals can also be regarded as being interfered. Since the interfered aspect of the received signals from the judgement of the receiver has been a well-known skill to those skilled in the art, the examples will not be listed here. The present invention is not limited to how the transmitter 110 determines the interfered ways of the beacon signals. Likewise, the present invention lists many modulated types of the electric signals. Similarly, the present invention is not limited to how the touch sensitive processing apparatus 130 determines the interfered ways of the electric signals.

In one embodiment, when the transceivers determine the signals, which are going to be received, being interfered, another frequency will be automatically switched to receive signals.

Figure 34A:
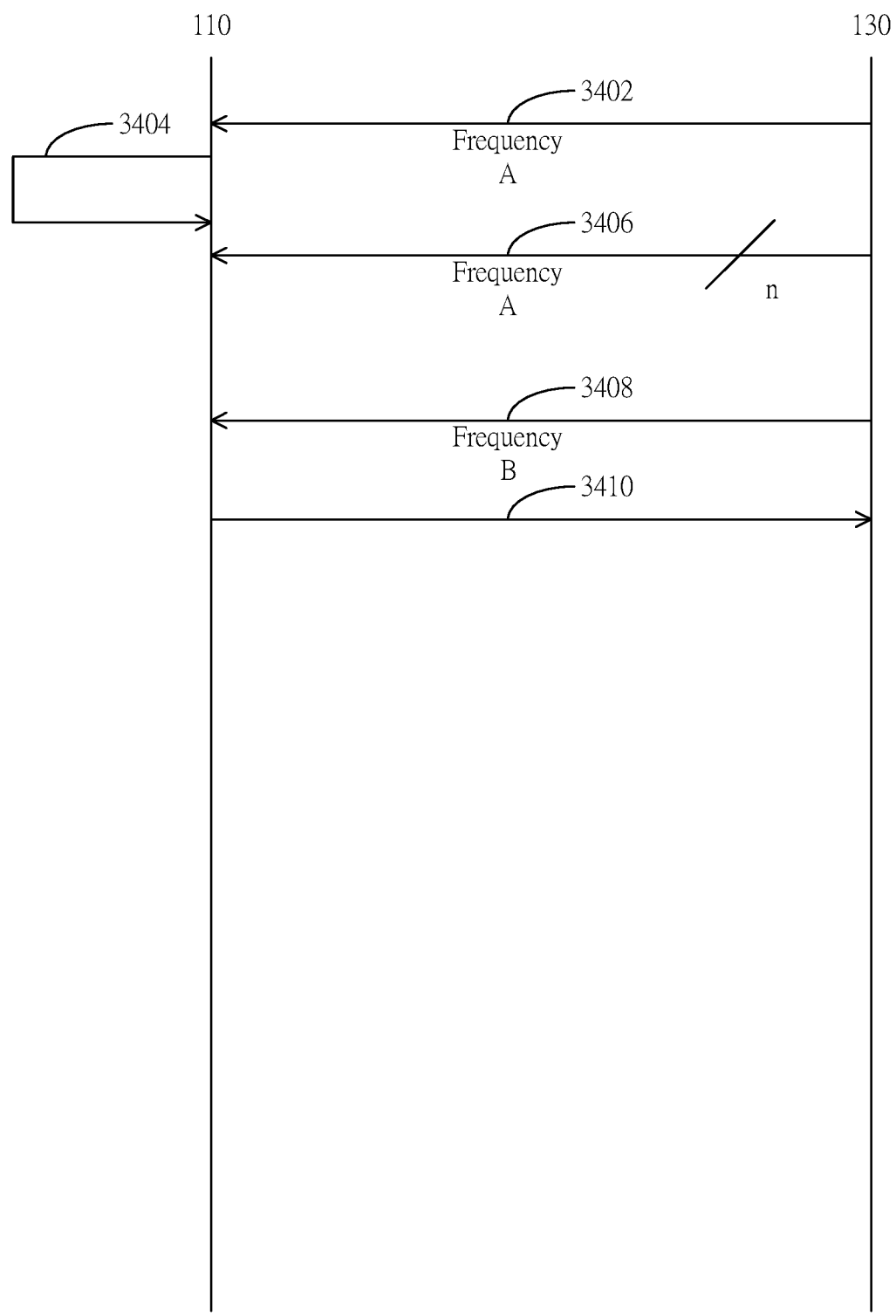
FIG. 34A shows a flow chart of a touch sensitive system processing interference in accordance with an embodiment of the present invention.

Referring to FIG. 34A, it shows a flow chart of a touch sensitive system processing interference in accordance with an embodiment of the present invention. Assumed the beacon signals can be one of the two frequencies, these two frequencies are respectively named frequency A and frequency B. As the step 3402, the touch sensitive processing apparatus 130 sends out the beacon signals with frequency A. Later on, as the step 3404, when the transmitter 110 intends to receive the beacon signals with frequency A and finds interference, the transmitter 110 doesn't send out the electric signals but receive the beacon signals with frequency B instead. In the optional step 3406, the touch sensitive processing apparatus 130 sends out the beacon signals with frequency A one time or many times without receiving any electric signals, and then in step 3408, the touch sensitive processing apparatus 130 changes to send out the beacon signals with frequency B. By doing so, the transmitter 110 can successfully receive the beacon signals with frequency B and then sends out the electric signals in step 3410.

Since the touch sensitive processing apparatus 130 cannot receive the electric signals sent by the transmitter 110, which means the beacon signals sent out by itself are under interference, it then switches the beacon signal frequency. Another possible reason is because the transmitter 110 has not been in the area of receiving beacon signals, the touch sensitive processing apparatus 130 can pause sending out beacon signals or prolong the interval among sending out beacon signals to reduce power consumption after all the possible frequencies are switched.

Figure 34B:
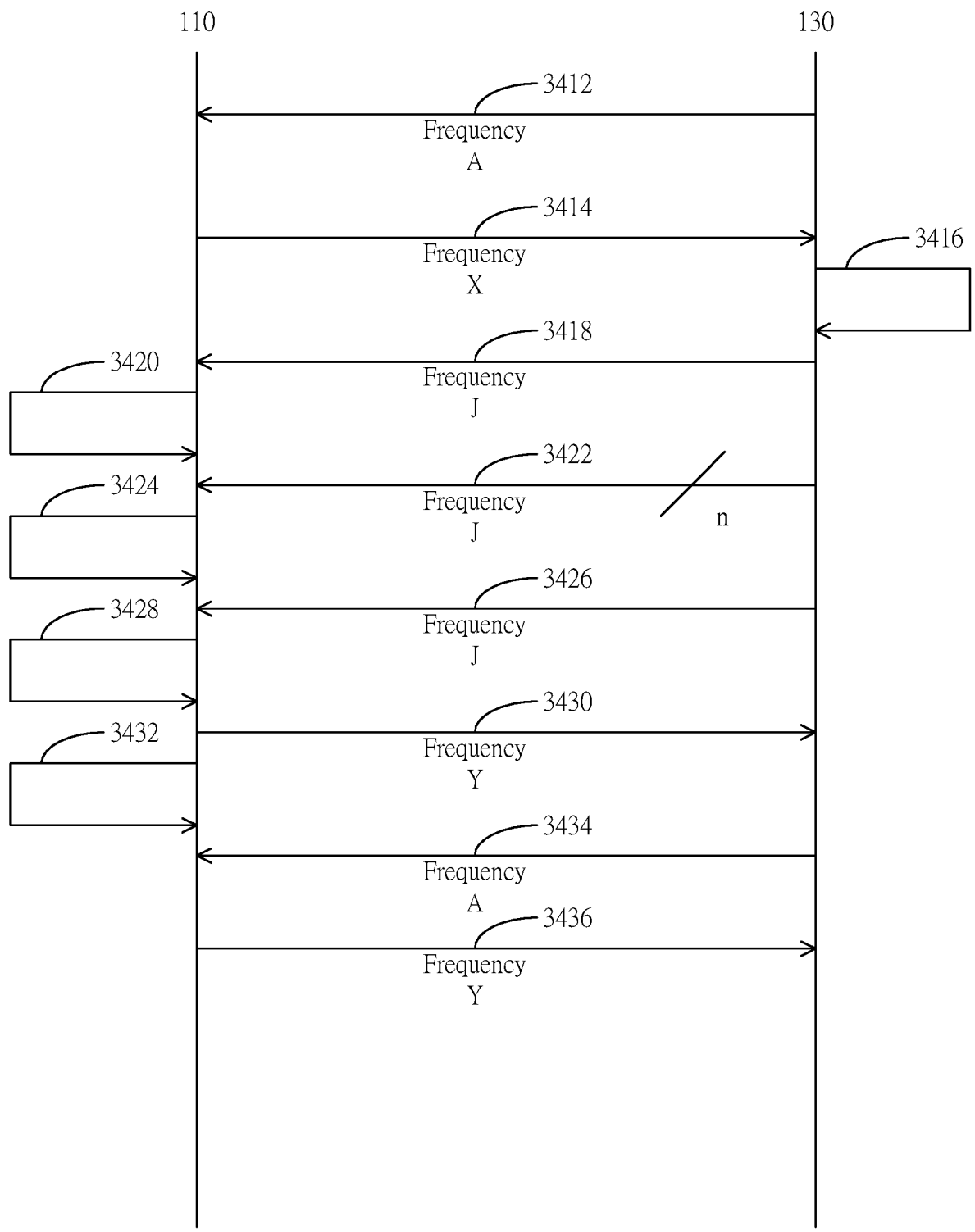
FIG. 34B shows a flow chart of a touch sensitive system processing interference in accordance with an embodiment of the present invention.

Similarly, referring to FIG. 34B, it shows a flow chart of a touch sensitive system processing interference in accordance with an embodiment of the present invention. Assumed the beacon signals can be one of the three frequencies, these three frequencies are respectively named frequency A, frequency B, and frequency J. Frequencies A and B are normal frequencies of the beacon signals, and frequency J is a specially cautious frequency, representing the electric signals received by the touch sensitive processing apparatus 130 being interfered. The electric signals can be one of the three frequencies, respectively called frequency X, frequency Y, and frequency Z.

In step 3412, the touch sensitive processing apparatus 130 sends out the beacon signals with frequency A. Later on, in step 3414, the transmitter 110 successfully receives the beacon signals with frequency A and sends out the electric signals with frequency X. When the touch sensitive processing apparatus 130 determines the electric signals with frequency X being interfered in step 3416, the touch sensitive processing apparatus 130, in step 3418, sends out the beacon signals with frequency J to show interference of the electric signals with frequency X. When the transmitter 110 cannot receive the beacon signals with frequency A, in step 3422 it switches to receive the beacon signals with frequency B. In step 3422, the touch sensitive processing apparatus 130 continuously sends out the beacon signals with frequency J to represent the inference of the electric signals with frequency X. When the transmitter 110 cannot receive the beacon signals with frequency B, in step 3424 it switches to receive the beacon signals with frequency J. In step 3426, when the beacon signals with frequency J sent out by the touch sensitive processing apparatus 130 are successfully received by the transmitter 110, the transmitter 110 then in step 3428 switches the electric signals' transmitting frequencies from frequency X to frequency Y and in step 3430 sends out the electric signals with frequency Y.

In one embodiment, as shown in FIG. 34 B, in step 3432, the transmitter 110 makes the frequencies of the beacon signals for receiving switch from frequency J to original frequency A. Since the electric signals with frequency Y are not interfered, the touch sensitive processing apparatus 130 doesn't send out the beacon signals with frequency J. On the other hand, in step 3434, it switches to send out the original beacon signals with frequency A. The transmitter 110 successfully receives the beacon signals with frequency A and sends out the electric signals with new frequency J in step 3436. The touch sensitive processing apparatus 130 successfully uses the beacon signals with frequency J to inform the transmitter 110 to switch frequencies of the electric signals.

In one embodiment, the transmitter 110, not necessarily mentioned as in step 3432, switches the frequencies of the beacon signals for receiving from frequency J to original frequency A. Instead, it continues to detect beacon signals with frequency J. However, since the touch sensitive processing apparatus 130 doesn't send out the beacon signals with frequency J, the transmitter 110 cannot receive them and then switches to the power-saving mode. When the transmitter 110 restarts, it will restore to the state of receiving the beacon signals with frequency A.

In one embodiment, assumed the electric signals with frequency Y are still interfered, the touch sensitive processing apparatus 130 sends out the beacon signals with frequency J similarly. When the transmitter 110 receives the beacon signals with frequency J again through the mechanism of receiving beacon signal frequencies that are switched automatically, the frequencies of the electric signals are switched from frequency Y to frequency Z.

In short, when the touch sensitive processing apparatus 130 determines the electric signals of the received frequencies being interfered, it can inform the transmitter 110 to switch the frequencies of the electric signals through sending out the beacon signals with one specific frequency or one specifically modulated form.

In one embodiment, the transceivers can actively scan the interfered channels and then choose the frequencies of the transmitting and receiving signals based on the order that the two sides of communication know.

Figure 34C:
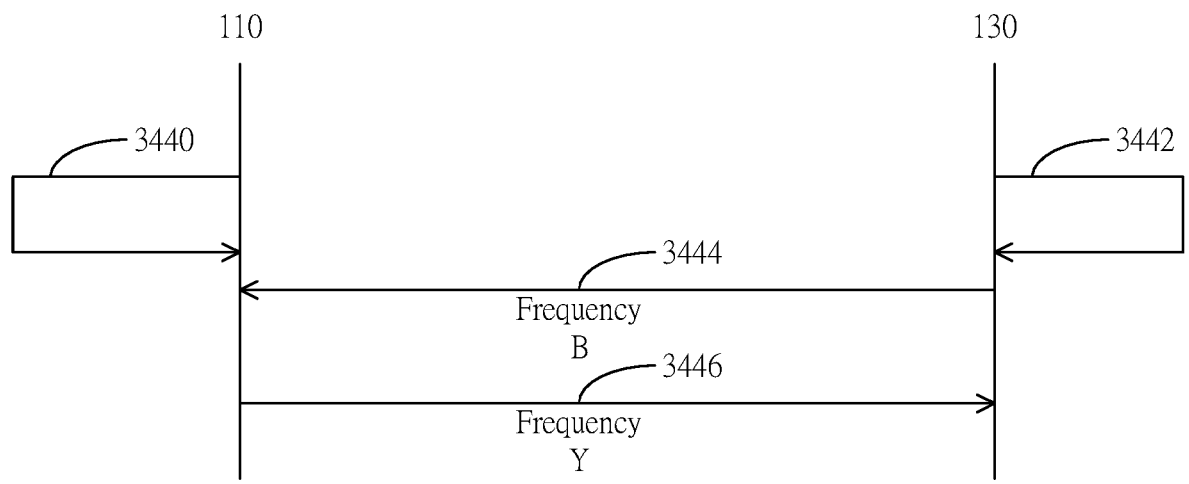
FIG. 34C shows a flow chart of a touch sensitive system processing interference in accordance with an embodiment of the present invention.

Referring to FIG. 34C, it shows a flow chart of a touch sensitive system processing interference in accordance with an embodiment of the present invention. In this embodiment, the possible frequencies of the beacon signals include frequency A, and frequency B, and the frequencies of the electric signals include frequency X, frequency Y, and frequency Z. Therefore, these two signals include six combinations. Assumed the order is AX, AY, AZ, BX, BY, and BZ, the transmitter 110 and the touch sensitive processing apparatus 130 perform the steps of scanning interference in step 3440 and 3442, respectively. For example, the possible interfering frequencies of the beacon signals are first scanned and the possible interfering frequencies of the electric signals are scanned later, that is, the orders of frequencies A, B, X, Y, and Z are scanned one after one. In this embodiment, assumed the transmitter 110 and the touch sensitive processing apparatus 130 respectively find frequency A and frequency X have interfered signals or noises, based on the above-mentioned orders, these four combinations of these two interfered frequencies are deleted. Namely, there are only two combinations, BY and BZ, left. Since the order of BY is earlier than BZ, the two sides have chosen the combination BY respectively in step 3440 and in step 3442. In other words, when the touch sensitive processing apparatus 130 is scheduled to send out the beacon signals with frequency B and is ready to receive the electric signals with frequency Y. And, the transmitter 110 prepares to receive the beacon signals with frequency B and prepares to send out the electric signal with frequency Y. Accordingly, the touch sensitive processing apparatus 130 sends out the beacon signals with frequency B in step 3444 and the transmitter 110 sends out the electric signals with frequency Y in step 3446 immediately.

In some cases, for example, the interference source from different distances to both sides may cause the transmitter 110 and the touch sensitive processing apparatus 130 to get not always the same interfering frequency after actively scanning. For instance, the transmitter 110 only scans the interfering signals of frequency A and the touch sensitive processing apparatus 130 only scans the interfering signals of frequency X. In these situations, the first combination the transmitter 110 get may be BX and the first combination the touch sensitive processing apparatus 130 get may be AY. In spite of this, the mechanism that the two sides still depend on the receiving frequencies of the above-mentioned automatic switching and on sending out beacon signals with frequency J makes the final communication frequencies be able to adjust to the combination BY.

Figure 34D:
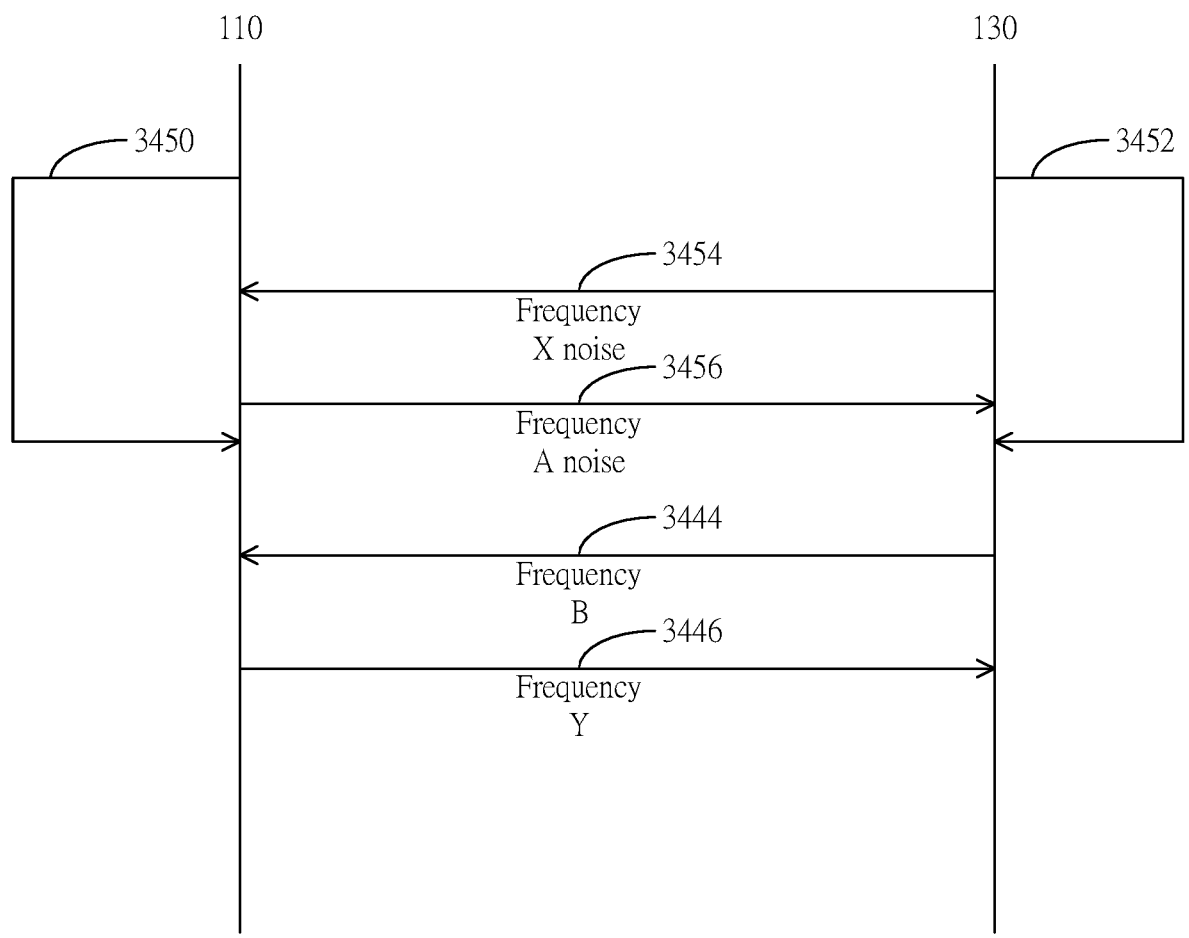
FIG. 34D shows a flow chart of a touch sensitive system processing interference in accordance with an embodiment of the present invention.

In one embodiment, the purpose to accelerate the above-mentioned process is to make the transceivers detect the interfered frequencies first and then transmit the noise of the interfered frequencies to make the other side detect. Referring to FIG. 34D, it shows a flow chart of a touch sensitive system processing interference in accordance with an embodiment of the present invention. The difference from the embodiment of FIG. 34C is that the transmitter 110 scans the interfered signals of frequency A in step 3450, so it sends out noise of frequency A in step 3456 to let the touch sensitive processing apparatus 130 detect. On the contrary, the touch sensitive processing apparatus 130 in step 3452 scans the interfered signals of frequency X. Accordingly, in step 3454 it sends out noise of frequency X to let the transmitter 110 detect. By doing so, after the detecting steps finish, the two sides all scan that there are interfered signals or noise from frequency A and frequency X. Therefore, as the embodiment shown in FIG. 34C, the two sides coincidentally or independently choose BY combination and repeat the step 3444 and the step 3446.

Although the only two scanning steps 3450 and 3452 are described in FIG. 34D, in real situation, the active scanning may not just scan all frequencies one time, it can scan two or even more times lest it miss the signals of the interfered frequencies deliberately transmitted form the other side.

Besides, although in the embodiment shown in FIG. 34D the two scanning steps 3450 and 3452 start and finish at the same time, they can start and finish at different time. The periods that the two scanning steps take are not always the same and the times of the scanning frequency can be different. In spite of the fact that in some situations the other side may miss the signals of transmitted interfered frequencies, in most cases the combinations of the more interfered frequencies can be deleted to make both sides adjust more quickly to undisturbed frequency in order to proceed communication.

In the embodiments of FIG. 34C and FIG. 34D, both sides have the ability of actively scanning. Especially in the embodiment of FIG. 34D, both sides have the ability to actively send out signals of the interfered frequencies. However, in this invention the ability of both sides is not limited to be equal. In one embodiment, the transmitter 110 can have the abilities to actively scan and actively send out signals of the interfered frequencies. On the other hand, the touch sensitive processing apparatus 130 can only have the ability of actively scanning. In this embodiment, although the touch sensitive processing apparatus 130 lacks the ability to actively send out signals of the interfered frequencies, compared with the embodiment in FIG. 34C, these two sides have more chances to even more quickly find out the frequencies that are undisturbed for both sides to proceed communication. On the contrary, in another embodiment, the touch sensitive processing apparatus 130 have the abilities to actively scan and actively send out signals of the interfered frequencies and the transmitter 110 only have the ability of actively scanning. But, compared with the embodiment in FIG. 34C, the two sides have more chances to even more quickly find out the undisturbed frequencies for both sides to communicate.

Similarly, when one of the two sides doesn't have the ability to actively scan and the other has the ability to scan actively, compared with the embodiments in FIG. 34A and FIG. 34B, it can have more chances to even more quickly find out the undisturbed frequencies for both sides to proceed communication.

It is mentioned in the description related to FIG. 2 that the signal strength ratio is changed according to impedance variation of the first component 221. Please refer to FIG. 11, which depicts a structure diagram of a first capacitor 221 in accordance with an embodiment of the present invention. By changing the impedance of the first capacitor 221 to adjust the signal strength ratio of multiple frequencies. Traditional capacitor is formed by two plates of conducting metal. The capacitance C is proportional to the permittivity and the plate areas and inversely proportional to the distance between these two plates.

One aspect of the embodiment is to use a mechanic structure for transforming a displacement along the axis of the transmitter 110 to another displacement vertical or angled to the axis. By creating the displacement, the capacitance and first impedance $Z_1$ of the first capacitor 221 are changed accordingly while keeps the capacitance and second impedance $Z_2$ of the second capacitor 222 intact, such that the ratio between the signal strength M1 with first frequency (group) and the signal strength M2 with second frequency (group).

Figure 11:
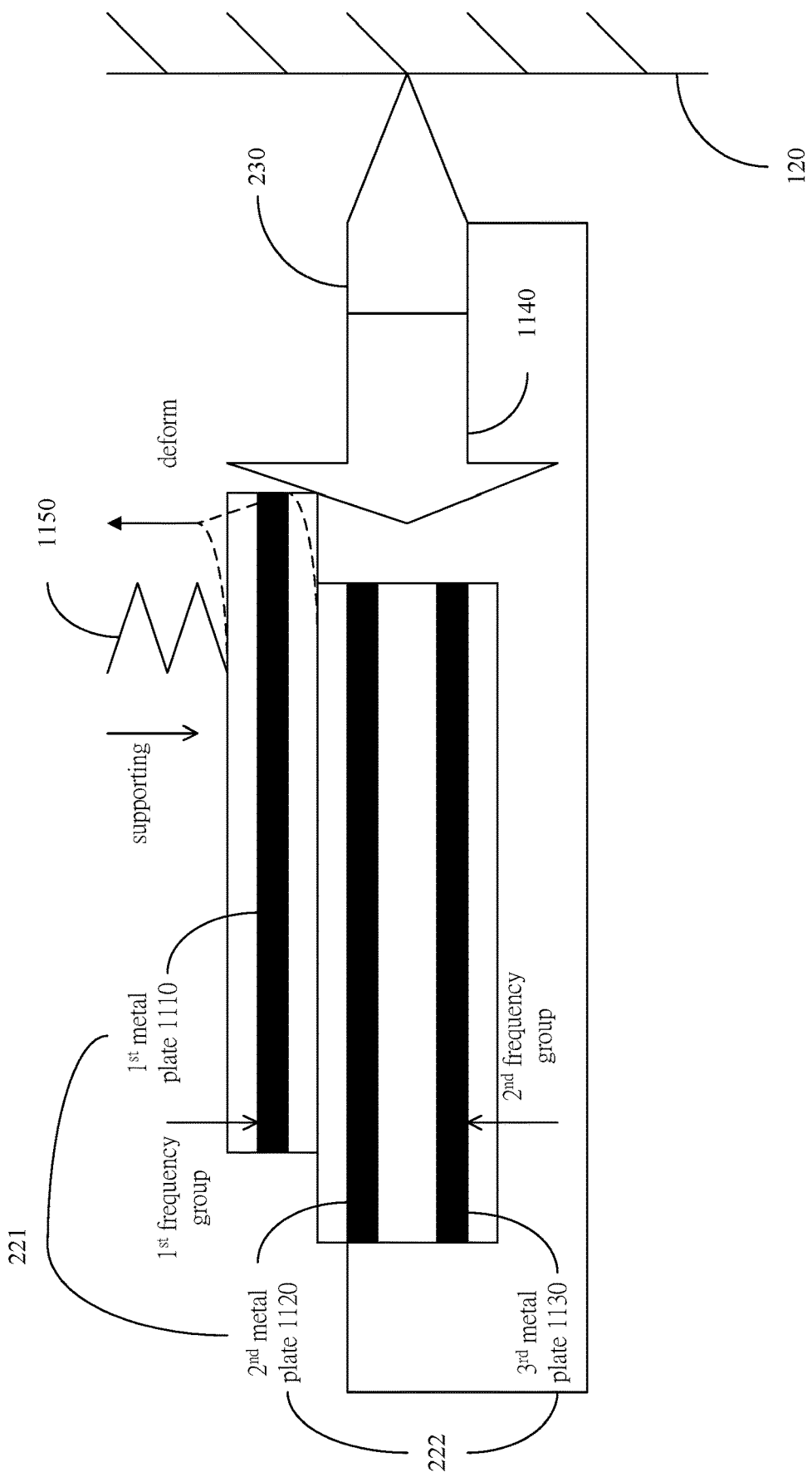
FIG. 11 illustrates a structure diagram of a first capacitor 221 in accordance with an embodiment of the present invention.

There exist three non-contacting metal plates shown in FIG. 11. The first capacitor 221 is formed by a first metal plate 1110 and a second metal plate 1120. The second capacitor 222 is formed by the second metal plate 1120 and a third metal plate 1130. In one instance, the first metal plate 1110 is formed on a flexible circuit board or printed circuit board which covers with insulating paint or dielectric plate. The second metal plate 1120 and the third metal plate 1130 are formed in the double sides of the same circuit board or printed circuit board which also covers with insulating paint or dielectric plate. The second metal plate 1120 is coupled to the fore-end tip section 230 through wiring. The tip is attached to a lifting element 1140 (e.g. the ramp means). A movement of the tip can directly or indirectly deform whole or part of the first metal plate 1110 (and flexible circuit board or PCB) such that a displacement vertical to along the axis of the transmitter 110 or stylus is created accordingly.

The first metal plate 1110 is supplied with electric signal with first frequency (group) and the third metal plate 1130 is supplied with electric signal with second frequency (group). Therefore current induced in the second metal plate 1120 generates signals with the first frequency (group) and the second frequency (group) which is sent to the touch panel 120 via the fore-end tip section 230. When the tip section 230 is not pressed, the first metal plate 1110 and its circuit board do not have a displacement vertical to the axis of the transmitter 110. However, when the tip section 230 is pressed, the ramp means 1140 transforms the force parallel to the axis to the direction vertical to the axis such that the circuit board of the first metal plate 1110 deforms and moves. Furthermore, the permittivity of the first capacitor 221 changes accordingly, so do the capacitance C1 and impedance $Z_1$ of the first capacitor 221. When the tip section 230 is pressed, the circuit board of the second metal plate 1120 and the third metal plate 1130 moves as a whole. Therefore the capacitance C2 and impedance $Z_2$ of the second capacitor 222 remains the same.

Since the circuit board of the first metal plate 1110 deforms upward, the embodiment may include at least one supporting element 1150 to provide support downward for helping the circuit board of the first metal plate 1110 recover to the original shape after the pressure to the tip section 230 is dismissed. When the circuit board is not deformed, the supporting force provided by the supporting element may be zero.

In one example of the present embodiment, the capacitances of the first capacitor 221 and the second capacitor 222 may be designed to be equal. If so, the permittivity, distance, and area of these two capacitors are the same. However, the present invention does not limit to the condition. It only requires that the touch sensitive processing apparatus 130 knows about the impedance ratio between these two capacitors of the transmitter 110.

In this embodiment, expensive force sensing resistor is replaced by cheaper circuit board or PCB. Besides, if the capacitances of the first capacitor 221 and the second capacitor 222 are designed to be equal, permittivity of these two capacitors 221 and 222 would be varied in the same rate due to environmental change. Hence the default ratio could be maintained consequently. Besides, it does not require any active controlling component to adjust the ratio of these two impedances $Z_1$ and $Z_2$. The transmitter 110 could provide electric signal passively. So many resources could be saved.

Figure 12:
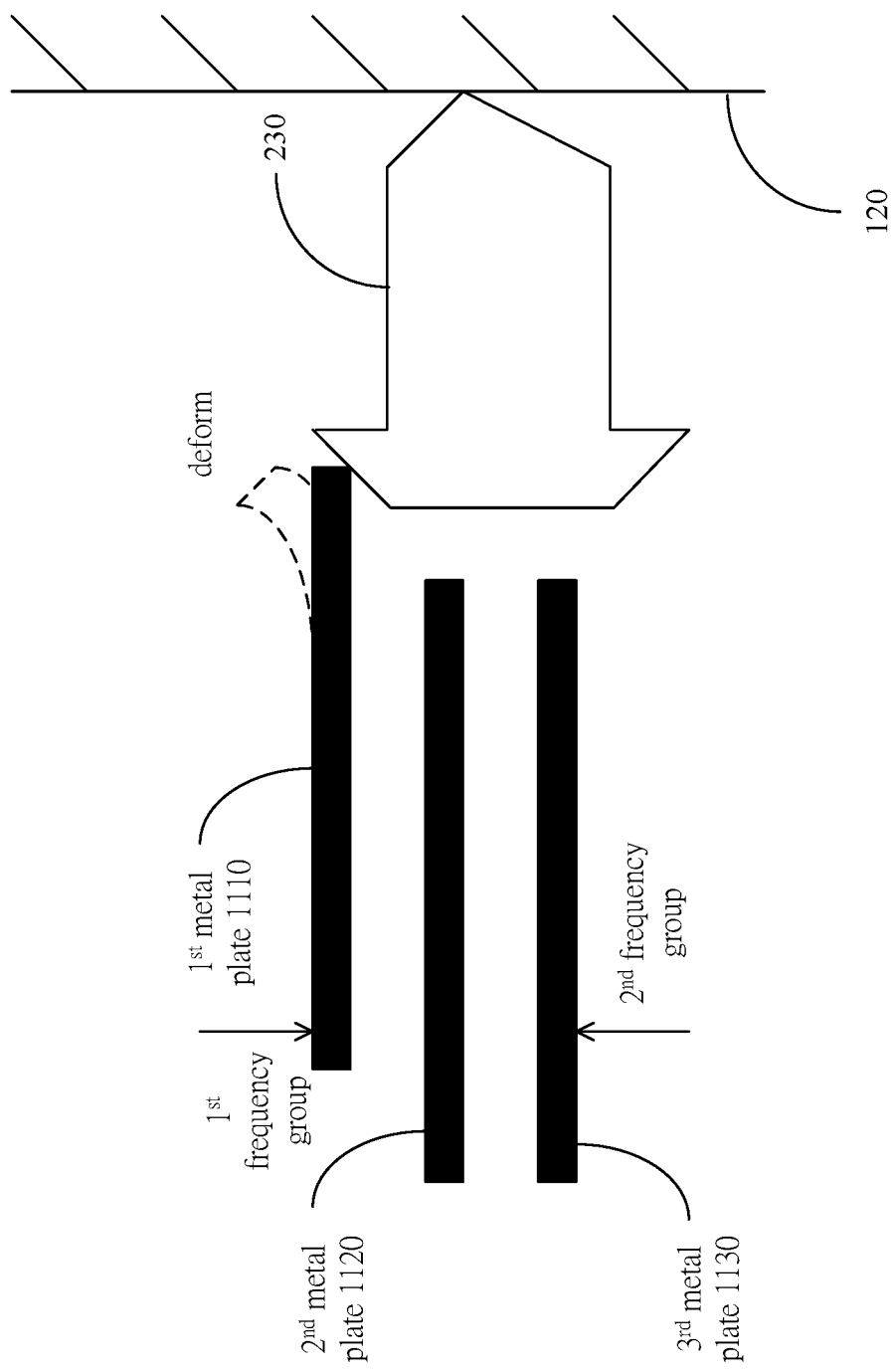
FIG. 12 illustrates a diagram of reduced embodiment shown in FIG. 11.

Please refer to FIG. 12, which shows a diagram of reduced embodiment shown in FIG. 11. The circuit board, supporting element 1150, and the wiring between the second metal plate 1120 and the tip section 230 are omitted. The description of embodiment shown in FIG. 12 can refer to those for FIG. 11.

Figure 13:
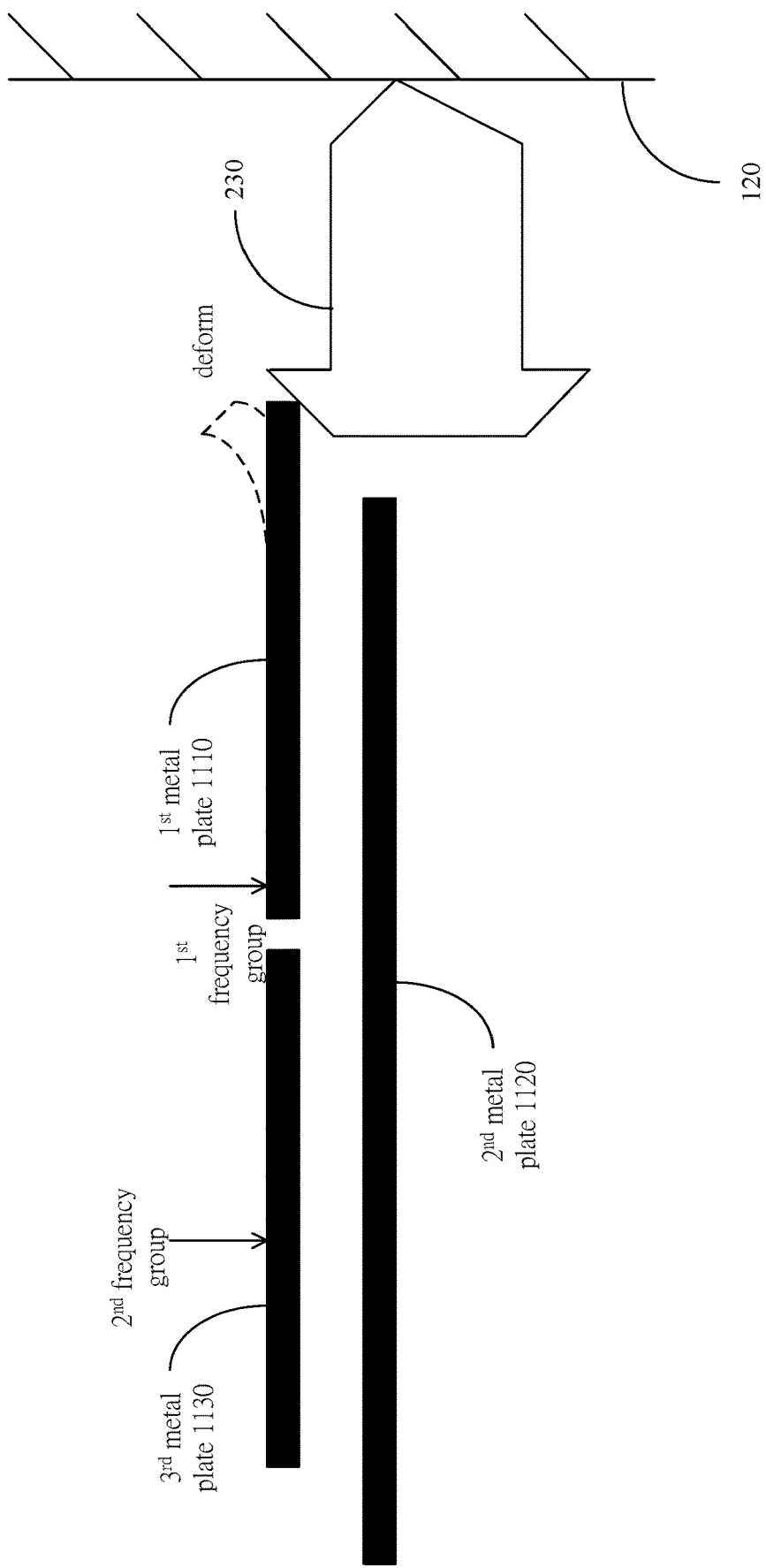
FIG. 13 is a variation of the embodiment shown in FIG. 12.

Please refer to FIG. 13, which is a variation of the embodiment shown in FIG. 12. The third metal plate 1130 is moved to the position behind the first metal plate 1110 and they are not electrically coupled. When the tip section 230 is pressed, only the first metal plate 1110 and its circuit board deform. In some examples, the first metal plate 1110 and the third metal plate 1130 may be formed on the same circuit board.

Figure 14:
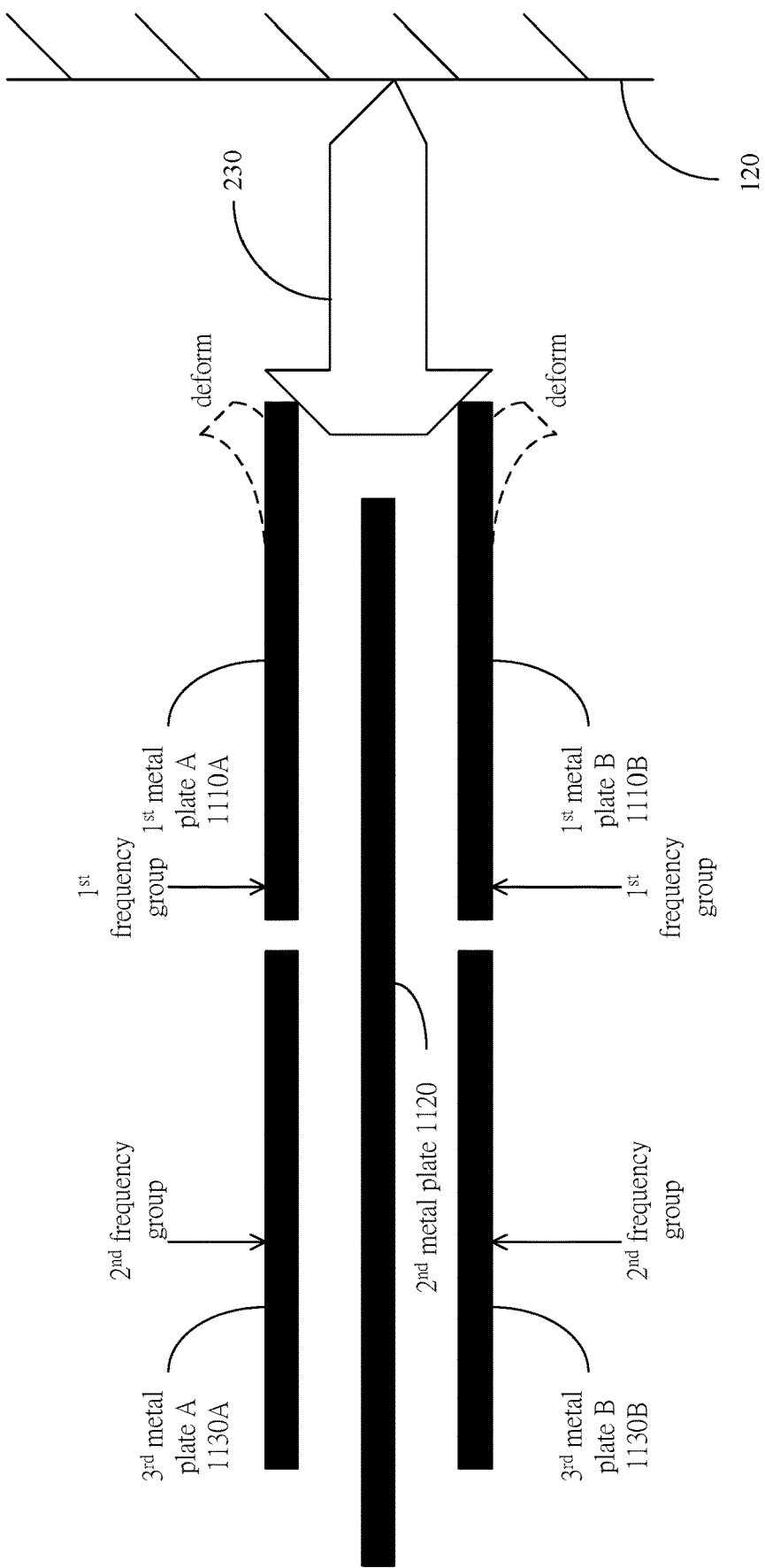
FIG. 14 is a variation of the embodiment shown in FIG. 13.

Please refer to FIG. 14, which is a variation of the embodiment shown in FIG. 13. The first metal plate 1110 and the third metal plate 1130 comprise two plates A and B, respectively. They are feed into signals with first frequency (group) and second frequency (group), respectively. When the tip section 230 is pressed, the first metal plate A 1110A, the first metal plate B 1110B, and their circuit board deforms, but the third metal plate A 1130A, the third metal plate B 1130B, and their circuit board do not deform. Comparing with the embodiment shown in FIG. 13, since there are two deforming metal plates 1110A and 1110B, the impedance variation would be larger and more obvious than the variation of the embodiment shown in FIG. 13.

Figure 15:
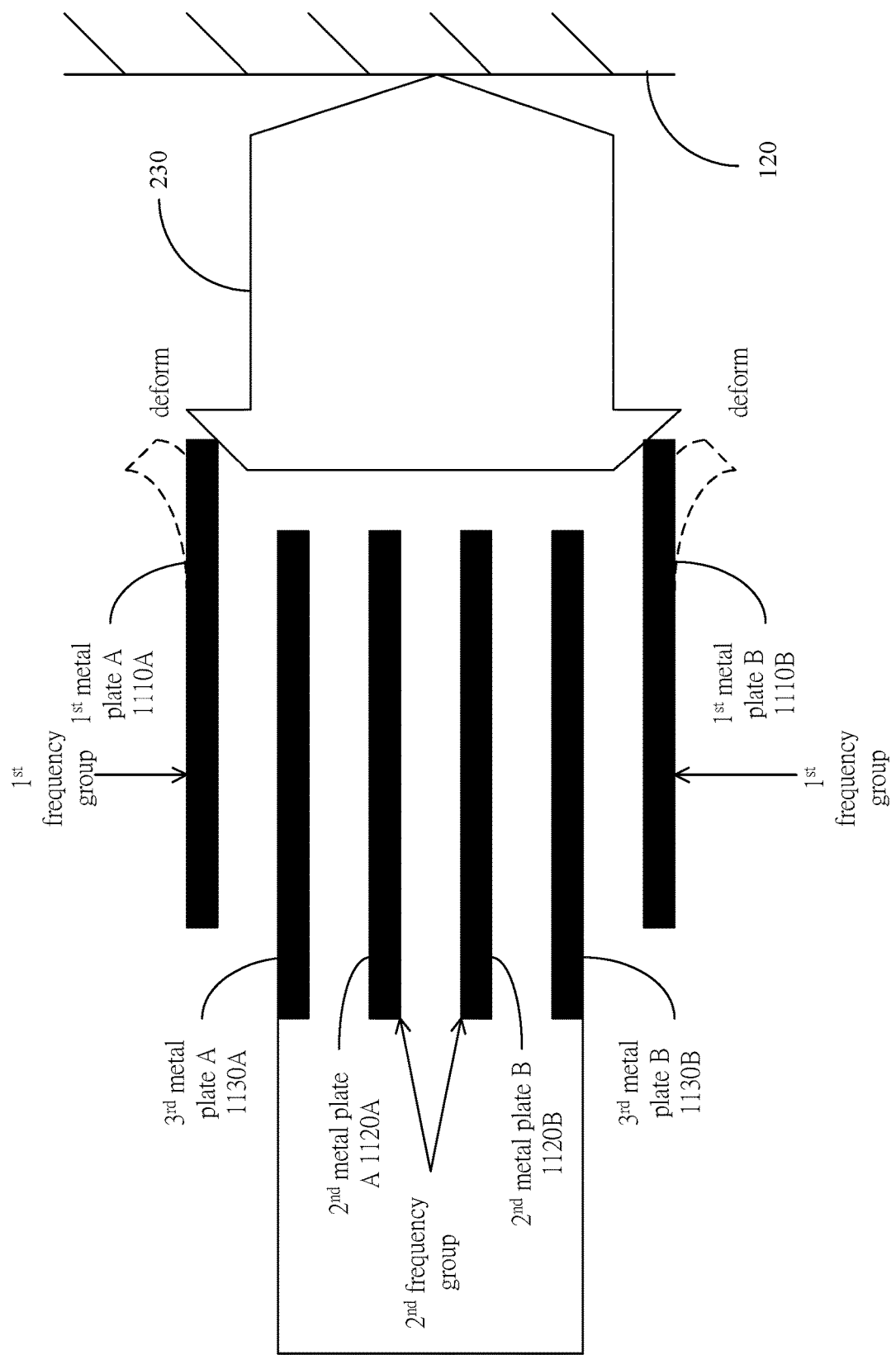
FIG. 15 is a variation of the embodiment shown in FIG. 14.

Please refer to FIG. 15, which is a variation of the embodiment shown in FIG. 14. The second metal plate 1120 also comprise two plate A 1120A and plate B 1120B, which are coupled to the tip section 230 through wiring. A first capacitor A 221A is formed by the first metal plate A 1110A and the second metal A 1120A. A second capacitor A 222A is formed by the second metal plate A 1120A and the third metal plate A 1130A. A first capacitor B 221B is formed by the first metal plate B 1110B and the second metal B 1120B. A second capacitor B 222B is formed by the second metal plate B 1120B and the third metal plate B 1130B. When the tip section is pressed, the first metal plate A 1110A, the first metal plate B 1110B, and their circuit boards deform. However, the third metal plate A 1130A, the third metal plate B 1130B, and their circuit boards remains the same. Comparing with the embodiment shown in FIG. 13, since there are two deforming metal plates 1110A and 1110B, the impedance variation would be larger and more obvious than the variation of the embodiment shown in FIG. 13.

Figure 16A:
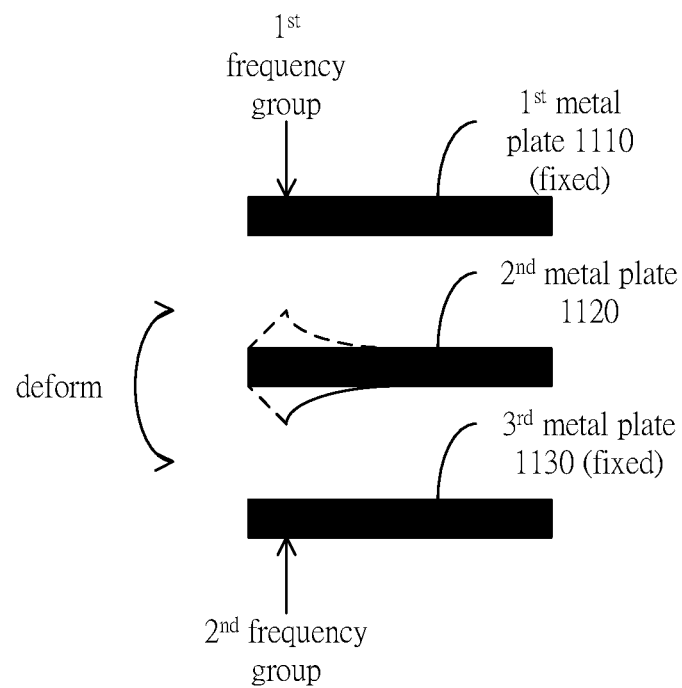
FIG. 16A illustrates a diagram in accordance with an embodiment of the present invention.

Please refer to FIG. 16A, which shows a structure in accordance with an embodiment of the present invention. In the embodiment shown in FIG. 16A, there are a first metal plate 1110, a second metal plate 1120, and a third metal plate 1130 from top to bottom. The first metal plate 1110 and the third metal plate 1130 are fixed and fed in signals with first frequency (group) and second frequency (group), respectively. Current induced from the second metal plate 1120 generates electric signals mixed with first frequency (group) and second frequency (group).

A first capacitor 221 is formed by the first metal plate 1110 and the second metal plate 1120. A second capacitor 222 is formed by the second metal plate 1120 and the third metal plate 1130. When the second metal plate 1120 is not deformed, the impedances of the first capacitor 221 and the second capacitor 222 are fixed in the same environment. Hence a strength ratio of signal with first frequency (group) and signal with second frequency (group) contained in the electric signal could be calculated. If the ratio is a predetermined value or falls into a predetermined range, it is concluded that the second metal plate 1120 is not deformed.

If the second metal plate 1120 deforms, the impedances and capacitances of the first capacitor 221 and the second capacitor 222 change accordingly. In consequence, a strength ratio could be calculated according to these two signal strength values. Based on the variation of the ratio, the deforming and displacement of the second metal plate 1120 could be calculated. Steps shown in the embodiment of FIG. 6 could be applicable here.

Figure 16B:
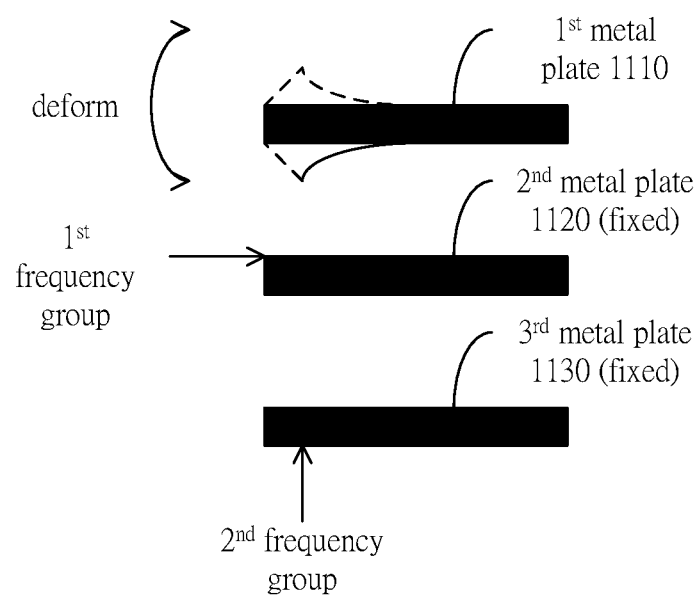
FIG. 16B is a variation of the embodiment shown in FIG. 16A.

Please refer to FIG. 16B, which is a variation of the embodiment shown in FIG. 16A. The second metal plate 1120 and the third metal plate 1130 are fixed and fed in signals with first frequency (group) and second frequency (group), respectively. Current induced from the first metal plate 1110 generates electric signals mixed with first frequency (group) and second frequency (group).

A first capacitor 221 is formed by the first metal plate 1110 and the second metal plate 1120. A second capacitor 222 is formed by the first metal plate 1110 and the third metal plate 1130. When the first metal plate 1110 is not deformed, the impedances of the first capacitor 221 and the second capacitor 222 are fixed in the same environment. Hence a strength ratio of signal with first frequency (group) and signal with second frequency (group) contained in the electric signal could be calculated. If the ratio is a predetermined value or falls into a predetermined range, it is concluded that the first metal plate 1110 is not deformed.

If the first metal plate 1110 deforms, the impedances and capacitances of the first capacitor 221 and the second capacitor 222 change accordingly. In consequence, a strength ratio could be calculated according to these two signal strength values. Based on the variation of the ratio, the deforming and displacement of the first metal plate 1110 could be calculated. Steps shown in the embodiment of FIG. 6 could be applicable here. The impedance may be changed according to variations of temperature and humanity. However, both impedances of the first capacitor 221 and the second capacitor 222 change together according to the environmental variations of temperature and humanity. Therefore, influence on the ratio caused by temperature and humanity could be reduced or eliminated.

Figure 17A:
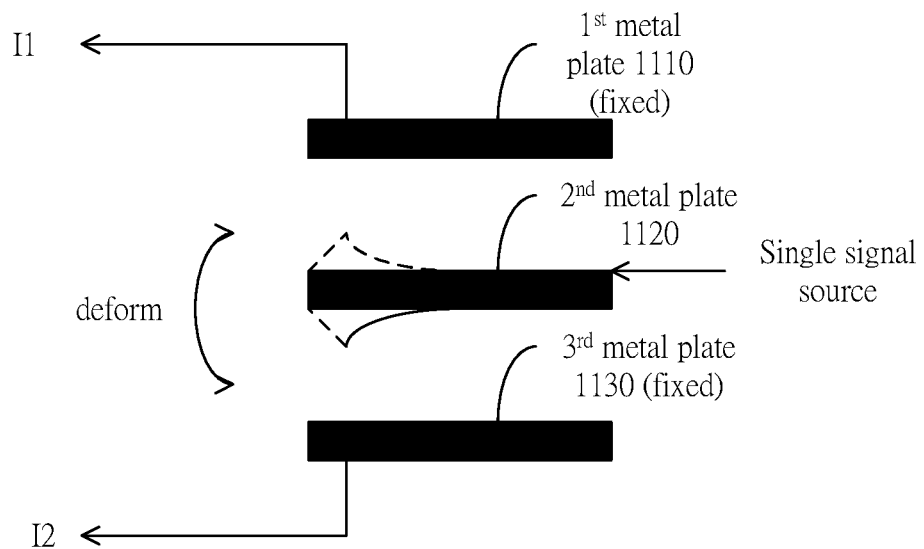
FIGS. 17A and 17B respectively show structural diagrams of the first capacitor and the second capacitor in accordance with the embodiments of the present invention.
Figure 17B:
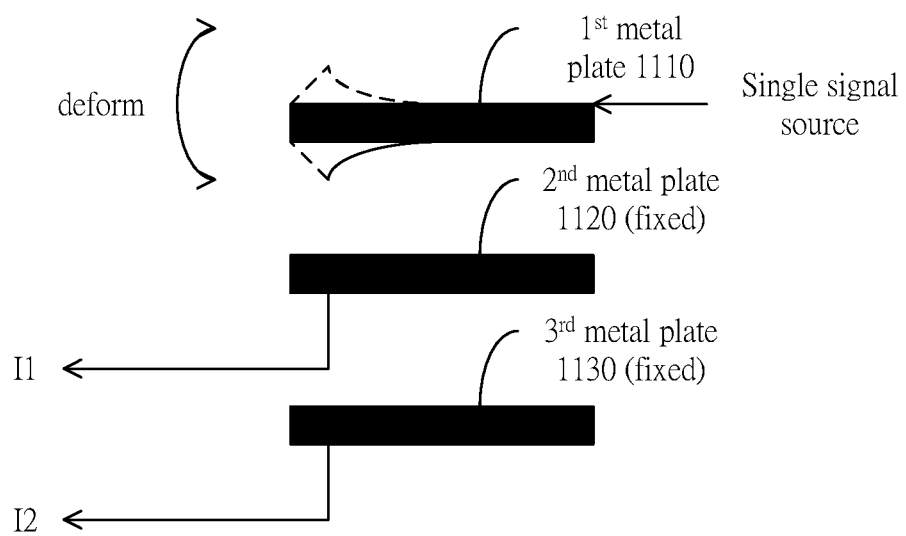

Please refer to FIGS. 17A and 17B, which show structural diagrams of the first capacitor and the second capacitor in accordance with an embodiment of the present invention. In the embodiment shown in FIGS. 16A and 16B, signals with first frequency (group) and second frequency (group) are fed. However, in the embodiment shown in FIGS. 17A and 17B, a driving signal with the same frequency is fed. In other words, the embodiments can be applicable to those embodiments shown in FIGS. 7A through 7D. The driving signal fed in could be the signal source 714 of the embodiments shown in FIGS. 7A and 7B. The electric signal from the transmitter wired communication unit 771 of the embodiment shown in FIG. 7C could be the signal source. Moreover, the electric signal received from the first electrodes 121 and/or the second electrodes 122 of the touch panel 120 when the tip section 230 shown in FIG. 7D approximates or touches could be used as the signal source.

The structure of three metal plates as shown in FIG. 17A is identical to the structure of three metal plates as shown in FIG. 16A. A driving signal with a frequency may feed into the deformable second metal plate 1120. Due to capacitive effect with the second metal plate 1120, the first metal plate 1110 outputs the induced current with a current value I1. Analogously, due to capacitive effect with the second metal plate 1120, the third metal plate 1130 outputs the induced current with a current value I2.

A first capacitor 221 is formed by the first metal plate 1110 and the second metal plate 1120. A second capacitor 222 is formed by the second metal plate 1120 and the third metal plate 1130. When the second metal plate 1120 is not deformed, the impedances of the first capacitor 221 and the second capacitor 222 are fixed. Hence, the current values I1 and I2 are analyzed and a ratio is calculated according to these two current values. When the ratio is a predetermined value or falls into a predetermined range, it is determined that the second metal plate 1120 is not deformed.

When the second metal plate 1120 is deformed, the impedances and capacitance of the first capacitor 221 and the second capacitor 222 are changed. Hence, a ratio is calculated according to these two current values. Based on the variation of the ratio, the deforming and displacement of the second metal plate 1120 could be deduced in consequence. The method embodiment shown in FIG. 8 could be applicable here.

Please refer to FIG. 17B, which is a variation of the embodiment shown in FIG. 17A. The second metal plate 1120 and the third metal plate 1130 are fixed. The driving signal with a frequency is fed into the deformable first metal plate 1110. Due to capacitive effect with the first metal plate 1110, the second metal plate 1120 outputs the induced current with a current value I1. Analogously, due to capacitive effect with the first metal plate 1110, the third metal plate 1130 outputs the induced current with a current value I2.

A first capacitor 221 is formed by the first metal plate 1110 and the second metal plate 1120. A second capacitor 222 is formed by the first metal plate 1110 and the third metal plate 1130. When the first metal plate 1110 is not deformed, the impedances of the first capacitor 221 and the second capacitor 222 are fixed. Hence, the current values I1 and I2 are analyzed and a ratio is calculated according to these two current values. When the ratio is a predetermined value or falls into a predetermined range, it is determined that the first metal plate 1110 is not deformed.

When the first metal plate 1110 is deformed, the impedances and capacitance of the first capacitor 221 and the second capacitor 222 are changed. Hence, a ratio is calculated according to these two current values. Based on the variation of the ratio, the deforming and displacement of the first metal plate 1110 could be deduced in consequence. The method embodiment shown in FIG. 8 could be applicable here.

Figure 18:
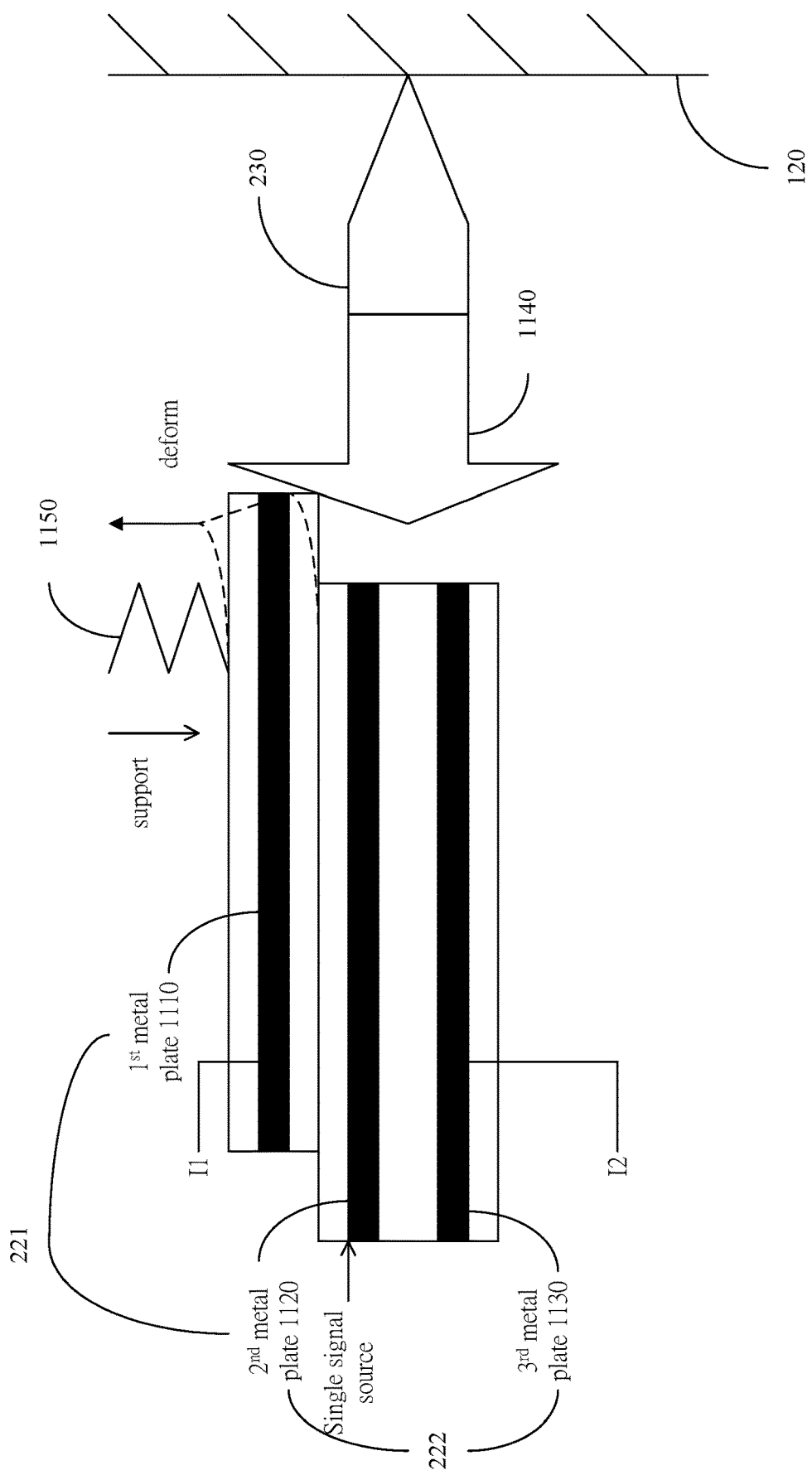
FIG. 18 is a variation of the embodiment shown in FIG. 11.

Please refer to FIG. 18, which is a variation of the embodiment shown in FIG. 11. The embodiment shown in FIG. 11 requires feeding signals with two different frequencies. Instead, in the embodiment shown in FIG. 18 as well as those shown in FIGS. 17A and 17B, it is required to feed driving signal with a frequency or some kind of signal, merely. No matter how many frequencies contained in the signal fed in.

A first capacitor 221 is formed by the first metal plate 1110 and the second metal plate 1120. A second capacitor 222 is formed by the second metal plate 1120 and the third metal plate 1130. Since the distance and permittivity between the second metal plate 1120 and the third metal plate 1130 are not changed, the capacitance and impedance of the second capacitor 222 is fixed. When the first metal plate 1110 is not deformed, the impedances of the first capacitor 221 and the second capacitor 222 are fixed. Hence, a ratio of analyzed current value I1 and I2 could be calculated. When the ratio is a predetermined value or falls into a predetermined range, it is determined that the first metal plate 1110 is not deformed. Moreover, the deforming of the first metal plate 1110 changes its own capacitance and impedance. Thus when it is deformed due to external force, the current value I1 is changed accordingly. In consequence, the ratio involving the current values I1 and I2 also changes. Based on the variation of the ratio, the deforming and displacement of the first metal plate 1110 could be deduced in consequence. The method embodiment shown in FIG. 8 could be applicable here.

In alternative embodiment of the present invention, the controller or circuit of the transmitter 110 may feed driving signal with a frequency into the second metal plate 1120 and calculate the current values I1 and I2 through the first capacitor 221 and the second capacitor 222, respectively. By using the ratio of these two current values, a sensing value of pressure level of the tip section is deduced accordingly. In other words, utilizing the mechanism including the first impedance Z1 and the second impedance Z2, the present invention provides a design of FSC, force sensing capacitor, which may replace traditional force sensing components, such as FSR (force sensing resistor), for detecting pressure level. The FSC provided by the present invention has characteristics such as low cost and immune to influence of temperature and humanity. As shown in the figures above, FSC utilizing flexible PCB is disclosed by present invention. One aspect of the present application is to provide novel forms of FSC.

Figure 19A:
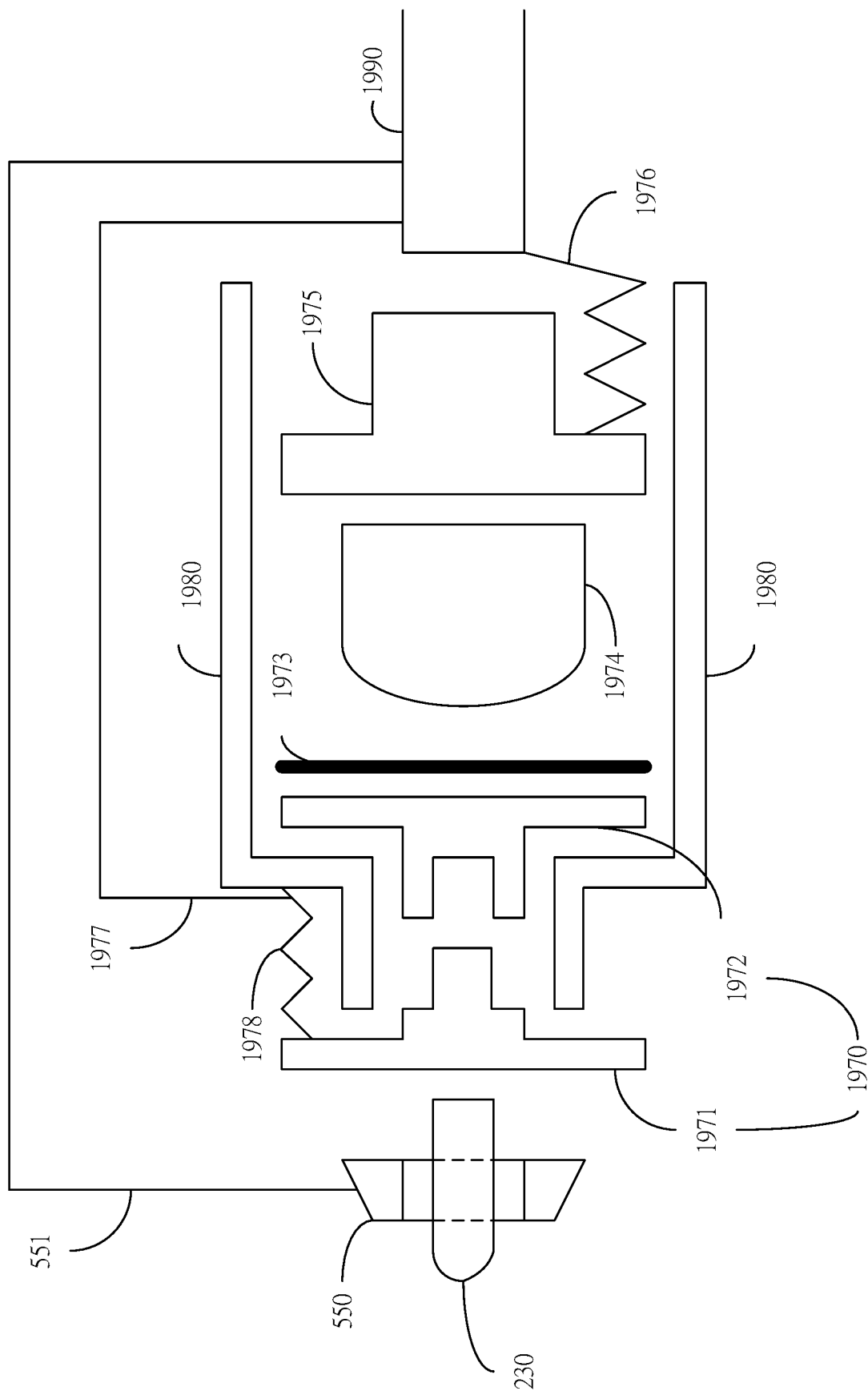
FIG. 19A illustrates a profiling diagram of the FSC structure used in the transmitter 110 in accordance with an embodiment of the present invention.

Please refer to FIG. 19A, which depicts a profiling diagram of the FSC structure used in the transmitter 110 in accordance with an embodiment of the present invention. Please be noted that scales of FIGS. 19A through 19E are changed to highlight some important parts. Besides, some fixed components are omitted for simplifying the figure. As shown in FIG. 19A, the most left component is a long rod tip or the tip section 230, which is a conductor. For convenience, the tip section 230 is at the fore end of the transmitter 110 or active stylus. When the tip section 230 contacts the fore moving part 1971, the tip section 230 is electrically coupled to the fore moving part 1971. The fore moving part 1971 could be joined together with a rear moving part 1972 by protruding fasteners in the middle of the fore moving part 1971 and corresponding recessed fasteners in the middle of the rear moving part 1972. In one embodiment, the protruding and recessed fasteners comprise screw thread or whorl. Both the fore and rear moving parts 1971 and 1972 may be conductors or conductive elements, such as metal.

A shell component 1980, shown in FIG. 19A, circularly embraces the fore and rear moving parts 1971 and 1972. Only parts of the shell component 1980 are illustrated in FIG. 19A. A neck part with smaller diameter of the shell component 1980 is constructed nearby the tip section 230. A shoulder part with larger diameter next to the neck part of the shell component is used to be a bearing part. As shown in FIG. 19A, at least one elastic element 1978 is placed between the bearing part and the fore moving part 1971. The elastic element 1978, such as spring, elastic piece, or in any other forms, is supposed to provide force between the shell component 1980 and the fore moving part 1971 along the axis of the stylus. In some embodiments, the elastic element 1978 unlike the one shown in FIG. 19A is surrounded the moving part 1970 and the neck part of the shell component 1980.

In another embodiment, the elastic element 1978 may provide force to both the shell component 1980 and the rear moving part 1972 along the axis of the stylus. Because a whole moving part 1970 composed of the fore and the rear moving parts 1971 and 1972 by fasteners, no matter which one of the fore and the rear moving part 1971 and 1972 is pressed, the whole moving part 1970 is pushed to the tip and the tip section 230 is also pushed forward accordingly.

In case the tip section 230 is pressed toward the right hand side of FIG. 19A or toward the rear, the force provided by the elastic element 1978 is compromised and the elastic element 1978 would be compressed such that a portion of the moving part 1970 touches the bearing part of the shell component 1980. Hence, the design provided by the present application creates a stroke that moving part 1970 moves inside the neck part of the shell component 1980 along the axis of the stylus. Accordingly, the tip section 230 touching the moving part 1970 also moves the same distance of the stroke along the axis. The distance of the stroke could be varied according to different designs, e.g., 1 mm or 0.5 mm. The present invention does not limit the distance of the stroke.

In the rear of the rear moving part 1972, a dielectric film 1973 is formed. In the rear of the dielectric film 1973, a compressible conductor 1974 is arranged. In one embodiment, the compressible conductor 1974 may be a conductive rubber or an elastic element formed by conductors. A sandwich structure comprising the moving part 1970, the dielectric film 1973, and the compressible conductor 1974 makes a capacitor or a FSC. The FSC provided by the present invention may be applicable to the first capacitor 221 shown in FIG. 2 through FIG. 5. In short, the FSC disclosed in the present application could be used in the embodiments mentioned above.

The compressible conductor 1974 is attached to a conductor base 1975 which is further attached to an inner face of the shell component 1980 by fasteners. In case the moving part 1970 moves toward rear side or right hand side, the compressible conductor 1974 is compressed by the rear moving part 1972 because the conductor base 1975 is fixed. Thus the capacitance of the FSC is changed accordingly.

Because of the restriction of stylus shape, circuits and battery module may be placed in the rear of the conductor base 1975. As shown in FIG. 19A, those components are represented by a PCB 1990. As a first plate of the FSC, the moving part 1970 is connected to the PCB 1990 through a moving part wire 1977. As a second plate of the FSC, the conductor base 1975 is connected to the PCB 1990 through a base wire 1976.

The base wire 1976 may be another elastic element. In some embodiments, the base wire 1976, unlike the one shown in FIG. 19A, is surrounded the conductor base 1975. In other embodiments, the conductor base 1975 is not conductive. Hence the base wire 1976 is electrically coupling to the compressible conductor 1974 through the conductor base 1975.

In one embodiment, the manufacturing method of the dielectric film 1973 is submerging the right hand side surface of the rear moving part 1972 in a dielectric liquid. After the liquid stayed on the surface dried, a dielectric film 1973 is naturally formed on the right hand side surface of the rear moving part 1972.

Please refer to FIG. 20(A)~(D), which show profiling diagrams of contact surface of the compressible conductor 1974 facing the dielectric film 1973. The figure depicts four embodiments of the contact surface of the compressible conductor 1974 facing the dielectric film 1973. The embodiment (A) shows a surface having a central bulge. The embodiment (C) shows a sloped surface. The embodiment (B) shows a conical surface. And the embodiment (D) illustrates a surface with multiple protruding bulges. The present application does not limit to the surfaces shown in those embodiments.

Although the surface attaching the dielectric film 1973 of the moving part 1970 is a plane surface, the present invention does not limit to that. The surface may be constructed as the surfaces shown in FIG. 20(A)~(D), such as having a central bulge, having multiple bulges, sloped, or conical. In other words, both the surfaces of the compressible conductor 1974 and the dielectric film 1973 are not planes in some embodiments.

Figure 19B:
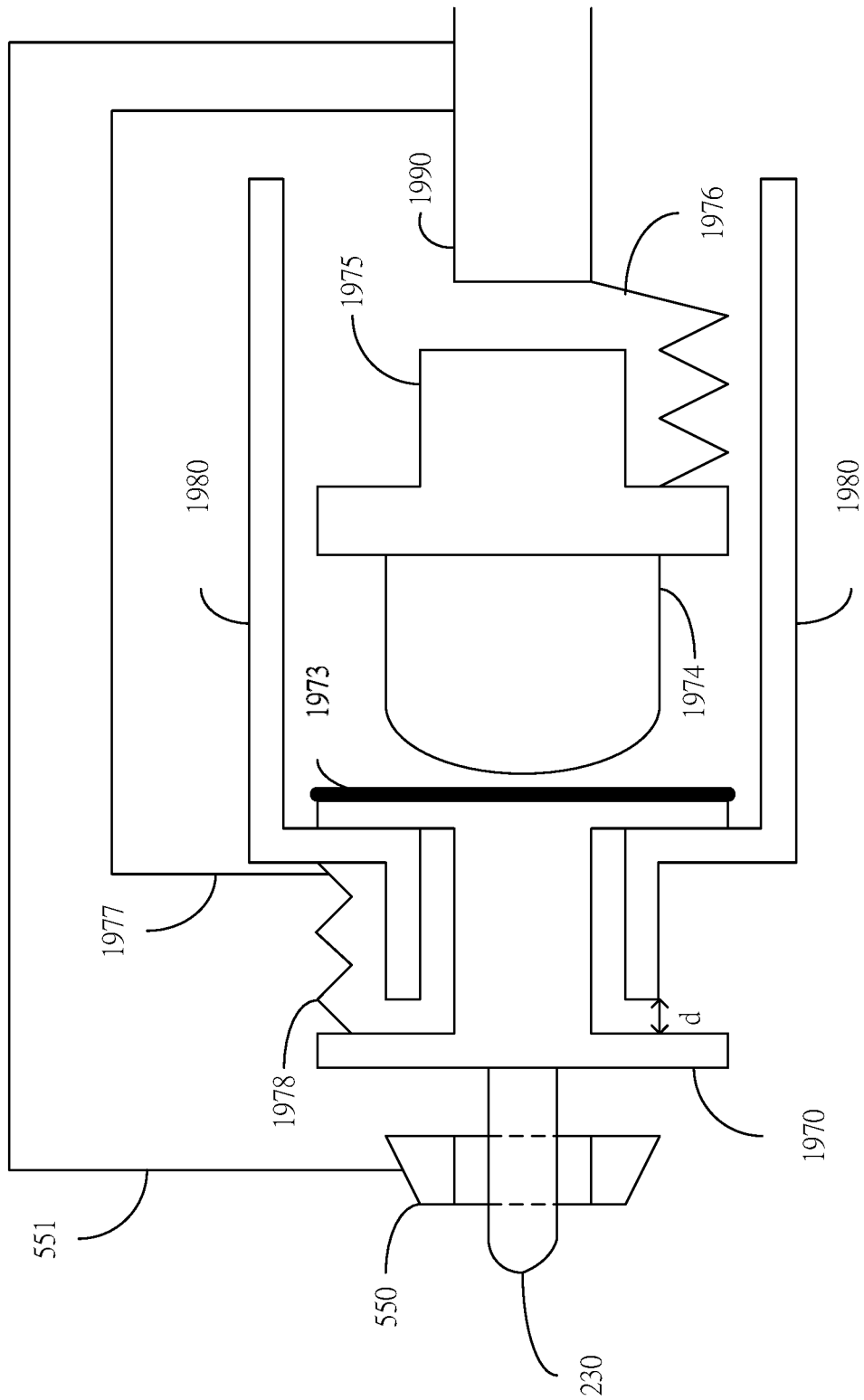
FIG. 19B illustrates an assembled profiling diagram of the structure shown in FIG. 19A.

Please refer to FIG. 19B, which shows an assembled profiling diagram of the structure shown in FIG. 19A. In the assembled structure, a single whole moving part 1970 is formed by the fore and the rear moving parts 1971 and 1972. The moving part 1970 and the bearing of the shell component 1980 are connected by the elastic element 1978. The elastic force provided by the elastic element 1978 pushes the moving part 1970 toward and touches the tip section 230 until portion of the bearing of the shell component 1980 is touched by the rear moving part 1972. A stroke d of the moving part 1970 is relative to the shell component 1980. In this situation, the compressible conductor 1974 is not deformed or compressed. It is assumed that a first capacitance value provided by the FSC.

Figure 19C:
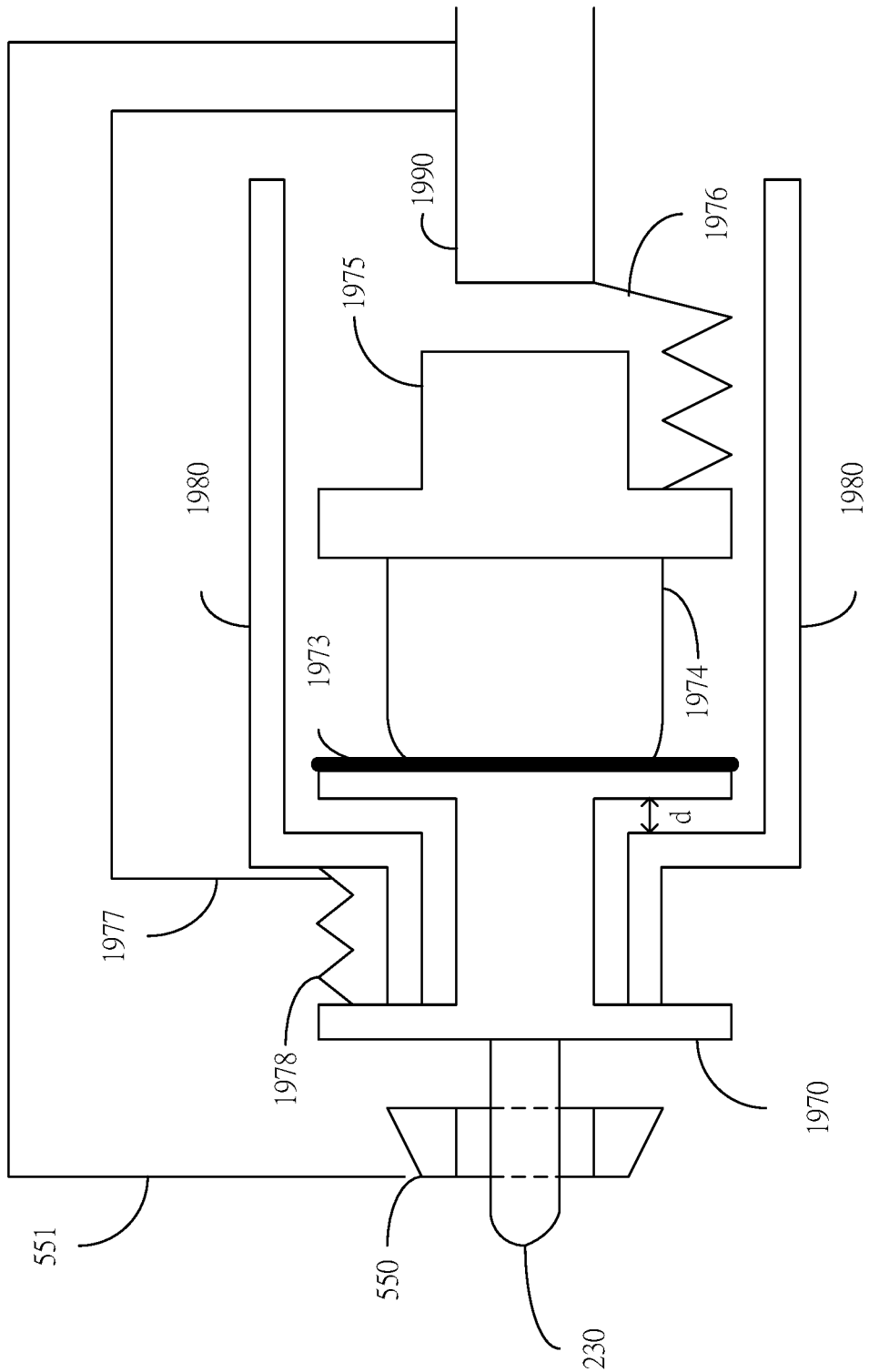
FIG. 19C illustrates another assembled profiling diagram of the structure shown in FIG. 19A.

Please refer to FIG. 19C, which shows another assembled profiling diagram of the structure shown in FIG. 19A. Comparing with FIG. 19B, the tip section 230 is pressed toward the rear side. Influenced by the movement of the tip section 230, the moving part 1970 overcomes the force provided by the elastic element 1978 and moves the whole distance of the stroke d until the fore moving part 1971 touches the bearing of the shell component 1980. In this situation, the compressible conductor 1974 is compressed by the moving part 1970 and the dielectric film 1973 and deformed. It is assumed that a second capacitance value provided by the FSC is different to the first capacitance value.

Between the positions shown in FIGS. 19B and 19C, countless positions the moving part 1970 can stay. In other words, there exist countless compressible levels of the compressible conductors 1974. Or the area of contact surface between the compressible conductor 1974 and the dielectric film 1973 could be varied indefinitely. Each of the positions, the compressed levels, or the areas can be corresponding to a particular capacitance value of the FSC.

Figure 19D:
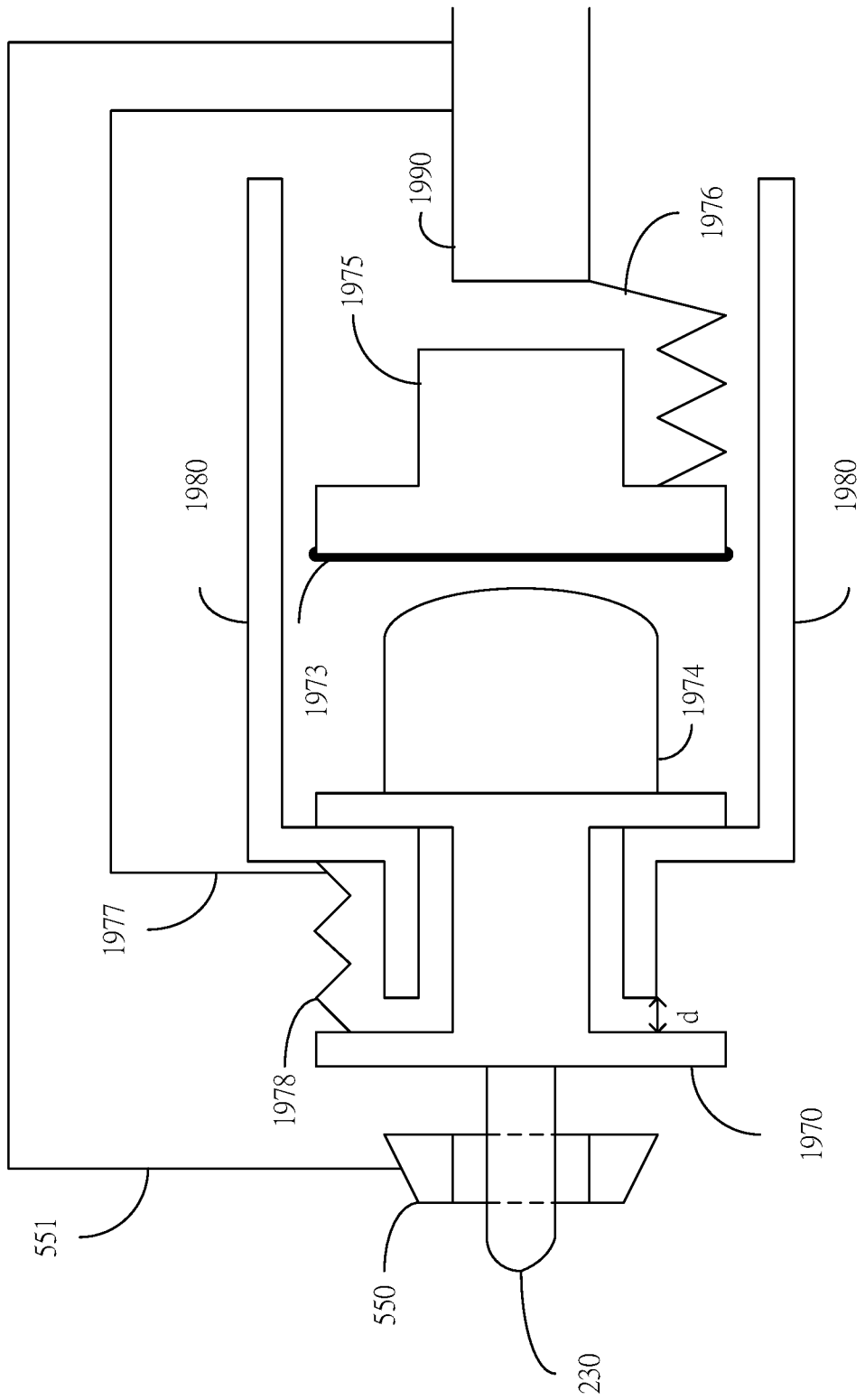
FIG. 19D illustrates a profiling diagram of the FSC structure used in the transmitter 110 in accordance with an embodiment of the present invention.

Please refer to FIG. 19D, which depicts a profiling diagram of the FSC structure used in the transmitter 110 in accordance with an embodiment of the present invention. Comparing to FIG. 19B, the difference is that the compressible conductor 1974 and the dielectric film 1973 exchange their positions. Nevertheless, in case the moving part 1970 moves to the rear side, the compressible conductor 1974 is compressible by the dielectric film 1973 and the conductor base 1975 and deformed. The capacitance value of the FSC is changed accordingly.

Figure 19E:
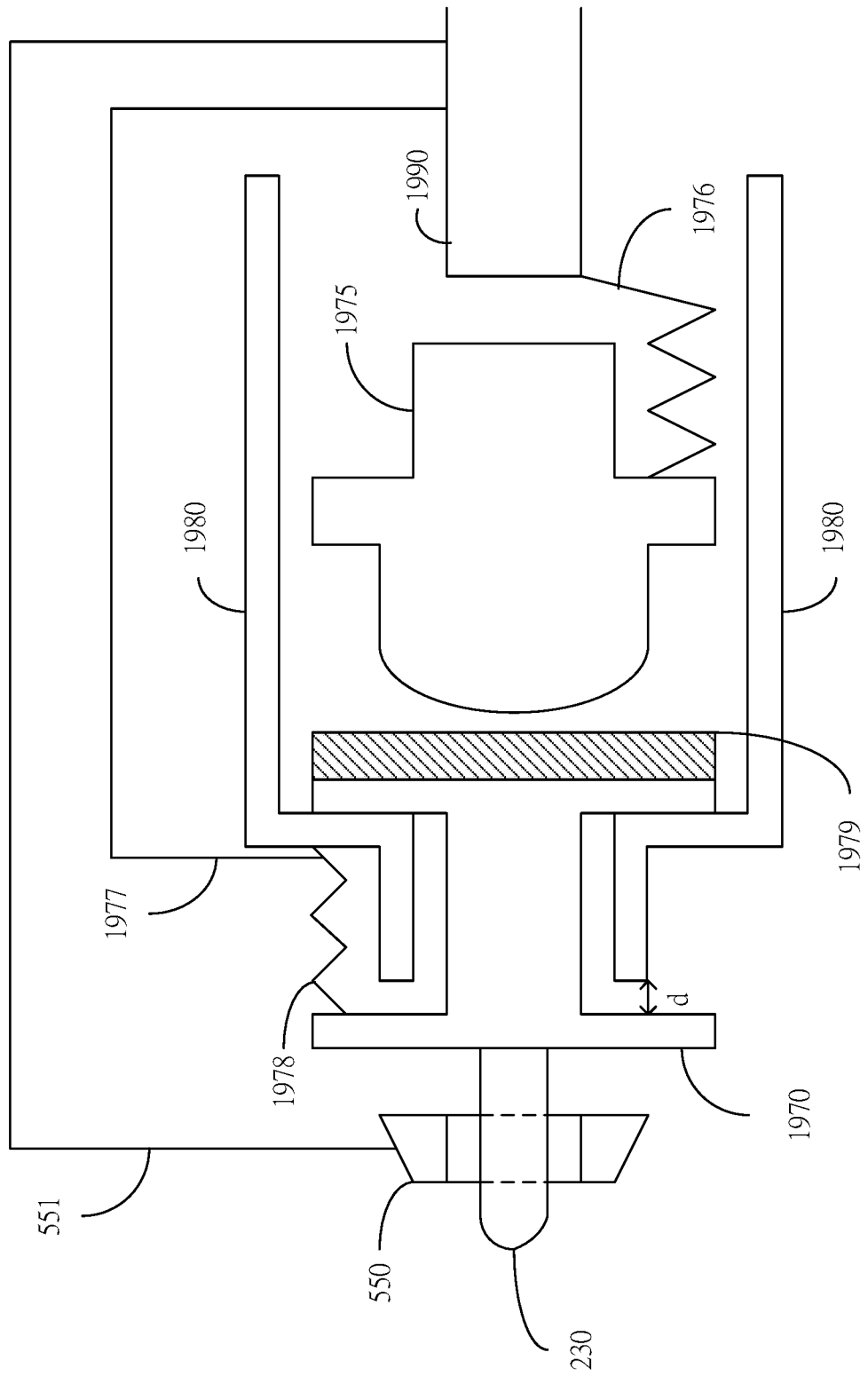
FIG. 19E illustrates a profiling diagram of the FSC structure used in the transmitter 110 in accordance with an embodiment of the present invention.
Figure 20:
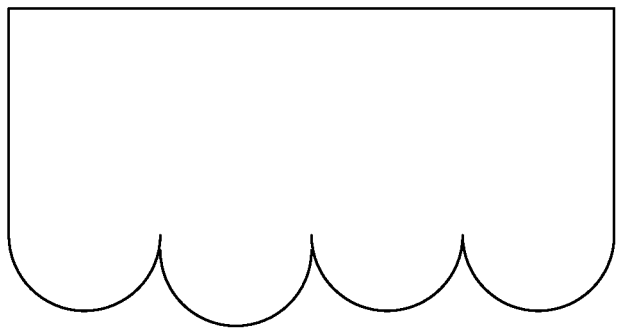
FIG. 20(A)~(D) illustrate profiling diagrams of contact surface of the compressible conductor 1974 facing the dielectric film 1973.
Figure 20:
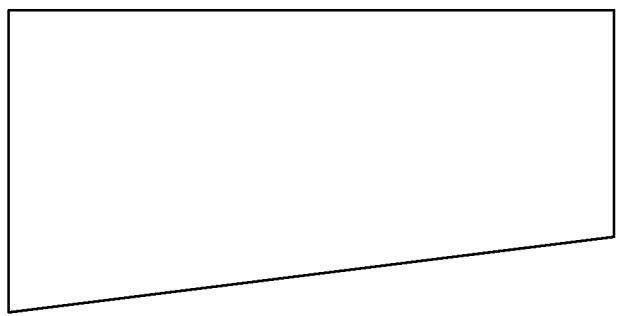
Figure 20:
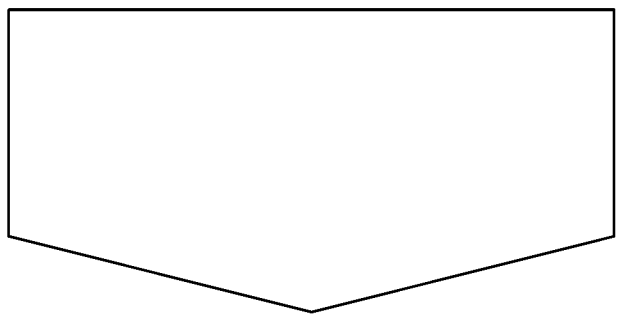
Figure 20:
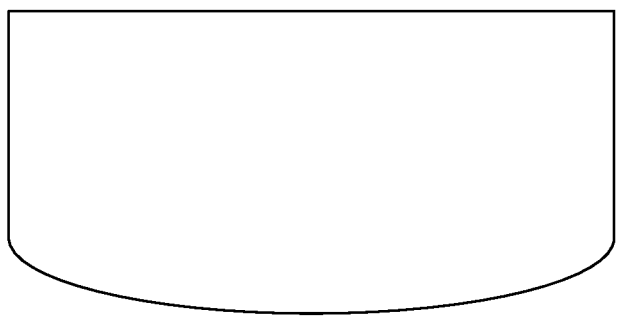

Please refer to FIG. 19E, which depicts a profiling diagram of the FSC structure used in the transmitter 110 in accordance with an embodiment of the present invention. Comparing with FIG. 19B, the differences include that a compressible dielectric material 1979 rather than the dielectric film 1973 is place in the right hand side of the rear moving part 1972. The compressible dielectric material 1979 may be dielectric rubber, plastic, foam or etc. The conductor attached to the conductor base 1975 is replaced by an incompressible conductor such as metal or graphite. When pressed by the moving part 1970, the thickness of the compressible dielectric material 1979 decreases, the distance between the moving part 1970 and the conductor also decreases consequently. Hence the capacitance of the FSC is changed accordingly. However, the cost of the incompressible conductor shown in FIG. 19E is more expensive than the compressible conductor shown in FIG. 19A.

In a variation of the embodiment shown in FIG. 19E, the contact surface of the conductor facing the compressible dielectric material 1979 may adopt those shown in FIG. 20(A)~(D). In another variation, the contact surface of the compressible dielectric material 1979 facing the conductor may adopt those shown in FIG. 20(A)~(D).

Similar to the embodiment shown in FIG. 19D, the positions of the compressible dielectric material 1979 and the conductor may be exchanged such that the compressible dielectric material 1979 is attached to the conductor base 1975 and the conductor is attached to the rear of the moving part 1970. When the moving part 1970 moves to the rear side, the conductor causes the compressible dielectric material 1979 deformed such that the capacitance of the FSC is changed accordingly.

Figure 21:
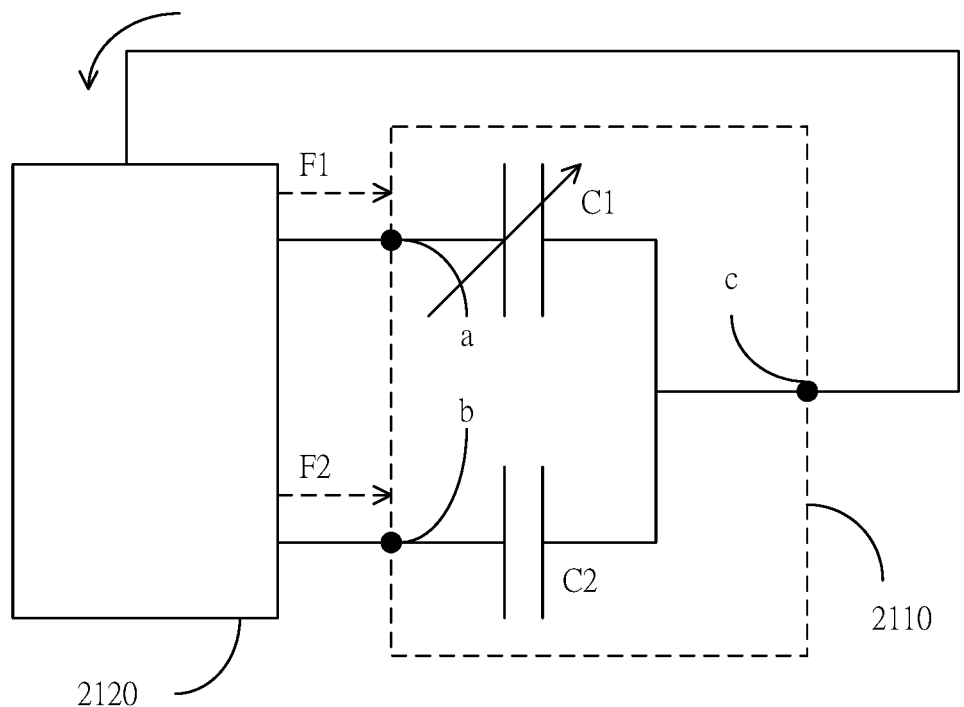
FIG. 21 illustrates a pressure sensor according to an embodiment of the present invention.

Please refer to FIG. 21, which illustrates a pressure sensor according to an embodiment of the present invention. As shown in the figure, the pressure sensor 2110 has two input terminals a and b and an output terminal c, which are all connected to a control unit 2120. The control unit 2120 feeds signals with first frequency (group) F1 and second frequency (group) F2 into the input terminals a and b, respectively, and receives the output signal of the pressure sensor 2120. The control unit 2120 may embody the method disclosed in FIG. 6.

When external pressure makes capacitance change of a capacitor C1, the control unit 2120 could deduce the pressure according to the capacitance change. Hence, the pressure sensor 2110 could be widely adapted to pressure measure devices such as weight sensor. In one application, the pressure sensor 2120 could be used in another form of stylus. After the pressure on the tip of the stylus is deduced, the control unit 2120 drives a signal transmitter for transmitting an electric signal with a predetermined frequency f0 to a touch panel.

It is mentioned that the transmitter 110 may transmit the electric signal at some time after receiving the beacon signals emitted from the touch panel 120, such that the touch panel 120 could detect the position of the transmitter 110 as well as the sensor states of the transmitter 110. If no beacon signal is received during a first period, the transmitter 110 may enter a power saving mode. In this mode, the transmitter 110 detects the beacon signal every detection period. Once the beacon signal is detected, the transmitter 110 recovers back to normal working mode. The detection period is longer than the transmission period of the beacon signal.

Moreover, if no beacon signal is received during a second period in the power saving mode, the transmitter 110 may enter a sleep mode to turn off circuits and most parts until being waked up. In one embodiment of the present invention, in the sleep mode, the receiving circuit of the beacon signal and the transmitting circuit of the electric signal of the transmitter 110 are turned off. A button or a switch of the transmitter 110 could be used to wake itself up by user. In another embodiment of the present application, examples shown in FIGS. 23A, 23B, 24A, and 24B could be used to wake up the transmitter 110. After the tip section 230 touches object, the voltage level of a connection port or GPIO1 is raised to high from low such that the transmitter 110 begins to transmit electric signals.

In the present application, one function of the ring electrode 550 is to receive the beacon signal in additional to the tip section 230. Since the surface area and volume of the ring electrode 550 is larger than the top of the tip section 230, it can receive the beacon signal distant away from the touch panel. Or the touch panel 120 may transmit weaker beacon signal to save power consumption. If no beacon signal is received for a while, active stylus may enter deeper sleep mode to save more power. When in this sleep mode, user may recover the transmitter 110 back to the normal working mode by pressing the tip section 230. Examples shown in FIGS. 23A, 23B, 24A, and 24B could be used to wake up the transmitter 110. After the tip section 230 touches object, the voltage level of a connection port or GPIO1 is raised to high from low such that the transmitter 110 begins to transmit electric signals.

When multiple transmitters 110 operate on one touch panel 120, the touch panel 120 could transmit different beacon signals for corresponding transmitter 110 to emit its electric signal. The transmitter 110 may adjust the signal frequency or modulation of the first signal source 211, the second signal source 212, and the third signal source 513 according to different beacon signals such that the touch panel 120 could distinguish the source transmitter 110 of the received electric signals. Analogously, the different beacon signals may have different frequencies or different modulations.

Figure 22:
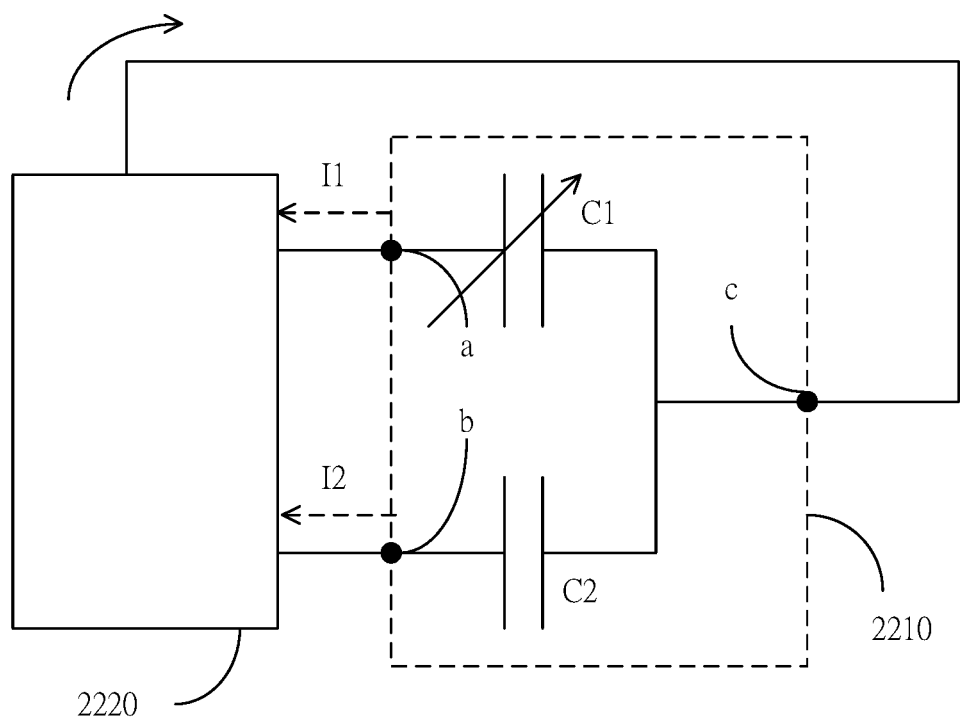
FIG. 22 illustrates a pressure sensor according to an embodiment of the present invention.

Please refer to FIG. 22, which illustrates a pressure sensor according to an embodiment of the present invention. In this embodiment, the control unit 2220 may feed driving signal with a frequency to an input terminal c of the pressure sensor 2210 and receive currents with current values I1 and I2 corresponding to a first capacitor C1 and a second capacitor C2, respectively. A ratio of these two current values is calculated by the control unit 2220. Therefore a pressure level could be deduced accordingly. The control unit 2220 may embody the method shown in FIG. 8. In one application, the driving signal with the frequency is fed externally into the input terminal c of the pressure sensor 2220.

Figure 23A:
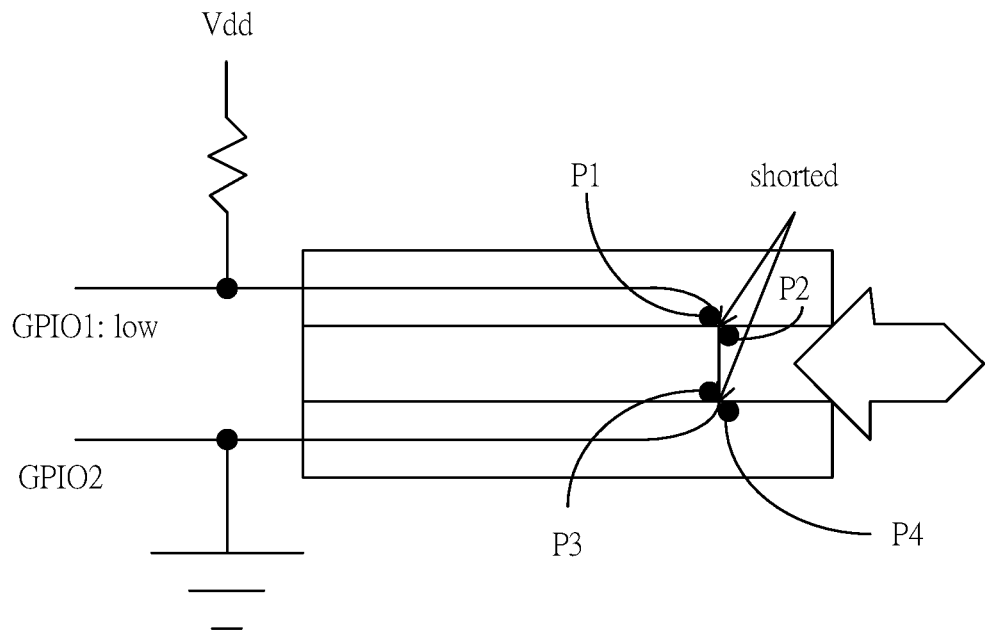
FIGS. 23A and 23B depict profiling diagrams of a switch structure in accordance with an embodiment of the present invention.
Figure 23B:
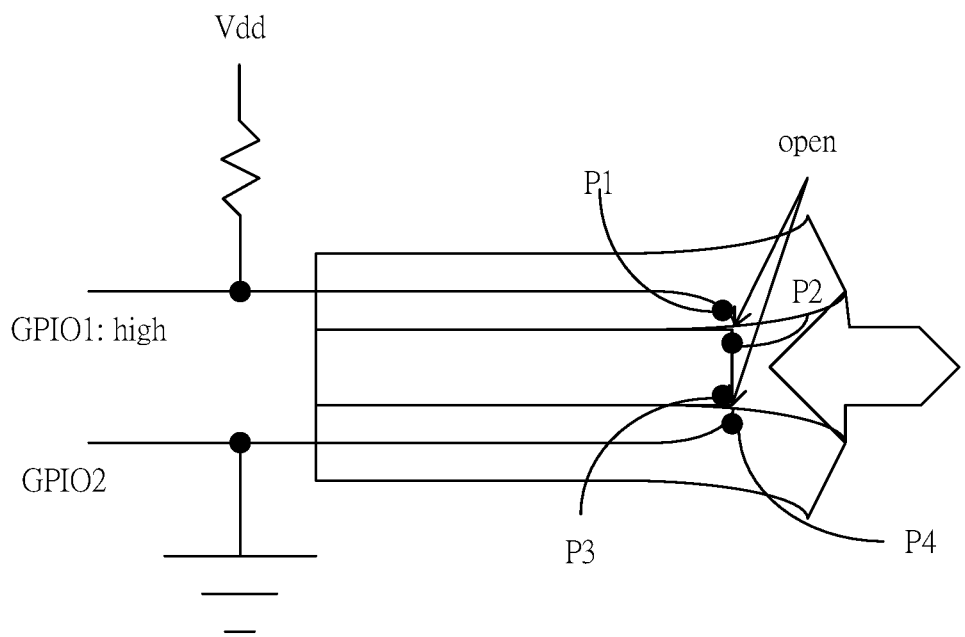

Please refer to FIGS. 23A and 23B, which depict profiling diagrams of a switch structure in accordance with an embodiment of the present invention. In the embodiment shown in FIG. 23A, there are three circuit boards. As seen in previous figures, there is a ramp at the right hand side. Before the ramp pushes to left, the circuit on the upper circuit board connects to the circuit on the lower circuit board through the circuit on the middle circuit board. A first contact point p1 of the upper circuit board is coupled to a voltage source Vdd and a first connection port (GPIO1). If no displacement vertical to the axis of the stylus, the first contact point p1 is contacted with a second contact point p2 on the middle circuit board. There is also a third contact point p3 on the middle circuit board coupled to the second contact point p2. A fourth contact point p4 of the lower circuit board is coupled to a ground level and a second connection port (GPIO2). Besides, the fourth contact point p4 is electrically coupled to the third contact point p3. There is a resistor between the power source Vdd and the first connection port (GPIO1). If the circuit between the upper and the middle circuit boards is shorted, i.e., the first contact point p1 contacts with the second contact point p2, and the circuit between the middle and lower circuit boards is shorted, i.e., the third contact point p3 contacts with the fourth contact point p4, the voltage level of the first connection port (GPIO1) is low or ground.

Please refer to FIG. 23B, after the ramp is pressed, the movement of the ramp deforms the contacting parts of the upper and the lower circuit boards. Due to the deformations, the circuit between the upper and the middle circuit boards is open, i.e., the first contact point p1 separates with the second contact point p2, and the circuit between the middle and lower circuit boards is open, i.e., the third contact point p3 separates with the fourth contact point p4, the voltage level of the first connection port (GPIO1) is high or as high as Vdd.

In response to the voltage level of the first connection port (GPIO1) from low to high, the transmitter 110 in sleep mode is waked up. Already seen in previous figures, supporting elements corresponding to the upper and the lower circuit boards help to recover these two circuit boards' position, respectively, if the pressure of the ramp disappears. At this moment, the voltage level of the first connection turns to low from high. The first and the second connection ports may be pins of processor in the transmitter 110.

Figure 24A:
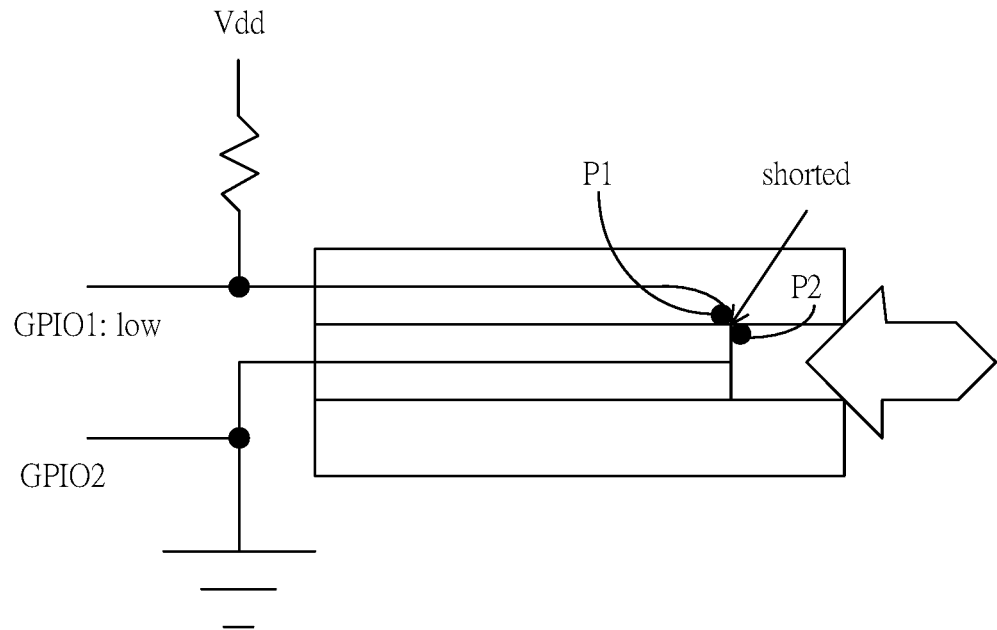
FIGS. 24A and 24B depict profiling diagrams of a switch structure in accordance with an embodiment of the present invention.
Figure 24B:
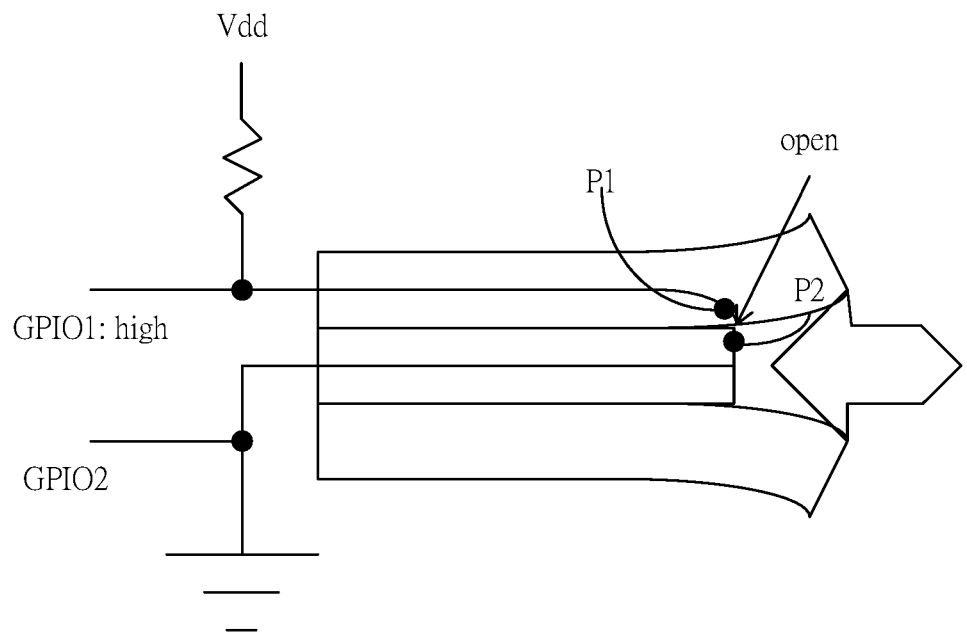

Please refer to FIGS. 24A and 24B, which depict profiling diagrams of a switch structure in accordance with an embodiment of the present invention. The embodiment shown in FIGS. 23A and 23B has two potential openings. No matter which opening is open, it turns the voltage level of the first connection to high from low. However, the embodiment shown in FIGS. 24A and 24B, only one potential opening is presented. The circuit along the middle circuit board connects to ground. In case the circuit between the upper and the middle circuit board is shorted, the voltage level of the first connection port is low or ground. Instead, if the circuit between the upper and the middle circuit board is open, the voltage level of the first connection port is high or as high as Vdd. In the embodiment shown in FIGS. 24A and 24B, the second contact point p2 is electrically coupled to the second connection port (GPIO2).

Figure 25:
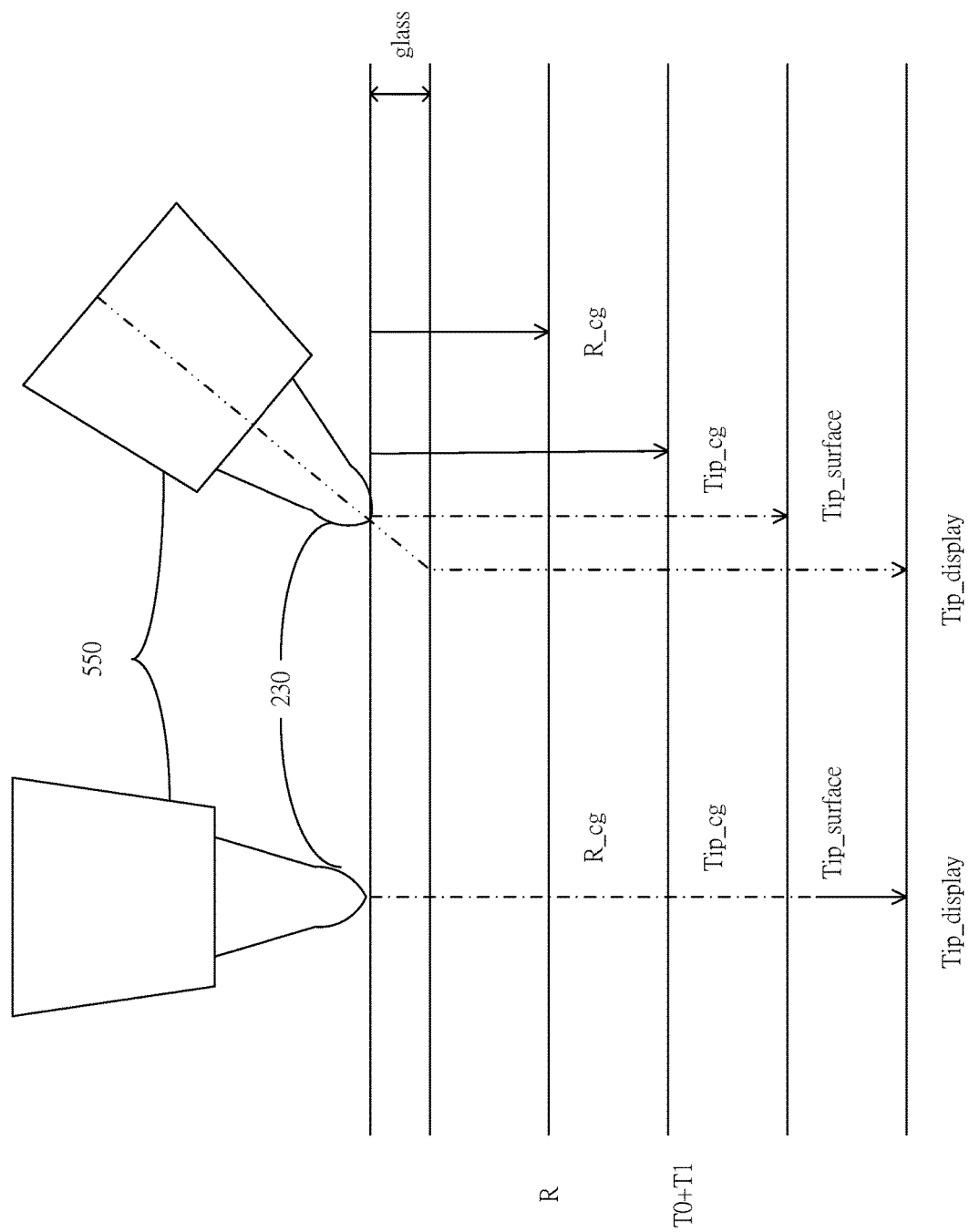
FIG. 25 shows a diagram for calculating the tip position.

Please refer to FIG. 25, which shows a diagram for calculating the tip position. There are two transmitters 110 shown in FIG. 25, both include the ring electrode 550 and the tip section 230. The left-hand side transmitter 110 is perpendicular to the touch panel 120, the angle is approaching or equals to 90 degree. The angle between the right-hand side transmitter 110 and the touch panel 120 is less than 90 degree. Moreover, a transparent surface layer of the touch panel 120 has a thickness. Normally, the transparent surface layer is a reinforced glass. A display layer is underneath the transparent surface layer.

Since the transmitters 110 emits electric signals via the ring electrode 550 and/or the tip section 230 during the time period R, the touch sensitive processing apparatus 130 could calculate a centroid position R_cg of the electric signals which is corresponding to a centroid position of the ring electrode 550 and/or the tip section 230 projecting to the touch panel 120. After that, during the time periods T0 and T1, transmitter 110 emits electric signals only via the tip section 230. Similarly, the touch sensitive processing apparatus 130 could calculate a centroid position Tip_cg of the electric signals which is corresponding to a centroid position of the tip section 230 projecting to the touch panel 120.

For the left-hand side transmitter 110 shown in FIG. 25, since it is perpendicular to the touch panel 120, the position R_cg equals or is approaching to the position Tip_cg. Thus, a position Tip_surface where the top of the tip section 230 touches the transparent surface layer of the touch panel 120 equals or is approaching to the positions R_cg and Tip_cg. Moreover, a position Tip_display where the top of the tip section 230 projects on the display layer of the touch panel 120 equals or is approaching to the positions, R_cg, Tip_cg, and Tip_surface.

For the right-hand side transmitter 110 shown in FIG. 25, there exist an inclination angle between the transmitter 110 and the touch panel 120. Thus the position R_cg is not equal to the position Tip_cg. More distant between the positions R_cg and Tip_cg, the inclination angle is larger. Depends on the implementations of the transmitter 110, the inclination angle or positions Tip_surface where the top of the tip section 230 touches the transparent surface layer of the touch panel 120 or Tip_display where the top of the tip section 230 projects on the display layer of the touch panel 120 could be found by the touch sensitive processing apparatus 130 via calculating or checking a look-up table according to the positions R_cg and Tip_cg.

Figure 26:
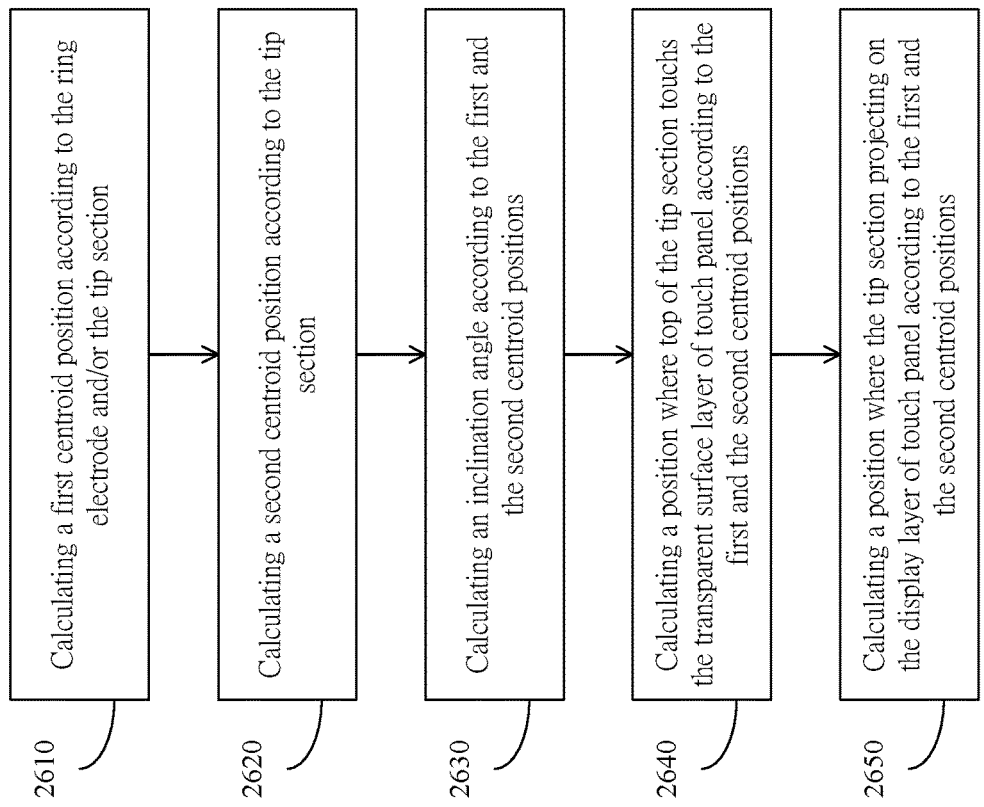
FIG. 26 shows a flow chart for calculating the inclination angle in accordance with an embodiment of the present invention.

Please refer to FIG. 26, which depicts a flow chart diagram for calculating the inclination angle in accordance with the present invention. The embodiment is applicable to the transmitter 110 having a ring electrode 550 shown in FIG. 5. It is also applicable to the signal modulations shown in FIGS. 9E and 9F. The method could be performed by the touch sensitive processing apparatus 130 shown in FIG. 1. The embodiment shown in FIG. 25 could be reference, too.

In step 2610, calculating a first centroid position R_cg according to the ring electrode 550 and/or the tip section 230 projecting to the touch panel 120. In step 2620, calculating a second centroid position Tip_cg according to the tip section 230 projecting to the touch panel 120. The present invention does not limit the executing order of these two steps 2610 and 2620. Next, in optional step 2630, calculating an inclination angle according to the first and the second centroid positions R_cg and Tip_cg. In optional step 2640, calculating a position Tip_surface where the top of the tip section 230 touches the transparent surface layer of the touch panel 120 according to the first and the second centroid positions R_cg and Tip_cg. In optional step 2650, calculating a position Tip_display where the tip section 230 projects on the display layer of the touch panel 120 according to the first and the second centroid positions R_cg and Tip_cg. Not all but at least one of steps 2630, 2640, and 2650 has to be performed in the embodiment. And the present invention does not limit the executing order of these three steps 2630, 2640, and 2650.

Please refer to FIGS. 27(a)-(e), which show embodiments of how display interface reflects stroke according to the inclination angle and/or pressure of the tip section. There exists 5 rows of embodiments (a) through (e) shown in FIGS. 27(a)-(e). Each row comprises three examples corresponding to three inclination angles. The examples of the most left column are corresponding to which the active stylus is perpendicular to the touch sensitive panel. The examples of the most right column are corresponding to an inclination angle larger than another inclination angle corresponding to the examples of the middle column. The so-called stroke in the present invention usually refers to a rendering area on the display by image processing software.

Please be noted that in the embodiment, it is not required to utilize the embodiment using the ring electrode shown in FIGS. 25 and 26 to calculate the inclination angle and positions Tip_surface and Tip_display. In one embodiment, other forms of sensor may be installed on the active stylus to measure the inclination angle. For example, IMU, inertial measurement unit, gyroscope, and accelerometer made by microelectronics technology are configured to measure the inclination angle and report it and/or derived data to computer system comprising the touch sensitive panel via wired or wireless communication. Therefore the computer system could implement the embodiments shown in FIGS. 27(a)-(e). The fore-mentioned wired or wireless communication may follow industrial or proprietary standards such as Bluetooth or Wireless USB etc.

Now assuming that active stylus touches the touch panel using the same pressure level in those embodiments shown in FIGS. 27(a)-(e). In some embodiments, each intersection point of vertical and horizontal lines represents the position Tip_surface corresponding to where the top of the tip section touches the transparent surface layer of the touch sensitive panel. In other embodiments, each intersection point of vertical and horizontal lines denotes the position Tip_cg corresponding to where the centroid of the tip. Of course, they may represent the locations Tip_display where the tip projects on the display layer of the touch sensitive panel. For convenience, those three positions are collectively named as a representative point, Tip. In other words, the representative point Tip may be one of the points, Tip_display, Tip_surface, or Tip_cg.

In the embodiment (a), in response to the increase of the inclination angle, the stroke shape changes from circle to ellipse. In other words, the distance between two focal points of the ellipse is corresponding to the inclination angle. The inclination angle increases with the distance between two focal points of the ellipse. Center of the ellipse is corresponding to the representative point Tip.

The difference between the embodiments (b) and (a) is that one intersection point of the semi-major axis and the ellipse is corresponding to the representative point Tip. The difference between the embodiments (c) and (a) is that one of the focal point of the ellipse is corresponding to the representative point Tip. The difference between the embodiments (d), (e), and (a) is that the stroke shape changes from ellipse to tear drop. Top of the tear drop of the embodiment (d) is corresponding to the representative point Tip. Somewhere from the top toward the end of the tear drop of the embodiment (e) is corresponding to the representative point Tip.

Although shown in FIGS. 27(a)-(e), two stroke shapes and different points corresponding to the intersection point are enumerated. The present invention does not limit the stroke shape and the types of the representative point. In addition, in one embodiment, pressure of the tip may control the size of the shape. For example, the pressure may be corresponding to radius of circle or the distance between the focal points of the ellipse. In summarized, human-machine interface can change display content according to pressure of the tip and/or inclination angle of the active stylus.

In additional to change the stroke shape, the pressure of the tip and/or inclination angle of the stylus may be corresponding to different commands. For example of 3 dimensional design software, color temperature, strength, or scope of illuminating source could be changed according to the inclination angle. Or in case an object is selected by touch of the tip, orientation of the selected object could be changed according to direction of the inclination angle. Moreover, direction of the selected object could be rotated according to the inclination angle.

It is worthy noted that relation of the inclination angle and corresponding value is not limited as linearly in the present invention. In some embodiments, the relation may be non-linear and could be found in a lookup table or calculated in the quadratic function.

Please refer to FIG. 28(a)-(b), which depict other embodiments of how display interface reflects stroke according to the inclination angle and/or pressure of the tip. It depicts two embodiments (a) and (b) which include left and right strokes, respectively. The inclination angle of the left hand side stroke is zero. The stroke includes five circles C1 through C5 with increasing radius. The sizes of the circles are based on the pressure values of the tip. The inclination angle of the right hand side stroke is a non-zero constant. The stroke includes five ellipses E1 through E5 with increasing major and minor radius. Sizes of the ellipses E1 through E5 depend on the pressure values of the tip which are as the same as corresponding the circles C1 through C5. In addition, semi-major axes of these ellipses E1 through E5 are 30 degrees off horizontal according to direction of the inclination angle. The direction of the inclination angle and the stroke direction are different. In this figure, these two directions are off a 15-degree angle.

The embodiment (a) shown in FIGS. 28(a)-(b) is corresponding to the embodiment (a) shown in FIGS. 27(a)-(e), i.e., center of the ellipse is corresponding to the representative point Tip. Analogously, the embodiment (b) shown in FIGS. 28(a)-(b) is corresponding to the embodiment (b) shown in FIGS. 27(a)-(e), i.e., the intersection point between the semi-major axis and the ellipse is corresponding to the representative point Tip. Could be seen in these two embodiments shown in FIGS. 28(a)-(b), under the same pressure level, the stroke shapes are different according to different inclination angles. In consequence, strokes of some soft and flexible tips such as brush pen and quill pen could be simulated according to the pressure level and inclination angle.

In one embodiment of this invention, the parallel intervals between the first and the second electrodes 121 and 122 of the touch panel 120 are larger than the tip of the tip section 230. As shown in FIG. 25, when the tip of the tip section 230 inclines, it is likely to have the larger contact area with the touch panel 120. However, in one typical example, the diameter of the above-mentioned tip contact area is 1 mm at most. The interval between two adjacent first electrodes 121 or second electrodes 122 can be 4 mm to 5 mm. In other words, the chance of the tip section 230 being located above the first electrodes 121 or second electrodes 122 is much smaller than the chance of the tip section 230 being located between them.

Figure 35A:
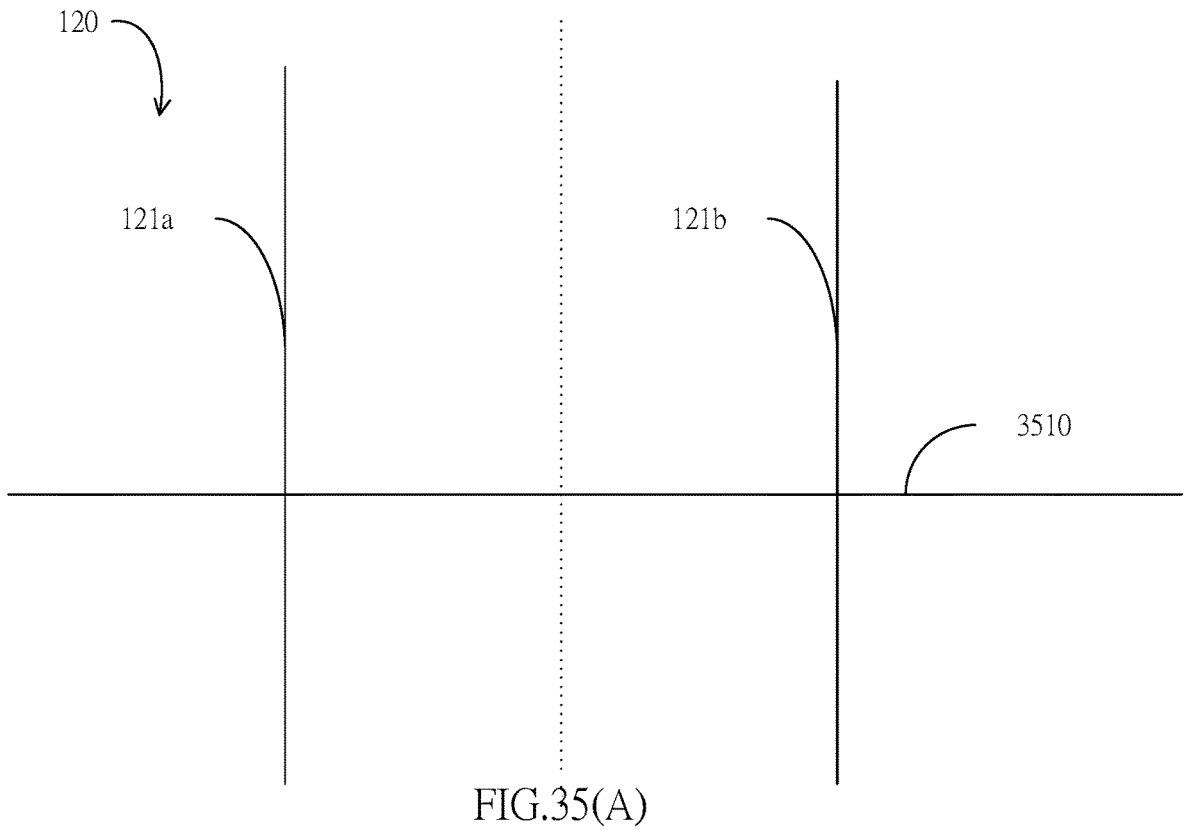
FIG. 35(A)-(B) illustrate diagrams of signal strength of a transmitter in accordance with an embodiment of the present invention.
Figure 35B:
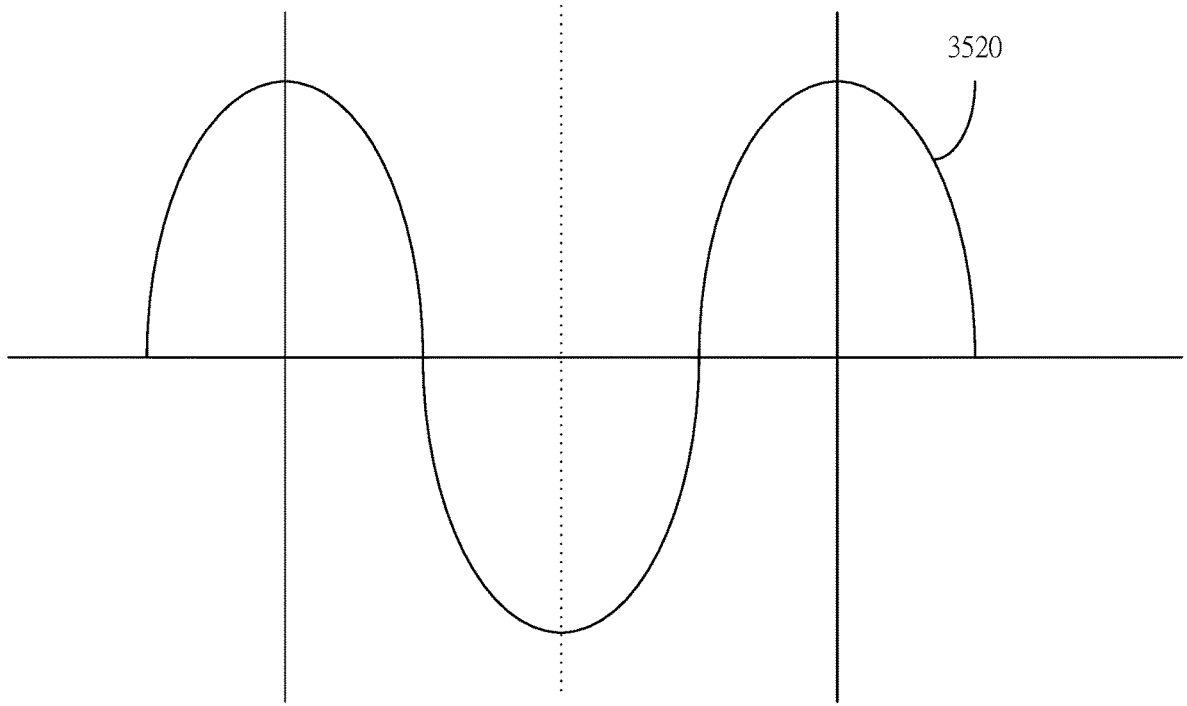

As shown in FIG. 35(A)-(B), illustrate signal strength of a transmitter in accordance with an embodiment of the present invention. The part (A) in the upper figure is one part of the touch panel 120, including two adjacent first electrodes 121a and 121b. When the touch sensitive processing apparatus 130 detects one strength ratio value of electric signal sent by the transmitter 110 to gain the pressure of the tip section 230, it respectively detects the electric signals sensed by all first electrodes 121. When the tip section 230 on the touch panel 120 has the moving trail 3510 and assumed the electric signals emitted with the same strength, the strength of corresponding electric signals gained by the touch sensitive processing apparatus 130 is possibly shown as the part (b), which is a sine wave line 3520.

As shown in the part (B) of FIG. 35, when the tip section 230 approaches to or hovers above the first electrode 121a or 121b, the total strength of the received electric signals is the biggest. When the tip section 230 is located between the two adjacent first electrodes 121a and 121b, the total strength of the received electric signals is the smallest. In other words, when it hovers above the electrode, the SNR (signal-noise ratio) of the strength of the electric signals emitted by the transmitter 110 and the noise signals is the largest. Instead, when it is between the two adjacent electrodes, the SNR of the strength of the electric signals emitted by the transmitter 110 and noise signals of the transmitter 110 is the smallest. Since this invention can use the ratio value of the two frequent signals among the electric signals to estimate the sensing value of certain sensor, such as the pressure value of the tip section 230. Despite any point of the signal strength 3520, the ratio value in theory is the same. However, the samples of the low SNR that estimate the ratio may be influenced by the noise to increase the extent of the error. Therefore, one characteristic of this invention lies in choosing the samples of high signal strength or choosing the samples of high noise ratio in order to count the ratio value of the different signals included. By doing so, the sensing value of certain sensor could be deduced.

Figure 36:
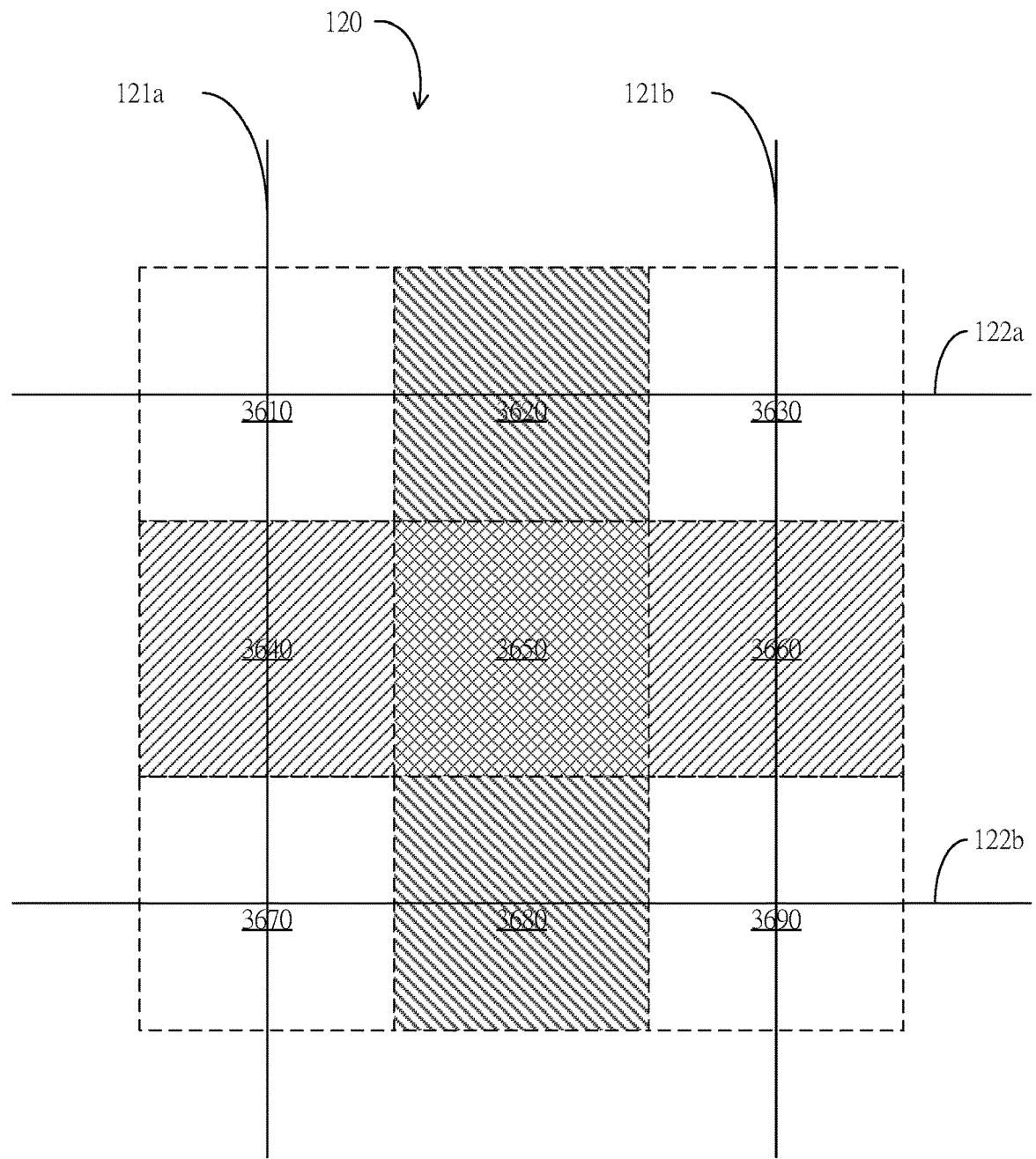
FIG. 36 illustrates a diagram of partitions for a touch panel 120 in accordance with an embodiment of the present invention.

As shown in FIG. 36, it depicts a diagram of partitions for a touch panel 120 in accordance with an embodiment of the present invention. The touch sensitive processing apparatus 130 connects to multiple first electrodes 121 and multiple second electrodes 122 of the touch panel 120. In one embodiment, the touch sensitive processing apparatus 130 can detect the electric signals of multiple first electrodes 121 separately or simultaneously and it can also detect the electric signals of multiple second electrodes 122 separately or simultaneously.

In one embodiment, the touch sensitive processing apparatus 130 can detect multiple first electrodes 121 and second electrodes 122 simultaneously. In this embodiment, when the tip section 230 of the transmitter 110 is located in around the intersection of the two first electrode 121 and second electrode 122 near the area 3610, 3630, 3670, or 3690, the signal strength detected by the first electrode 121 is approximately the same to of that detected by the second electrode 122. For example, when the tip section 230 is located in the area 3670, the signal strength detected either by the first electrode 121 or by the second electrode 122 is roughly the same. Likewise, when the tip section 230 is located in the area 3650, the signal strength detected either by the first electrode 121 or by the second electrode 122 is roughly the same.

In this embodiment, when the tip section 230 is located in the area 3620 and/or the area 3680, the signal strength detected by the first electrode 121 is larger than the signal strength detected by the second electrode 122. Likewise, when the tip section 230 is located in the area 3640 and/or the area 3660, the signal strength detected by the second electrode 122 is larger than the signal strength detected by the first electrode 121.

In one embodiment, the touch sensitive processing apparatus 130 can respectively detect the multiple first electrodes 121 and second electrodes 122. For instance, it first detects the first electrodes 121 and at this moment, the second electrodes 122 are grounded. On the contrary, when the multiple second electrodes 122 are detected, the first electrodes 121 are grounded. In this embodiment, when the tip section 230 of the transmitter 110 is located between the intersectional area, which is near the area 3610, 3630, 3670, and 3690, of the two first electrode 121 and second electrode 122, the signal strength through the detection of the first electrode 121a is similar to the signal strength detected by the second electrode 122. For example, when the tip section 230 is located in the area 3670, the signal strength detected by the first electrode 121a and by the second electrode 122b is generally the same. Likewise, when the tip section 230 is located in the area 3650, the signal strength detected by the first electrode 121 is equal to of that detected by the second electrode 122.

In this embodiment, when the tip section 230 is located in the area 3620 and/or the area 3680, the signal strength detected by the first electrode 121 is larger than the signal strength detected by the second electrode 122. Similarly, when the tip section 230 is located in the area 3640 and/or the area 3660, the signal strength detected by the second electrode 122 is larger than the signal strength detected by the first electrode 121. Besides, half of the electrodes is grounded during the detecting process. Therefore, in one embodiment, if detected by the first electrode 121a or 121b, the signal strength of the area 3650 that the tip section 230 is located in is larger than the signal strength of the area 3620 or 3680 where the tip section 230 is located because some parts of the electric signals sent by the tip section 230 are grounded via the grounded second electrode 122a or 122b. Similarly, in another embodiment, if detected by the second electrode 122a or 122b, the signal strength of the area 3650 that the tip section 230 is located in is larger than the signal strength of the area 3640 or 3660 where the tip section 230 is located since some parts of the electric signals sent by the tip section 230 are grounded via the grounded first electrode 122a or 122b.

In the above-mentioned embodiment, when the located area of the tip section 230 is certain, the corresponding first electrode 121 or second electrode 122 can be chosen. In one embodiment, when the judged tip section 230 is located in the intersectional point of the first-categorized areas, such as the areas 3610, 3630, 3670, and 3690, of the first electrode 121 and the second electrode 122, the electric signals of the corresponding first electrode 121 and the second electrode 122 can be chosen to be further analyzed. When the judged tip section 230 is located in the intersectional point of the second-categorized area, such as the area 3650, of the first electrode 121 and the second electrode 122, similarly, the electric signals of one of the corresponding four first electrodes 121 and the second electrodes 122 can be chosen to be further analyzed. For instance, one of the first electrodes 121a, 121b, the second electrodes 122a, and 122b can be chosen to have a further analysis. When the judged tip section 230 is located near the first electrode 121 or the second electrode 122 and is not located in the intersectional point of the third-categorized areas of the first electrode 121 and the second electrode 122, the electric signals of the corresponding first electrode 121 or second electrode 122 can be chosen to be further analyzed. For instance, when the judged tip section 230 is located in the area 3630, the electric signals of the second electrode 122a can be chosen to be further analyzed. When the judged tip section 230 is located in the area 3680, the electric signals of the second electrode 122b can be chosen to be further analyzed. When the judged tip section 230 is located in the area 3640, the electric signals of the first electrode 121a can be chosen to be further analyzed. When the judged tip section 230 is located in the area 3660, the electric signals of the first electrode 121b can be chosen to be further analyzed.

In certain embodiments, the above analysis and estimation can include increasing the yield value of the chosen receiving terminal connected to the electrode in order to increase the SNR. Since the noise may come from the interior circuit of the receiving terminal, the noise from there can be a constant. Rising the yield value of the chosen electrode can increase the SNR.

In certain embodiments, the above analysis and estimation can include adding the signal value detected by the corresponding electrode, which may increase the SNR. Since the noise may come from the interior circuit of the receiving terminal, the noise from there can be a constant. Rising the yield value of the chosen electrode can increase the SNR. Adding the signal values detected by the adjacent electrodes can increase the SNR. For example, when the tip section 230 is located in the first-categorized and second-categorized areas mentioned above, the signal values detected by the adjacent electrodes can be added. For instance, the tip section 230 is located in the area 3650, the signals of the first electrodes 121a and 121b can be added, so can be the second electrodes 122a and 122b. Likewise, the signals of the first electrodes 121a and 121b as well as the signals of the second electrodes 122a and 122b can also be added. For instance, when the judged tip section 230 is located in the area 3610, the signals of the first electrode 121a and the second electrode 122b can also be added.

In one embodiment, this invention can add signal value detected after the yield value become larger and then get one ratio value of the two frequency signals.

Suppose the touch panel 120 include M first electrodes 121 and N second electrodes 122, the detected result of the touch sensitive processing apparatus 130 is M+N. Either one of the largest signal strengths can be directly chosen to have a further analysis, or multiple results of the largest signal strength can be added and then to have a further analysis. Besides, increasing the yield value from one or multiple electrodes with the largest signal strength to run next detection is also feasible.

It is noted that although each area shape shown in FIG. 36 is a square, the invention is not limited the shape of each area. For example, the first-categorized area could be a rectangle, circle, or oval. The second-categorized area could be a square, rectangle, circle, or oval. The third-categorized area can be the remaining area of the subtraction of the previous two categories on the touch panel.

One aspect of the present application is to provide a transmitter which comprises: a first component for receiving signal with a first frequency group, wherein a first impedance of the first component changes according to a pressure; a second component for receiving signal with a second frequency group, wherein the second component has a second impedance; and a tip section for receiving outputs of the first component and the second component and transmitting an electric signal, wherein the tip section is used to receive the pressure.

In one embodiment, the second impedance is not changed according to the pressure. Alternatively, the second impedance is changed according to the pressure, too.

In one embodiment, the transmitter further comprises a third switch and a third component serially connected to the third switch, wherein the first component is connected with the third switch and the third component in parallel. The transmitter may further comprise a fourth switch and a fourth component serially connected to the fourth switch, wherein the first component is connected with the fourth switch and the fourth component in parallel.

Alternatively, the transmitter further comprises a third switch and a third component serially connected to the third switch, wherein the second component is connected with the third switch and the third component in parallel. The transmitter may further comprise a fourth switch and a fourth component serially connected to the fourth switch, wherein the second component is connected with the fourth switch and the fourth component in parallel.

In one embodiment, the first frequency group comprises one or more first frequency, the second frequency group comprises one or more second frequency. The first frequency is different from the second frequency.

In one embodiment, the first impedance equals to the second impedance if the pressure is absent. In one embodiment, the tip section does not touch anything if the pressure is absent.

In one embodiment, a ratio of a first signal strength M1 corresponding to signal with the first frequency group and a second signal strength M2 corresponding to signal with the second frequency group is related to the pressure. The ratio is one of the followings: M1/M2, M2/M1, M1/(M1+M2), M2/(M1+M2), (M1−M2)/(M1+M2), and (M2−M1)/(M1+M2).

In one embodiment, if the ratio equals or falls into a first range, the pressure is absent. If the ratio equals or falls into a second range, the third switch is shorted and the first component is connected with the third component in parallel. If the ratio equals or falls into a third range, the fourth switch is shorted and the first component is connected with the fourth component in parallel. If the ratio equals or falls into a fourth range, the third switch and the fourth switch are shorted and the first component is connected with the third component and the fourth component in parallel. Alternatively, if the ratio equals or falls into a fifth range, the third switch is shorted and the second component is connected with the third component in parallel. If the ratio equals or falls into a sixth range, the fourth switch is shorted and the second component is connected with the fourth component in parallel. If the ratio equals or falls into a seventh range, the third switch and the fourth switch are shorted and the second component is connected with the third component and the fourth component in parallel.

In one embodiment, the first component is a force sensitive capacitor. The second component is a capacitor.

In one embodiment, the transmitter further comprises a ring electrode surrounding the tip section. The ring electrode is not electrically coupled to the tip section. In one embodiment, the ring electrode comprises one or more separate electrodes.

One aspect of the present application is to provide a transmitting method for a transmitter, which comprises a first component, a second component, and a tip section. The tip section is used to receive the outputs of the first and the second components. The method comprises changing a first impedance of the first component according to a pressure on the tip section; providing signal with a first frequency group to the first component; providing signal with a second frequency group to the second component; and transmitting an electric signal from the tip section.

One aspect of the present application is to provide a method for determining a pressure received by a transmitter, comprises: receiving an electric signal transmitted from the transmitter; calculating a first signal strength M1 corresponding to signal with a first frequency group contained in the electric signal; calculating a second signal strength M2 corresponding to signal with a second frequency group contained in the electric signal; calculating the pressure based on a ratio of the first signal strength M1 and the second signal strength M2.

In one embodiment, the step of calculating the pressure may comprises one of the followings: looking into a lookup table, linear interpolation, and quadratic curve interpolation In one embodiment, the method further comprises determining the state of the third switch according to the ratio. Alternatively, the method further comprises determining the state of the fourth switch according to the ratio.

One aspect of the present application is to provide a touch sensitive processing apparatus for determining a pressure received by a transmitter, comprises: an interface configured to connect to a plurality of first electrodes and a plurality of second electrodes of a touch panel, wherein multiple sensing points are located where the intersections of the first and second electrodes; at least one demodulator for calculating a first signal strength M1 and a second signal strength M2 corresponding to signal with a first frequency group and signal with a second frequency group contained in the electric signal, respectively; and a calculating unit for calculating the pressure based on a ratio of the first signal strength M1 and the second signal strength M2.

In one embodiment, the calculating unit further determining the state of the third switch according to the ratio. Alternatively, the calculating unit further determining the state of the fourth switch according to the ratio.

One aspect of the present application is to provide a touch sensitive system for determining a pressure received by a transmitter, comprises: the transmitter, a touch panel; and a touch sensitive processing apparatus, the transmitter comprises: a first component for receiving signal with a first frequency group, wherein a first impedance of the first component changes according to a pressure; a second component for receiving signal with a second frequency group, wherein the second component has a second impedance; and a tip section for receiving outputs of the first component and the second component and transmitting an electric signal, wherein the tip section is used to receive the pressure. The touch panel comprises a plurality of first electrodes and a plurality of second electrodes, wherein multiple sensing points are located where the intersections of the first and second electrodes. The touch sensitive processing apparatus comprises: an interface configured to connect to the plurality of first electrodes and the plurality of second electrodes of the touch panel; at least one demodulator for calculating a first signal strength M1 and a second signal strength M2 corresponding to signal with a first frequency group and signal with a second frequency group contained in the electric signal, respectively; and a calculating unit for calculating the pressure based on a ratio of the first signal strength M1 and the second signal strength M2.

One aspect of the present application is to provide a transmitter, comprises: a first component for receiving a signal source, wherein a first impedance of the first component changes according to a pressure; a second component for receiving the signal source, wherein the second component has a second impedance; a tip section for receive the pressure; and a control unit for calculating a first current value I1 and a second current value I2 from the first component and the second component, respectively, and calculating the pressure according to a ratio of the first current value I1 and the second current value I2; and a communication unit for transmitting the pressure value.

In one embodiment, the second impedance is not changed according to the pressure. Alternatively, the second impedance is changed according to the pressure, too.

In one embodiment, the communication unit comprises a wireless communication unit for transmitting the pressure value. Alternatively, the communication unit comprises a wired communication unit for transmitting the pressure value.

In one embodiment, the signal source is the wired communication unit. In one embodiment, the signal source is a signal received from the tip section.

In one embodiment, the ratio is corresponding to the pressure. The ratio may be one of the followings: I1/I2, I2/I1, I1/(I1+I2), I2/(I1+I2), (I1−I2)/(I1+I2), and (I2−I1)/(I1+I2).

In one embodiment, the first impedance equals to the second impedance if the pressure is absent.

In one embodiment, the transmitter further comprises a third switch and a third component serially connected to the third switch, wherein the first component is connected with the third switch and the third component in parallel. The transmitter may further comprise a fourth switch and a fourth component serially connected to the fourth switch, wherein the first component is connected with the fourth switch and the fourth component in parallel. In one embodiment, if the ratio equals or falls into a first range, the pressure is absent. If the ratio equals or falls into a second range, the third switch is shorted and the first component is connected with the third component in parallel. If the ratio equals or falls into a third range, the fourth switch is shorted and the first component is connected with the fourth component in parallel. If the ratio equals or falls into a fourth range, the third switch and the fourth switch are shorted and the first component is connected with the third component and the fourth component in parallel.

Alternatively, the transmitter further comprises a third switch and a third component serially connected to the third switch, wherein the second component is connected with the third switch and the third component in parallel. The transmitter may further comprise a fourth switch and a fourth component serially connected to the fourth switch, wherein the second component is connected with the fourth switch and the fourth component in parallel. Alternatively, if the ratio equals or falls into a fifth range, the third switch is shorted and the second component is connected with the third component in parallel. If the ratio equals or falls into a sixth range, the fourth switch is shorted and the second component is connected with the fourth component in parallel. If the ratio equals or falls into a seventh range, the third switch and the fourth switch are shorted and the second component is connected with the third component and the fourth component in parallel.

In one embodiment, the control unit further determining the state of the third switch according to the ratio. Alternatively, the control unit further determining the state of the fourth switch according to the ratio.

In one embodiment, the communication unit further transmits the state of the third switch. Alternatively, the communication unit further transmits the state of the fourth switch.

One aspect of the present application is to provide a transmitting method for a transmitter, which comprises a first component, a second component, and a tip section. The tip section is used to receive the outputs of the first and the second components. The method comprises changing a first impedance of the first component according to a pressure on the tip section; providing a signal source to the first component and the second component; calculating a first current value I1 and a second current value I2 from the first component and the second component, respectively; and calculating the pressure according to a ratio of the first current value I1 and the second current value I2; and transmitting the pressure value.

One aspect of the present application is to provide a touch sensitive system for determining a pressure received by a transmitter, comprises: the transmitter; and a host. The transmitter comprises: a first component for receiving a signal source, wherein a first impedance of the first component changes according to a pressure; a second component for receiving the signal source, wherein the second component has a second impedance; a tip section for receiving the pressure; and a control unit for calculating a first current value I1 and a second current value I2 from the first component and the second component, respectively, and calculating the pressure according to a ratio of the first current value I1 and the second current value I2; and a communication unit for transmitting the pressure value to the host. The host comprises a host communication unit for receiving the pressure value.

In one embodiment, the touch sensitive system further comprises a touch panel and a touch sensitive processing apparatus, wherein the touch sensitive processing apparatus coupled to the touch panel is configured to detect a position the transmitter is relative to the touch panel and to send the position to the host.

In one embodiment, the control unit further determining the state of the third switch according to the ratio. Alternatively, the control unit further determining the state of the fourth switch according to the ratio. In one embodiment, the communication unit further transmits the state of the third switch to the host. Alternatively, the communication unit further transmits the state of the fourth switch to the host. In one embodiment, the host communication unit is configured to receive the state of the third switch. Alternatively, the host communication unit is configured to receive the state of the fourth switch.

One aspect of the present application is to provide a force sensor, comprises a first input terminal for receiving signal with a first frequency group; a second input terminal for receiving signal with a second frequency group; and an output terminal for transmitting an electric signal, wherein a ratio of a first signal strength M1 and a second signal strength M2 corresponding to signal with a first frequency group and signal with a second frequency group contained in the electric signal, respectively, is corresponding to a pressure.

In one embodiment, the ratio is one of the followings: M1/M2, M2/M1, M1/(M1+M2), M2/(M1+M2), (M1−M2)/(M1+M2), and (M2−M1)/(M1+M2).

In one embodiment, the force sensor further comprises a third switch. In one embodiment, if the ratio equals or falls into a first range, the pressure is absent. If the ratio equals or falls into a second range, the third switch is shorted.

Alternatively, the force sensor further comprises a fourth switch. In one embodiment, if the ratio equals or falls into a third range, the fourth switch is shorted. If the ratio equals or falls into a fourth range, the third switch and the fourth switch are shorted.

One aspect of the present application is to provide a force sensor, comprises an input terminal for receiving a signal source; a first output terminal for outputting signal with a first current value I1; and a second output terminal for outputting signal with a second current value I2, wherein a ratio of the first current value I1 and the second current value I2 is corresponding to a pressure.

In one embodiment, the ratio may be one of the followings: I1/I2, I2/I1, I1/(I1+I2), I2/(I1+I2), (I1−I2)/(I1+I2), and (I2−I1)/(I1+I2).

In one embodiment, the force sensor further comprises a third switch. In one embodiment, if the ratio equals or falls into a first range, the pressure is absent. If the ratio equals or falls into a second range, the third switch is shorted.

Alternatively, the force sensor further comprises a fourth switch. In one embodiment, if the ratio equals or falls into a third range, the fourth switch is shorted. If the ratio equals or falls into a fourth range, the third switch and the fourth switch are shorted.

One aspect of the present application is to provide a force sensor, comprises: a first circuit board containing a first metal plate for receiving signal with a first frequency group; a second circuit board in parallel with the first circuit board, containing a second metal plate and a third metal plate which are intact, wherein the third metal plate for receiving signal with a second frequency group, the second metal plate for outputting an electric signal, wherein the second metal plate is in the middle of the first and the third metal plates; and a ramp means for bending the first circuit board upward.

One aspect of the present application is to provide a force sensor, comprises: a first circuit board containing a first metal plate for outputting signal with a first current value I1; a second circuit board in parallel with the first circuit board, containing a second metal plate and a third metal plate which are intact to each other, wherein the third metal plate for outputting signal with a second current value I2, the second metal plate for receiving a signal source, wherein the second metal plate is in the middle of the first and the third metal plates; and a ramp means for bending the first circuit board upward.

In one embodiment, part of the first metal plate is located in the bent part of the first circuit board.

In one embodiment, the force sensor further comprises a supporting element for supporting the first circuit board.

In one embodiment, the first metal plate, the second metal plate, and the third metal plate are in parallel. Alternatively, the distance between the first and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

In one embodiment, both the first and the second circuit boards are printed circuit boards.

One aspect of the application is to provide a force sensor, comprises a first circuit board containing a first metal plate and a third metal plate which are intact to each other for receiving signal with a first frequency group and signal with a second frequency group, respectively; a second circuit board in parallel with the first circuit board containing a second metal plate for outputting an electric signal; and a ramp means for bending the first circuit board upward.

One aspect of the application is to provide a force sensor, comprises a first circuit board containing a first metal plate and a third metal plate which are intact to each other for outputting signal with a first current value and signal with a second current value, respectively, a second circuit board in parallel with the first circuit board containing a second metal plate for receiving a signal source; and a ramp means for bending the first circuit board upward.

In one embodiment, the force sensor further comprises a supporting element for supporting the first circuit board.

In one embodiment, the first metal plate is in parallel with the second metal plate; the second metal plate is in parallel with the third metal plate. Alternatively, the distance between the first and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

In one embodiment, both the first and the second circuit boards are printed circuit boards.

One aspect of the application is to provide a force sensor, comprises a first circuit board containing a first metal plate and a third metal plate which are intact to each other for receiving signal with a first frequency group and signal with a second frequency group, respectively; a second circuit board in parallel with the first circuit board containing a second metal plate for outputting an electric signal; a third circuit board in parallel with the second circuit board, containing a fourth metal plate and a fifth metal plate which are intact to each other for receiving signal with the first frequency group and signal with the second frequency group, respectively; and a ramp means for bending the first circuit board upward and bending the third circuit board downward.

In one embodiment, the force sensor further comprises a first supporting element for supporting the first circuit board. In one embodiment, the force sensor further comprises a second supporting element for supporting the third circuit board.

In one embodiment, the first metal plate is in parallel with the second metal plate; the second metal plate is in parallel with the third metal plate; the fourth metal plate is in parallel with the second metal plate; the fifth metal plate is in parallel with the second metal plate. Alternatively, the distance between the first and the second metal plate equals to the distance between the second metal plate and the third metal plate. The distance between the fourth and the second metal plate equals to the distance between the second metal plate and the fifth metal plate.

In one embodiment, the first metal plate is on top of the fourth metal plate. Alternatively, the third metal plate is on top of the fifth metal plate.

In one embodiment, area of the first metal plate equals to area of the fourth metal plate. Alternatively, area of the third metal plate equals to area of the fifth metal plate.

In one embodiment, a first capacitor is formed by the first and the second metal plates; a second capacitor is formed by the second and the third metal plates; a third capacitor is formed by the fourth and the second metal plates; a fourth capacitor is formed by the second and the fifth metal plates. Alternatively, the impedance of the first capacitor equals to the impedance of the second capacitor if the first circuit board is not bending. Alternatively, the impedance of the third capacitor equals to the impedance of the fourth capacitor if the third circuit board is not bending. Alternatively, the impedance of the first capacitor equals to the impedance of the third capacitor, the impedance of the second capacitor equals to the impedance of the fourth capacitor.

In one embodiment, the first, the second, and the third circuit boards are all printed circuit boards.

One aspect of the application is to provide a force sensor, comprises a first circuit board containing a first metal plate for receiving signal with a first frequency group; a second circuit board in parallel with the first circuit board, containing a second metal plate, a third metal plate, a fourth metal plate and a fifth metal plate, which are intact and parallel to each other, wherein the third metal plate and the fourth metal plate for receiving signal with a second frequency group, wherein the second metal plate is coupled to the fifth metal plate for outputting an electric signal; a third circuit board containing a sixth metal plate for receiving signal with the first frequency board, wherein the second circuit board is placed in between the first and the third circuit boards; and a ramp means for bending the first circuit board upward and bending the third circuit board downward.

In one embodiment, the force sensor further comprises a first supporting element for supporting the first circuit board. In one embodiment, the force sensor further comprises a second supporting element for supporting the third circuit board.

In one embodiment, the first metal plate is in parallel with the second metal plate; the second metal plate is in parallel with the third metal plate; the fourth metal plate is in parallel with the fifth metal plate; and the fifth metal plate is in parallel with the six metal plate. Alternatively, the distance between the first and the second metal plate equals to the distance between the second metal plate and the third metal plate. The distance between the fourth and the fifth metal plate equals to the distance between the fifth metal plate and the sixth metal plate.

In one embodiment, the first metal plate is on top of the sixth metal plate.

In one embodiment, area of the first metal plate equals to area of the sixth metal plate. Alternatively, area of the second metal plate equals to area of the fifth metal plate. Alternatively, area of the third metal plate equals to area of the fourth metal plate.

In one embodiment, a first capacitor is formed by the first and the second metal plates; a second capacitor is formed by the second and the third metal plates; a third capacitor is formed by the fourth and the fifth metal plates; a fourth capacitor is formed by the fifth and the sixth metal plates. Alternatively, the impedance of the first capacitor equals to the impedance of the second capacitor if the first circuit board is not bending. Alternatively, the impedance of the third capacitor equals to the impedance of the fourth capacitor if the third circuit board is not bending. Alternatively, the impedance of the first capacitor equals to the impedance of the fourth capacitor, the impedance of the second capacitor equals to the impedance of the third capacitor.

In one embodiment, the first, the second, and the third circuit boards are all printed circuit boards.

One aspect of the application is to provide a force sensor, comprises: a first metal plate, a second metal plate, and third metal plate which are intact and sequentially parallel to each other, wherein the first metal plate for receiving signal with a first frequency group, the third metal plate for receiving signal with a second frequency group, the second metal plate for outputting an electric signal, wherein one end of the second metal plate is bendable.

One aspect of the application is to provide a force sensor, comprises: a first metal plate, a second metal plate, and third metal plate which are intact and sequentially parallel to each other, wherein the first metal plate for outputting signal with a first current value, the third metal plate for outputting signal with a second current value, and the second metal plate for receiving a signal source, wherein one end of the second metal plate is bendable.

In one embodiment, the distance between the first metal plate and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the second circuit board is not bending.

One aspect of the application is to provide a force sensor, comprises: a first metal plate, a second metal plate, and third metal plate which are intact and sequentially parallel to each other, wherein the first metal plate for outputting an electric signal, the second metal plate for receiving signal with a first frequency group, the third metal plate for receiving signal with a second frequency group, wherein one end of the first metal plate is bendable.

One aspect of the application is to provide a force sensor, comprises: a first metal plate, a second metal plate, and third metal plate which are intact and sequentially parallel to each other, wherein the first metal plate for receiving a signal source, the second metal plate for outputting signal with a first current value, the third metal plate for outputting signal with a second current value, wherein one end of the first metal plate is bendable.

In one embodiment, the distance between the first metal plate and the second metal plate equals to the distance between the second metal plate and the third metal plate.

In one embodiment, a first capacitor is formed by the first and the second metal plates; a second capacitor is formed by the second and the third metal plates. Alternatively, the impedance of the first capacitor equals to the impedance of the second capacitor if the first circuit board is not bending.

One aspect of the application is to provide a transmitter, comprises a moving part for moving a stroke along an axis of the transmitter; a dielectric material placing in the rear of the moving part; and a conductor placing in the rear of the dielectric material, wherein a force sensitive capacitor is formed by the moving part, the dielectric material, and the conductor.

In one embodiment, the transmitter further comprises a tip section placing in the fore of the moving part. In one embodiment, the tip section is a conductor coupling to the moving part. Alternatively, the tip section is configured to transmit an electric signal. The signal strength of certain frequency group contained in the electric signal relates to the impedance of the force sensing capacitor.

In one embodiment, the transmitter further comprises an elastic element and a shell component, wherein the elastic element is configured to provide elastic force between the moving part and the shell component such that the moving part is pushed to the fore end of the stroke by the elastic force.

In one embodiment, the dielectric material is a dielectric film. The conductor comprises a compressible conductor and a conductor base. Alternatively, the dielectric material is compressible dielectric material.

In one embodiment, a contact surface of the dielectric material facing the conductor comprises one of the following: a sloped surface, a surface with multiple bulges, a conical surface, and a surface with central bulge. Alternatively, a contact surface of the conductor facing the dielectric material comprises one of the following: a sloped surface, a surface with multiple bulges, a conical surface, and a surface with central bulge.

In one embodiment, the dielectric material and the conductor reside in an internal chamber of the shell component. Alternatively, the internal chamber is an empty cylinder.

In one embodiment, the moving part comprises a fore moving part and a rear moving part. The fore moving part contacts with the tip section and electrically couples to the tip section.

In one embodiment, the transmitter further comprises a circuit board which connects to the conductor via a base wire and connects to the moving part via a moving part wire. Alternatively, the moving part wire is coupled to the elastic element.

In one embodiment, the elastic element does not surround the moving part. Alternatively, the base wire does not surround the conductor.

One aspect of the application is to provide a circuit switch, comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point and a third point of the circuit contacts with and electrically couples to a first point of the first circuit board and a fourth point of the third circuit board, respectively.

In one embodiment, when the dual ramp means moves toward the second circuit board, the first circuit board and the third circuit board pressed by the dual ramp means and bent upward and downward, respectively, whereby the electrically coupling between the first point and the second point is open and the electrically coupling between the third point and the fourth point is open.

In one embodiment, the first point is connected with a first connection point and a high voltage in parallel, the fourth point is connected with a low voltage, the voltage level of the first connection point is low if the first point and the second point are shorted and the third point and the fourth point are shorted, the voltage level of the first connection point is high if the electrically coupling between the first point and the second point is open or the electrically coupling between the third point and the fourth point is open.

In one embodiment, the dual ramp means connects with a tip section.

In one embodiment, the circuit is placed at the edge of the first end of the second circuit board.

One aspect of the application is to provide a circuit switch, comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point of the circuit contacts with and electrically couples to a first point of the first circuit board.

In one embodiment, when the dual ramp means moves toward the second circuit board, the first circuit board and the third circuit board pressed by the dual ramp means and bent upward and downward, respectively, whereby the electrically coupling between the first point and the second point is open.

In one embodiment, the first point is connected with a first connection point and a high voltage, the second point is connected with a low voltage, the voltage level of the first connection point is low if the first point and the second point are shorted, the voltage level of the first connection point is high if the electrically coupling between the first point and the second point is open.

In one embodiment, the dual ramp means connects with a tip section.

In one embodiment, the circuit is placed at the edge of the first end of the second circuit board.

One aspect of the application is to provide a stylus, comprises: a control unit, a tip section; and a circuit switch, which comprises: a first circuit board, a second circuit board, a third circuit board which are intact and sequentially parallel to each other, and a dual ramp means, wherein a first end of the first circuit board and a first end of the third circuit board contact with the two ramps of the dual ramp means, respectively, a first end of the second circuit board does not contact with the dual ramp means, the first end of the second circuit board comprises a circuit, a second point and a third point of the circuit contacts with and electrically couples to a first point of the first circuit board and a fourth point of the third circuit board, respectively, wherein the first point connects with a first connection point of the control unit and a high voltage in parallel, the fourth point is connected with a low voltage, the voltage of the first connection port is low.

In one embodiment, when the dual ramp means moves toward the second circuit board, the first circuit board and the third circuit board pressed by the dual ramp means and bent upward and downward, respectively, whereby the electrically coupling between the first point and the second point is open and the electrically coupling between the third point and the fourth point is open, the voltage level of the first connection port is high.

In one embodiment, the control unit is waked up if the voltage level of the first connection port turns high from low.

One aspect of the application is to provide a stylus, comprises: a control unit, a tip section; and a circuit switch, which comprises: a first circuit board, a second circuit board, a third circuit board which are intact and sequentially parallel to each other, and a dual ramp means, wherein a first end of the first circuit board and a first end of the third circuit board contacts with the two ramps of the dual ramp means, respectively, a first end of the second circuit board does not contact with the dual ramp means, the first end of the second circuit board comprises a circuit, a second point of the circuit contacts with and electrically couples to a first point of the first circuit board, wherein the first point connects with a first connection point of the control unit and a high voltage in parallel, the second point is connected with a low voltage, the voltage of the first connection port is low.

In one embodiment, when the dual ramp means moves toward the second circuit board, the first circuit board and the third circuit board pressed by the dual ramp means and bent upward and downward, respectively, whereby the electrically coupling between the first point and the second point is open, the voltage level of the first connection port is high.

In one embodiment, the control unit is waked up if the voltage level of the first connection port turns high from low.

One aspect of the application is to provide a method for a transmitter, comprises: transmitting a first period electric signal during a first time period; and transmitting a second period electric signal during a second time period, wherein frequency group contained in the first period electric signal is different from frequency group contained in the second period electric signal.

One aspect of the application is to provide a transmitter, which is configured for transmitting a first period electric signal during a first time period; and transmitting a second period electric signal during a second time period, wherein frequency group contained in the first period electric signal is different from frequency group contained in the second period electric signal.

One aspect of the application is to provide a touch sensitive system, comprises a transmitter, a touch panel and a touch sensitive processing apparatus coupled to the touch panel, which is configured for detecting the transmitter according to a first period electric signal and a second period electric signal. The transmitter is configured for transmitting the first period electric signal during a first time period; and transmitting the second period electric signal during a second time period, wherein frequency group contained in the first period electric signal is different from frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. Alternatively, the interference signal comprises signals which are coherent to the first period electric signal and the second electric signal.

Please refer to the Table 1, in one embodiment, if a tip section of the transmitter does not touch, a first signal source and a second signal source of the transmitter simultaneously transmit signals with the same frequency group.

Please refer to the Table 1, in one embodiment, if the tip section of the transmitter does not touch and a first switch of the transmitter is open, the first signal source and the second signal source simultaneously transmit signals with a first frequency group; if the tip section does not touch and the first switch is shorted, the first signal source and the second signal source simultaneously transmit signals with a second frequency group, the first frequency group is different to the second frequency group.

Please refer to the Table 1, in one embodiment, if the tip section of the transmitter does not touch and a second switch of the transmitter is open, the first signal source and the second signal source simultaneously transmit signals with the first frequency group; if the tip section does not touch and the second switch is shorted, the first signal source and the second signal source simultaneously transmit signals with a third frequency group, the first frequency group is different to the third frequency group.

Please refer to the Table 2, in one embodiment, if a tip section of the transmitter does touch, a first signal source and a second signal source of the transmitter transmit signals with different frequency groups during the second time period and the first time period.

Please refer to the Table 2, in one embodiment, if the tip section of the transmitter does touch and a first switch of the transmitter is open, the second signal source transmits signal with a first frequency group during the first time period; if a tip section of the transmitter does touch and the first switch of the transmitter is shorted, the second signal source transmits signal with a second frequency group during the first time period, the first frequency group is different to the second frequency group.

Please refer to the Table 2, in one embodiment, if the tip section of the transmitter does touch and a second switch of the transmitter is open, the first signal source transmits signal with a third frequency group during the second time period; if a tip section of the transmitter does touch and the second switch of the transmitter is shorted, the first signal source transmits signal with the second frequency group during the second time period, the third frequency group is different to the second frequency group.

In one embodiment, a ratio of a first signal strength M1 transmitted by the first signal source during the second time period and a second signal strength M2 transmitted by the second signal source during the first time period is corresponding to a pressure on the transmitter.

In one embodiment, a ring electrode transmits a zeroth period electric signal during a zeroth time period, the zeroth time period is after the transmitter detects the beacon signal. Alternatively, there exists a zeroth delay time between the detection of the beacon signal and the zeroth time period.

In one embodiment, the ring electrode does not transmit electric signal during the first time period and the second time period.

In one embodiment, frequency group contained in the zeroth period electric signal is different to frequency group contained the first period electric signal and the second period electric signal.

One aspect of the application is to provide a method for a transmitter, comprises: transmitting a first period electric signal during a first time period; and transmitting a second period electric signal during a second time period, wherein frequency group contained in the first period electric signal is as the same as frequency group contained in the second period electric signal.

One aspect of the application is to provide a transmitter, which is configured for transmitting a first period electric signal during a first time period; and transmitting a second period electric signal during a second time period, wherein frequency group contained in the first period electric signal is as the same as frequency group contained in the second period electric signal.

One aspect of the application is to provide a touch sensitive system, comprises a transmitter, a touch panel and a touch sensitive processing apparatus coupled to the touch panel, which is configured for detecting the transmitter according to a first period electric signal and a second period electric signal. The transmitter is configured for transmitting the first period electric signal during a first time period; and transmitting the second period electric signal during a second time period, wherein frequency group contained in the first period electric signal is as the same as frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period.

In one embodiment, prior to the detection of the beacon signal, the transmitter detects an interference signal. Alternatively, the interference signal comprises signals which are coherent to the first time period electric signal and the second time period electric signal.

Please refer to the Table 3, in one embodiment, if a tip section of the transmitter does not touch, a first signal source and a second signal source of the transmitter simultaneously transmit signals with the same frequency group.

Please refer to the Table 3, in one embodiment, if the tip section of the transmitter does not touch and a first switch of the transmitter is open, the first signal source and the second signal source simultaneously transmit signals with a first frequency group; if the tip section does not touch and the first switch is shorted, the first signal source and the second signal source simultaneously transmit signals with a second frequency group, the first frequency group is different to the second frequency group.

Please refer to the Table 3, in one embodiment, if the tip section of the transmitter does not touch and a second switch of the transmitter is open, the first signal source and the second signal source simultaneously transmit signals with the first frequency group; if the tip section does not touch and the second switch is shorted, the first signal source and the second signal source simultaneously transmit signals with a third frequency group, the first frequency group is different to the third frequency group.

Please refer to the Table 4, in one embodiment, if a tip section of the transmitter does touch, a first signal source and a second signal source of the transmitter transmit signals with the same frequency groups during the second time period and the first time period, respectively.

Please refer to the Table 4, in one embodiment, if a tip section of the transmitter does touch and a first switch of the transmitter is open, the second signal source transmits signal with a first frequency group during the first time period; if a tip section of the transmitter does touch and the first switch of the transmitter is shorted, the second signal source transmits signal with a second frequency group during the first time period, the first frequency group is different to the second frequency group.

Please refer to the Table 4, in one embodiment, if the tip section of the transmitter does touch and a second switch of the transmitter is open, the first signal source transmits signal with a third frequency group during the second time period; if a tip section of the transmitter does touch and the second switch of the transmitter is shorted, the first signal source transmits signal with the second frequency group during the second time period, the third frequency group is different to the second frequency group.

In one embodiment, a ring electrode transmits a zeroth period electric signal during a zeroth time period, the zeroth time period is after the transmitter detects the beacon signal. Alternatively, there exists a zeroth delay time between the detection of the beacon signal and the zeroth time period.

In one embodiment, the ring electrode does not transmit electric signal during the first time period and the second time period.

In one embodiment, frequency group contained in the zeroth period electric signal is the same as frequency group contained the first period electric signal and the second period electric signal.

In one embodiment, a ratio of a first signal strength M1 transmitted by the first signal source during the second time period and a second signal strength M2 transmitted by the second signal source during the first time period is corresponding to a pressure on the transmitter.

One aspect of the application is to provide a method for detecting a transmitter, comprises: detecting a first period electric signal emitted from the transmitter during a first time period; and detecting a second period electric signal emitted from the transmitter from a second time period, wherein frequency group contained in the first period electric signal is different from frequency group contained in the second period electric signal.

One aspect of the application is to provide a touch sensitive processing apparatus for detecting a transmitter, coupled to a touch panel which comprises a plurality of first electrodes and a plurality of second electrodes as well as multiple sensing points located where the intersections, the touch sensitive processing apparatus is configured for detecting a first period electric signal emitted from the transmitter during a first time period; and detecting a second period electric signal emitted from the transmitter from a second time period, wherein frequency group contained in the first period electric signal is different from frequency group contained in the second period electric signal.

One aspect of the application is to provide a touch sensitive system comprises a transmitter, a touch panel, and a touch sensitive processing apparatus, coupled to the touch panel, configured for detecting a first period electric signal emitted from the transmitter during a first time period; and detecting a second period electric signal emitted from the transmitter from a second time period, wherein frequency group contained in the first period electric signal is different from frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period. In another embodiment, other detection steps are still included after the second time period.

In one embodiment, prior to the detection of the beacon signal, the transmitter detects an interference signal. In one embodiment, an interference signal is detected after the first time period. In one embodiment, an interference signal is detected after the second time period. Alternatively, the interference signal comprises signals which are coherent to the first period electric signal and the second period electric signal.

Please refer to the Table 1, in one embodiment, if the transmitter simultaneously transmits signals with the same frequency group, it is determined that a tip section of the transmitter does not touch.

Please refer to the Table 1, in one embodiment, if the transmitter transmits signals with a first frequency group during a first time period, it is determined that the tip section does not touch and a first switch of the transmitter is open; if the transmitter transmits signals with a second frequency group during the first time period, it is determined that the tip section does not touch and the first switch of the transmitter is shorted, wherein the first frequency group is different to the second frequency group.

Please refer to the Table 1, in one embodiment, if the transmitter transmits signals with a first frequency group during a second time period, it is determined that the tip section does not touch and a second switch of the transmitter is open; if the transmitter transmits signals with a third frequency group during the second time period, it is determined that the tip section does not touch and the second switch of the transmitter is shorted, wherein the first frequency group is different to the third frequency group.

Please refer to the Table 2, in one embodiment, if the transmitter transmits signals with different frequency groups during the first time period and the second time period, it is determined that a tip section of the transmitter does touch.

Please refer to the Table 2, in one embodiment, if the transmitter transmits signal with a first frequency group during the first time period, it is determined that the tip section does touch and a first switch of the transmitter is open; if the transmitter transmits signal with a second frequency group during the first time period, it is determined that the tip section does touch and the first switch of the transmitter is shorted, wherein the first frequency group is different to the second frequency group.

Please refer to the Table 2, in one embodiment, if the transmitter transmits signal with a third frequency group during the second time period, it is determined that the tip section does touch and a second switch of the transmitter is open; if the transmitter transmits signal with a second frequency group during the second time period, it is determined that the tip section does touch and the second switch of the transmitter is shorted, wherein the third frequency group is different to the second frequency group.

In one embodiment, a ratio of a first signal strength M1 transmitted by the first signal source during the second time period and a second signal strength M2 transmitted by the second signal source during the first time period is calculated; and a pressure on the transmitter according to the ratio is calculated.

In one embodiment, detecting a zeroth period electric signal transmitted by the transmitter during a zeroth time period, the zeroth time period is after the transmitter detects the beacon signal. Alternatively, there exists a zeroth delay time between the detection of the beacon signal and the zeroth time period.

In one embodiment, frequency group contained in the zeroth period electric signal is different to frequency group contained in the first period electric signal and the second period electric signal.

One aspect of the application is to provide a method for detecting a transmitter, comprises: detecting a first period electric signal emitted from the transmitter during a first time period; and detecting a second period electric signal emitted from the transmitter from a second time period, wherein frequency group contained in the first period electric signal is as the same as frequency group contained in the second period electric signal.

One aspect of the application is to provide a touch sensitive processing apparatus for detecting a transmitter, coupled to a touch panel which comprises a plurality of first electrodes and a plurality of second electrodes as well as multiple sensing points located where the intersections, the touch sensitive processing apparatus is configured for detecting a first period electric signal emitted from the transmitter during a first time period; and detecting a second period electric signal emitted from the transmitter from a second time period, wherein frequency group contained in the first period electric signal is as the same as frequency group contained in the second period electric signal.

One aspect of the application is to provide a touch sensitive system comprises a transmitter, a touch panel, and a touch sensitive processing apparatus, coupled to the touch panel which comprises a plurality of first electrodes and a plurality of second electrodes as well as multiple sensing points located where the intersections, the touch sensitive processing apparatus is configured for detecting a first period electric signal emitted from the transmitter during a first time period; and detecting a second period electric signal emitted from the transmitter from a second time period, wherein frequency group contained in the first period electric signal is as the same as frequency group contained in the second period electric signal.

In one embodiment, the frequency group contains one or more frequencies.

In one embodiment, the first time period is after a beacon signal detected by the transmitter. Alternatively, there exists a first delay time between the beacon signal detection and the first time period.

In one embodiment, there exists a second delay time between the first time period and the second time period.

In one embodiment, there exists a third delay time after the second time period. In another embodiment, other detection steps are still included after the second time period.

In one embodiment, prior to the detection of the beacon signal, the transmitter detects an interference signal. In one embodiment, an interference signal is detected after the first time period. In one embodiment, an interference signal is detected after the second time period. Alternatively, the interference signal comprises signals which are coherent to the first period electric signal and the second period electric signal.

Please refer to the Table 3, in one embodiment, if the first period electric signals with the same frequency group and the second period electric signals with the same frequency group, it is determined that a tip section of the transmitter does not touch.

Please refer to the Table 3, in one embodiment, if the transmitter transmits signals with a first frequency group, it is determined that the tip section does not touch and a first switch of the transmitter is open; if the transmitter transmits signals with a second frequency group, it is determined that the tip section does not touch and the first switch of the transmitter is shorted, wherein the first frequency group is different to the second frequency group.

Please refer to the Table 3, in one embodiment, if the transmitter transmits signals with a first frequency group, it is determined that the tip section does not touch and a second switch of the transmitter is open; if the transmitter transmits signals with a third frequency group, it is determined that the tip section does not touch and the second switch of the transmitter is shorted, wherein the first frequency group is different to the third frequency group.

Please refer to the Table 4, in one embodiment, if the first period electric signals with the same frequency group and the second period electric signals with the same frequency group and a ratio of a signal strength M1 of the first period electric signal and a signal strength M2 of the second period electric signal does not fall into a first range, it is determined that a tip section of the transmitter does not touch.

Please refer to the Table 4, in one embodiment, if the transmitter transmits signal with a first frequency group during the first time period and the ratio does not fall into a first range, it is determined that the tip section does touch and a first switch of the transmitter is open; if the transmitter transmits signal with a second frequency group during the first time period and the ratio does not fall into the first range, it is determined that the tip section does touch and the first switch of the transmitter is shorted, wherein the first frequency group is different to the second frequency group.

Please refer to the Table 4, in one embodiment, if the transmitter transmits signal with a third frequency group during the second time period and the ratio does not fall into a first range, it is determined that the tip section does touch and a second switch of the transmitter is open; if the transmitter transmits signal with a second frequency group during the second time period and the ratio does not fall into the first range, it is determined that the tip section does touch and the second switch of the transmitter is shorted, wherein the third frequency group is different to the second frequency group.

In one embodiment, a ratio of a first signal strength M1 transmitted by the first signal source during the second time period and a second signal strength M2 transmitted by the second signal source during the first time period is calculated; and a pressure on the transmitter according to the ratio is calculated.

In one embodiment, detecting a zeroth period electric signal transmitted by the transmitter during a zeroth time period, the zeroth time period is after the transmitter detects the beacon signal. Alternatively, there exists a zeroth delay time between the detection of the beacon signal and the zeroth time period.

In one embodiment, frequency group contained in the zeroth period electric signal is as the same as frequency group contained the first period electric signal and the second period electric signal.

One aspect of the present application is to provide a transmitter, comprises: a tip section and a ring electrode surrounding the tip section, wherein the tip section is not electrically coupling to the ring electrode.

In one embodiment, the ring electrode comprises multiple disconnected electrodes.

In one embodiment, the transmitter transmits electric signals via the ring electrode and the tip section during a zeroth time period. In another embodiment, the transmitter transmits electric signals via the tip section during a first time period. Alternatively, the first time period is after the zeroth time period.

In one embodiment, electric signals emitted from the ring electrode and the tip section contains the same frequency group. Alternatively, electric signal emitted from the ring electrode contains frequency group different to the frequency group contained in the electric signal emitted from the tip electrode.

One aspect of the present application is to provide a method for detecting a position of a transmitter, wherein the transmitter comprises a tip section and a ring electrode surrounding the tip section, wherein the tip section is not electrically coupling to the ring electrode, the method comprises detecting electric signals emitted from the ring electrode and the tip section during a zeroth time period; and detecting electric signals emitted from the tip section during a first time period.

One aspect of the present application is to provide a touch sensitive processing apparatus for detecting a position of a transmitter, wherein the transmitter comprises a tip section and a ring electrode surrounding the tip section, wherein the tip section is not electrically coupling to the ring electrode, the touch sensitive processing apparatus is coupled to a touch panel which comprises a plurality of first electrodes and a plurality of second electrodes and multiple sensing points located where the intersections, the touch sensitive processing apparatus is configured for detecting electric signals emitted from the ring electrode and the tip section during a zeroth time period; and detecting electric signals emitted from the tip section during a first time period.

One aspect of the present application is to provide a touch sensitive system, comprises a transmitter, a touch panel, and a touch sensitive processing apparatus coupled to the touch panel. The transmitter comprises a tip section and a ring electrode surrounding the tip section, wherein the tip section is not electrically coupling to the ring electrode. The touch sensitive processing apparatus is coupled to a touch panel which comprises a plurality of first electrodes and a plurality of second electrodes and multiple sensing points located where the intersections, the touch sensitive processing apparatus is configured for detecting electric signals emitted from the ring electrode and the tip section during a zeroth time period; and detecting electric signals emitted from the tip section during a first time period.

In one embodiment, electric signals emitted from the ring electrode and the tip section contain the same frequency group. Alternatively, electric signals emitted from the ring electrode contain frequency group different to the frequency group contained in the electric signals emitted from the tip electrode.

In one embodiments, the first time period is after the zeroth time period.

In one embodiment, the method further comprises calculating a first centroid position of the transmitter according to the electric signal detected during the zeroth time period. Alternatively, the method further comprises calculating a second centroid position of the transmitter according to the electric signal detected during the first time period.

In one embodiment, the method further comprises calculating a surface position where the transmitter touches the touch panel according to the first centroid position and the second centroid position, wherein the surface position is the position where the axis of the tip section projecting to a surface layer of the touch panel.

In one embodiment, the method further comprises calculating a display position where the transmitter touches the touch panel according to the first centroid position and the second centroid position, wherein the display position is the position where the axis of the tip section projecting to a display layer of the touch panel.

In one embodiment, the method further comprises calculating an inclination angle of the transmitter touches the touch panel according to the first centroid position and the second centroid position.

One aspect of the present application is to provide a method for calculating a surface position where a transmitter touches a touch panel, the method comprises: receiving a first centroid position of the transmitter, wherein the first centroid is calculated according to electric signals emitted from a ring electrode and a tip section of the transmitter, receiving a second centroid position of the transmitter, wherein the second centroid is calculated according to electric signals emitted from the tip section of the transmitter; and calculating the surface position where the transmitter touches the touch panel according to the first centroid position and the second centroid position, wherein the surface position is the position where the axis of the tip section projecting to a surface layer of the touch panel.

One aspect of the present application is to provide a method for calculating a display position where a transmitter touches a touch panel, the method comprises: receiving a first centroid position of the transmitter, wherein the first centroid position is calculated according to electric signals emitted from a ring electrode and a tip section of the transmitter, receiving a second centroid position of the transmitter, wherein the second centroid position is calculated according to electric signals emitted from the a tip section of the transmitter; and calculating the display position where the transmitter touches the touch panel according to the first centroid position and the second centroid position, wherein the display position is the position where the axis of the tip section projecting to a display layer of the touch panel.

One aspect of the present application is to provide a method for calculating an inclination angle of a transmitter touches a touch panel, the method comprises: receiving a first centroid position of the transmitter, wherein the first centroid position is calculated according to electric signals emitted from a ring electrode and a tip section of the transmitter, receiving a second centroid position of the transmitter, wherein the second centroid position is calculated according to electric signals emitted from the a tip section of the transmitter; and calculating the inclination angle according to the first centroid position and the second centroid position.

In one embodiment, the first centroid position is calculated during a zeroth time period. In one embodiment, the second centroid position is calculated during a first time period. Alternatively, the first time period is after the zeroth time period. In one embodiment, electric signal emitted from the ring electrode contains frequency group different to the frequency group contained in the electric signal emitted from the tip electrode.

One aspect of the present application is to provide a display method, comprises: receiving a position of a transmitter; receiving an inclination angle of the transmitter; determining a display area according to the position and the inclination angle.

In one embodiment, the position is one of the followings: a first centroid position, a second centroid position, a surface position; and a display position. The first centroid position is calculated according to electric signals emitted from a ring electrode and a tip section of the transmitter. The second centroid position is calculated according to electric signals emitted from the tip section of the transmitter. The surface position is the position where the axis of the tip section projecting to a surface layer of the touch panel. The display position is the position where the axis of the tip section projecting to a display layer of the touch panel. In one embodiment, electric signal emitted from the ring electrode contains frequency group different to the frequency group contained in the electric signal emitted from the tip electrode.

In one embodiment, the display area comprises an ellipse. Alternatively, the position is located one of the followings: a center of the ellipse, one of two focal points of the ellipse; and one of intersections of the semi-major axis and the ellipse. In one embodiment, the semi-major axis is corresponding to the direction of the inclination angle.

In one embodiment, the display area comprises a tear drop shape. Alternatively, the position is located one of the followings: a center of the tear drop shape, a top of the tear drop shape; and an end of the tear drop shape. In one embodiment, the direction of the tear drop shape is corresponding to the direction of the inclination angle.

In one embodiment, the direction of the display area is corresponding to the direction of the inclination angle. Alternatively, the size of the display area is corresponding to the inclination angle. Alternatively, the color of the display area is corresponding to one of the followings: the inclination angle; and the direction of the inclination angle.

In one embodiment, it further comprises receiving a pressure of the transmitter; the size of the display area is corresponding to the pressure.

One aspect of the present application is to provide a method for controlling the transmitter, comprises: transmitting a first electric signal with a first signal strength if a force sensor of the transmitter does not sense any force; transmitting a second electric signal with a second signal strength if the force sensor does sense force, wherein the first signal strength is larger than the second signal strength.

In one embodiment, the force sensor comprises a tip section of the transmitter.

In one embodiment, the transmitter further comprises a ring electrode. The first electric signal is transmitted via the tip section and the ring electrode, the second electric signal is transmitted via the tip section.

One aspect of the application is to provide a transmitter, comprises a force sensor and a control unit, which is configured to transmit a first electric signal with a first signal strength if a force sensor of the transmitter does not sense any force; transmitting a second electric signal with a second signal strength if the force sensor does sense force, wherein the first signal strength is larger than the second signal strength.

Figure 30:
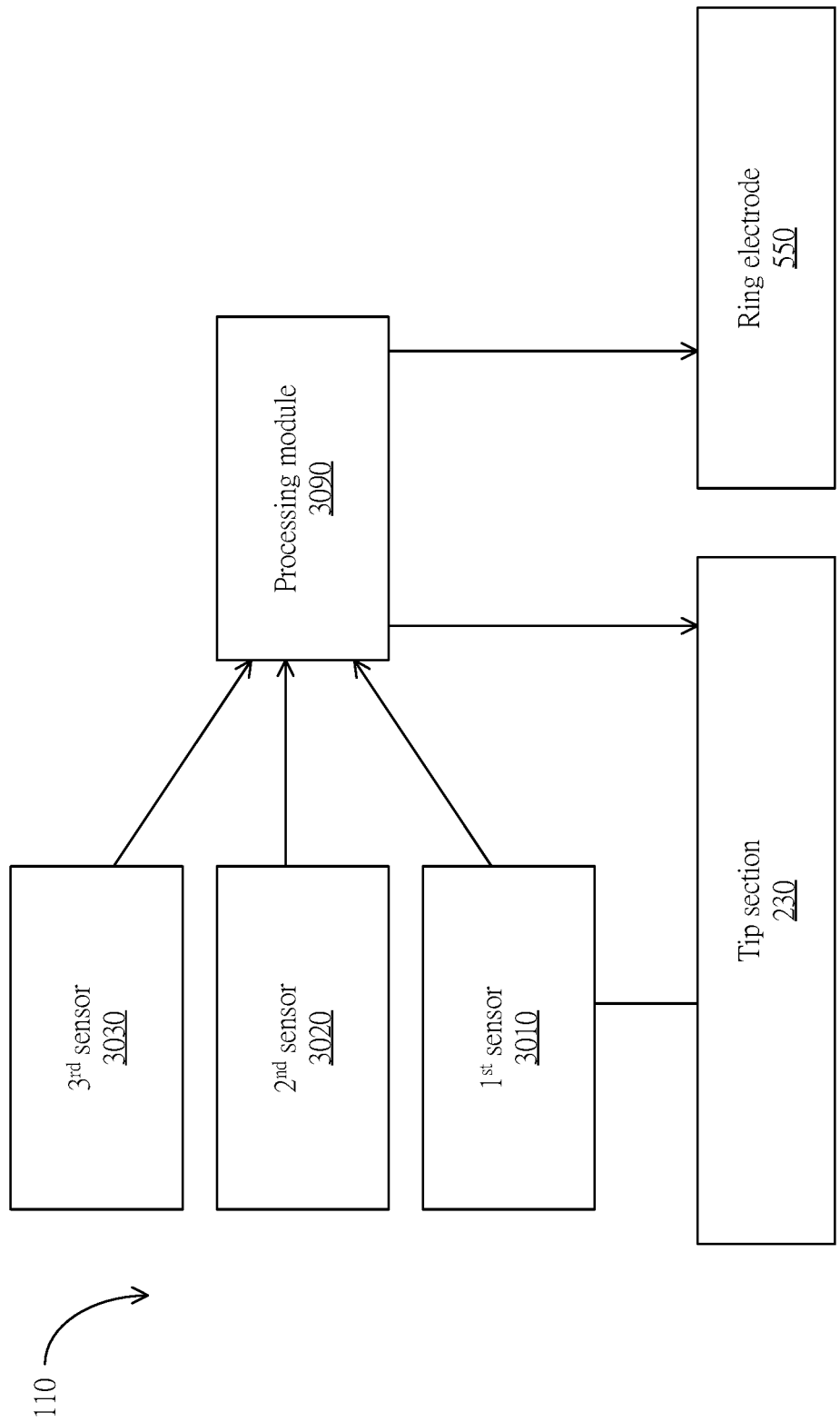
FIG. 30 illustrates a block diagram of a transmitter in accordance with an embodiment of the present invention.

Referring to FIG. 30, a block diagram of a transmitter 110 in accordance with an embodiment of the present invention is illustrated. The transmitter 110 includes a first sensor 3010, a second sensor 3020, a third sensor 3030, and a processing module 3090 connecting to the sensors 3010, 3020, and 3030. The transmitter 110 may further include a tip section 230 and a ring electrode 550 surrounding the tip section 230. In one embodiment, the first sensor 3010 senses a pressure value on the tip section 230, transferring the pressure value into a digital sensing value, and then transmits the digital sensing value to the processing module 3090. The second and the third sensors 3020 and 3030 could transmit the digital sensing value to the processing module 3090 as well. The processing module 3090 emits each electric signal to the tip section and/or the ring electrode to show at least one or all part of the digital sensing value of each sensor.

Referring to FIG. 9A to FIG. 9I, and FIG. 30, one of the features of the present invention is to provide a transmitter including a first sensor and a processing module connecting to the first sensor. Wherein, the processing module is used to emit a first electric signal during a first time period, and the first electric signal is used to represent at least one part of a digital sensing value of the first sensor.

In one embodiment, the digital sensing value is a pressure digital value, which the first sensor senses the pressure on the tip section of the transmitter. Alternatively, the processing module emits the first electric signal by the tip section.

In one embodiment, the first electric signal includes a transmitted state and a non-transmitted state.

In one embodiment, the first electric signal is used to represent a first digit of the digital sensing value in numeral system based on N, where N is bigger than or equal to 2. In another embodiment, the first electric signal includes at least N−1 state value. In still another embodiment, the first electric signal further includes any or any combination of the redundancy code, the error correcting code, and the check code of the state value thereof.

In one embodiment, the transmitting time length of the first electric signal relates to the first digit's value and a unit time length.

In one embodiment, the pulse-repeating frequency of the first electric signal relates to the first digit's value.

In one embodiment, the processing module is used to emits a second electric signal, the second electric signal is used to represent a second digit of the digital sensing value in numeral system based on M, where M is bigger than or equal to 2. In another embodiment, M is not equal to N. In another embodiment, the second electric signal includes at least M−1 state value. Wherein, the second electric signal further includes any or any combination of the redundancy code, the error correcting code, and the check code of the state value thereof.

In one embodiment, the transmitting time length of the second electric signal relates to the second digit's value and a unit time length, an interval between the first and the second time periods does not transmit the electric signal.

In one embodiment, the pulse-repeating frequency of the second electric signal relates to the second digit's value. In another embodiment, the first time length is equal to the second time length.

In one embodiment, the transmitter further includes a second sensor, and wherein the processing module is used to emits a third electric signal in a third time period, the third electric signal is used to represent the digital sensing value of the second sensor. In another embodiment, the transmitter further includes a third sensor, and the third electric signal is further to represent the digital sensing value of the third sensor. In another embodiment, the third time period is after the transmitter receiving a beacon signal, the first time period is after the third time period. In still another embodiment, the transmitter further includes a ring electrode surrounding the tip section, the third electric signal is emitted by the tip section or the ring electrode or the combination of them.

Figure 31:
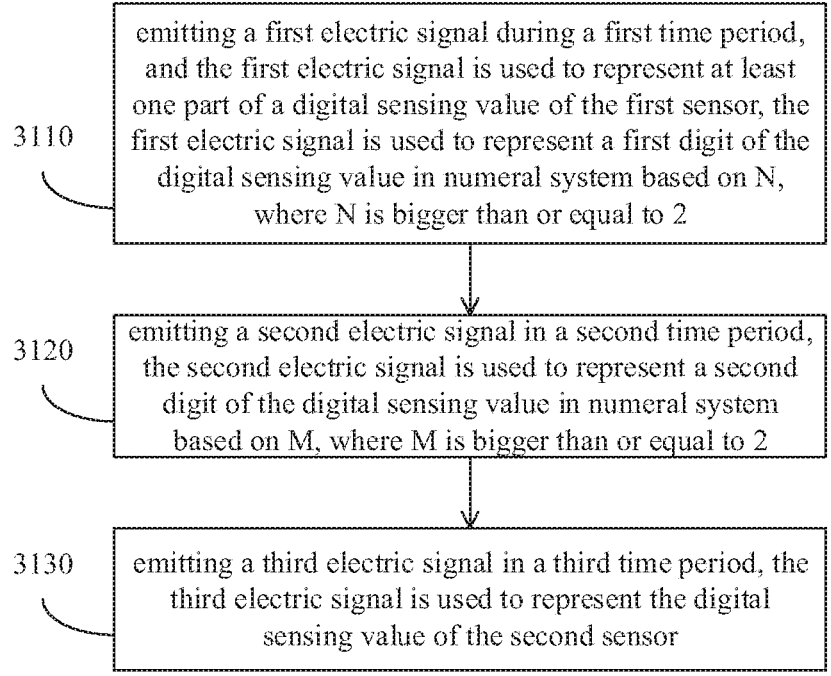
FIG. 31 shows a flow chart of a method for controlling a transmitter in accordance with an embodiment of the present invention.

Referring to FIG. 31, a flow chart of controlling method for a transmitter in accordance with an embodiment of the present invention is illustrated. This controlling method may adapt to the transmitter shown in FIG. 30. It is noted that the steps 3110, 3120, and 3130 have no relationship in sequence, they can be performed in any order.

Referring to FIG. 9A to FIG. 9I, FIG. 30, and FIG. 31, one of the features of the present invention is to provide a controlling method for a transmitter. The transmitter included a first sensor. The controlling method includes step 3110, emitting a first electric signal during a first time period, and the first electric signal is used to represent at least one part of a digital sensing value of the first sensor.

In one embodiment, the controlling method further includes utilizing the first sensor to sense a pressure digital value, which is the pressure on the tip section of the transmitter sensed by the first sensor, so as to get a digital sensing value of the first sensor. Alternatively, the controlling method further includes emitting the first electric signal by the tip section.

In one embodiment, the first electric signal includes a transmitted state and a non-transmitted state.

In one embodiment, the first electric signal is used to represent a first digit of the digital sensing value in numeral system based on N, where N is bigger than or equal to 2 (step 3310). In another embodiment, the first electric signal includes at least N−1 state value. In still another embodiment, the first electric signal further includes any or any combination of the redundancy code, the error correcting code, and the check code of the state value thereof.

In one embodiment, the transmitting time length of the first electric signal relates to the first digit's value and a unit time length.

In one embodiment, the pulse-repeating frequency of the first electric signal relates to the first digit's value.

In one embodiment, the controlling method further includes emitting a second electric signal in a second time period, the second electric signal is used to represent a second digit of the digital sensing value in numeral system based on M, where M is bigger than or equal to 2 (step 3120). In another embodiment, M is not equal to N. In another embodiment, the second electric signal includes at least M−1 state value. Wherein, the second electric signal further includes any or any combination of the redundancy code, the error correcting code, and the check code of the state value thereof.

In one embodiment, the transmitting time length of the second electric signal relates to the second digit's value and a unit time length, an interval between the first and the second time periods does not transmit the electric signal.

In one embodiment, the pulse-repeating frequency of the second electric signal relates to the second digit's value. In another embodiment, the first time length is equal to the second time length.

In one embodiment, the transmitter further includes a second sensor, and wherein the controlling method further includes emitting a third electric signal in a third time period, the third electric signal is used to represent the digital sensing value of the second sensor (step 3130). In another embodiment, the transmitter further includes a third sensor, and the third electric signal is further to represent the digital sensing value of the third sensor. In another embodiment, the third time period is after the transmitter receiving a beacon signal, the first time period is after the third time period. In still another embodiment, the transmitter further includes a ring electrode surrounding the tip section, the third electric signal is emitted by the tip section or the ring electrode or the combination of them.

Figure 32:
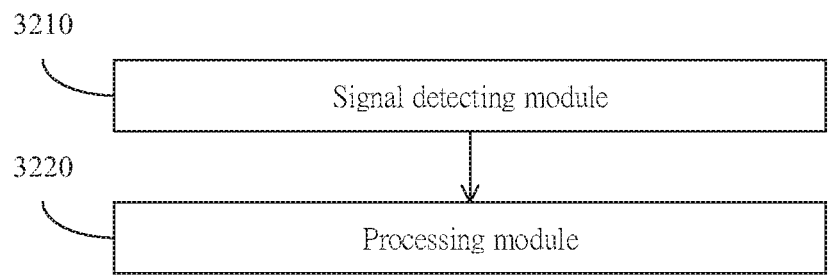
FIG. 32 illustrates a block diagram of a touch processing apparatus in accordance with an embodiment of the present invention.

Referring to FIG. 32, a block diagram of a touch sensitive processing apparatus in accordance with an embodiment of the present invention is illustrated. The touch sensitive processing apparatus could be the touch sensitive processing apparatus 130 shown in FIG. 1, which is used to connect multiple the first and the second electrodes 121 and 122 of the touch panel 120, and is used to detect the state of the sensor of a transmitter 110 approaching or touching the touch panel 120. The touch sensitive processing apparatus includes a signal detecting module and a processing module.

Referring to FIG. 9A to FIG. 9F, and FIG. 32, one of the features of the present invention is to provide a touch sensitive processing apparatus connecting to multiple the first and the second electrodes of a touch panel, detecting the state of the sensor of a transmitter approaching or touching the touch panel, and includes a signal detecting module 3210 used to detect a first electric signal received by one of the multiple first and second electrodes in a first time period and a processing module 3220 used to receive the first electric signal from the signal detecting module to determine a first digital value based on the first electric signal so as to denote at least one part of the digital sensing value of a first sensor of the transmitter.

In one embodiment, the touch sensitive processing apparatus further includes a beacon signal transmitting module used to transmit a beacon signal by the multiple first and second electrodes. In another embodiment, the transmitting time of the beacon signal is earlier than the first time period.

In one embodiment, the first digital value determined by the processing module is used to represent a first digit of the first sensor's digital sensing value in numeral system based on N, where N is bigger than or equal to 2. In another embodiment, the multiple first state values include at least N−1 state value. In still another embodiment, the multiple first state values further include any or any combination of the redundancy code, the error correcting code, and the check code.

In one embodiment, the transmitting time length of the first electric signal relates to the first digit's value and a unit time length.

In one embodiment, the pulse-repeating frequency of the first electric signal relates to the first digit's value.

In one embodiment, the signal detecting module is further used to detect a second electric signal received by one of the multiple first and second electrodes in a second time period, and the processing module is further used to receive the second electric signal from the signal detecting module to determine a second digital value based on the second electric signal so as to represent a second digit of the first sensor's digital sensing value of the transmitter in numeral system based on M, where M is bigger than or equal to 2. In another embodiment, M is not equal to N. In another embodiment, the multiple second state values include at least M−1 state value. In another embodiment, the multiple state values further include any or any combination of the redundancy code, the error correcting code, and the check code.

In one embodiment, the transmitting time length of the second electric signal relates to the second digit's value and a unit time length, an interval between the first and the second time periods does not transmit the electric signal.

In one embodiment, the pulse-repeating frequency of the second electric signal relates to the second digit's value. In another embodiment, the first time length is equal to the second time length.

In one embodiment, the signal detecting module is further used to detect a third electric signal received by one of the multiple first and second electrodes in a third time period, and the processing module is further used to receive the third electric signal from the signal detecting module to determine a third digital value based on the third electric signal so as to represent a second sensor's digital sensing value of the transmitter. In another embodiment, the third digital value is further used to represent a third sensor's digital sensing value of the transmitter.

In one embodiment, the signal detecting module includes a filter used to filter out the noise of frequency unintended to receive, an integrator used to sample the filtered signal, and a comparator used to compare the sampled signal whether bigger than a predefined value, if yes, it means the electric signal transmitted by the transmitter is detected. In one embodiment, the integrator includes dual-slope integrator.

In one embodiment, the signal detecting module includes a demodulator used to multiply the sampled signal and the frequency signal the demodulator intends to receive and then sum them up. When the sum is bigger than a predetermined value, it means the electric signal transmitted by the transmitter is detected.

Figure 33:
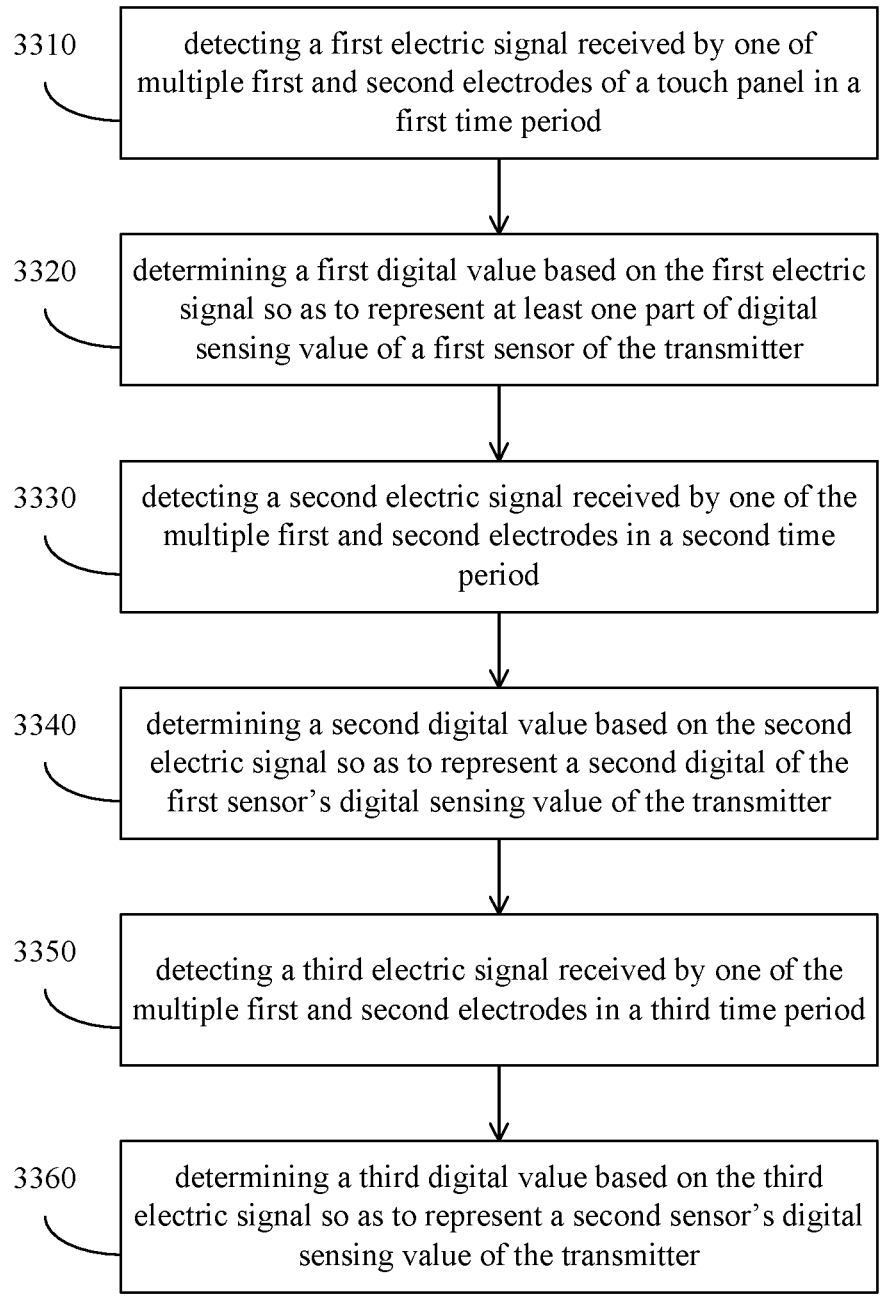
FIG. 33 shows a flow chart of a method for detecting the status of a transmitter in accordance with an embodiment of the present invention.

Referring to FIG. 33, a flow chart of a method for detecting the status of a transmitter in accordance with an embodiment of the present invention is illustrated. This detecting method could be adapted to the touch sensitive processing apparatus shown in FIG. 32. It is noted that these steps could be performed in order except for specially required relationship.

Referring to FIG. 9A to FIG. 9F, FIG. 32, and FIG. 33, one of the features of the present invention is to provide a method for detecting the status of a transmitter. The method includes detecting a first electric signal received by one of multiple first and second electrodes of a touch panel in a first time period (step 3310), and determining a first digital value based on the first electric signal so as to represent at least one part of digital sensing value of a first sensor of the transmitter (step 3320).

In one embodiment, the detecting method further includes transmitting a beacon signal by the multiple first and second electrodes. In another embodiment, the transmitting time of the beacon signal is earlier than the first time period.

In one embodiment, the first digital value is used to represent a first digit of the first sensor's digital sensing value in numeral system based on N, where N is bigger than or equal to 2. In another embodiment, the multiple first state values include at least N−1 state value. In still another embodiment, the multiple first state values further include any or any combination of the redundancy code, the error correcting code, and the check code.

In one embodiment, the transmitting time length of the first electric signal relates to the first digit's value and a unit time length.

In one embodiment, the pulse-repeating frequency of the first electric signal relates to the first digit's value.

In one embodiment, the detecting method further includes detecting a second electric signal received by one of the multiple first and second electrodes in a second time period (step 3330), and determining a second digital value based on the second electric signal so as to represent a second digit of the first sensor's digital sensing value of the transmitter in numeral system based on M (step 3340), where M is bigger than or equal to 2. In another embodiment, M is not equal to N. In another embodiment, the multiple second state values include at least M−1 state value. In another embodiment, the multiple state values further include any or any combination of the redundancy code, the error correcting code, and the check code.

In one embodiment, the transmitting time length of the second electric signal relates to the second digit's value and a unit time length, an interval between the first and the second time periods does not transmit the electric signal.

In one embodiment, the pulse-repeating frequency of the second electric signal relates to the second digit's value. In another embodiment, the first time length is equal to the second time length.

In one embodiment, the detecting method further includes detecting a third electric signal received by one of the multiple first and second electrodes in a third time period (step 3350), and determining a third digital value based on the third electric signal so as to represent a second sensor's digital sensing value of the transmitter (step 3360). In another embodiment, the third digital value is further used to represent a third sensor's digital sensing value of the transmitter.

In one embodiment, the detecting method further includes a filtering step used to filter out the noise of unintended to receive frequency, an integrating step used to sample the filtered signal, and a comparing step used to compare the sampled signal whether bigger than a predefined value, if yes, it means the electric signal transmitted by the transmitter is detected. In one embodiment, the integrating step includes using a dual-slope integrator.

In one embodiment, the detecting method includes multiplying the sampled signal and the intending to receive frequency signal and then summing them up. When the sum is bigger than a predetermined value, it means the electric signal transmitted by the transmitter is detected.

Referring to FIG. 1, FIG. 9A to FIG. 9I, FIG. 30, and FIG. 32, one of the features of the present invention is to provide a touch sensitive system including a transmitter, a touch panel, and a touch sensitive processing apparatus connecting to multiple first and second electrodes of the touch panel. The transmitter includes a first sensor, and a transmitter processing module connecting to the first sensor, wherein the transmitter processing module is used to emit a first electric signal in a first time period, and the first electric signal is used to represent at least one part of digital sensing value of the first sensor. The touch sensitive processing apparatus includes a signal detecting module used to detect the first electric signal received by one of the multiple first and second electrodes in the first time period, and a touch sensitive processing apparatus processing module used to receive the first electric signal from the signal detecting module to determine a first digital value based on the first electric signal so as to denote at least one part of the digital sensing value of the first sensor.

Please refer to FIG. 1 and FIG. 34A to FIG. 34B. One of the features of the present invention is to provide a transmitter used to receive a beacon signal from a touch panel and relatively emitting an electric signal with a first frequency to the touch panel such that a touch sensitive processing apparatus connecting to the touch panel know a position the transmitter corresponding to the touch panel. Wherein, when the transmitter determines the beacon signal with a first beacon signal frequency being interfered, it becomes to receive the beacon signal with a second beacon signal frequency and relatively emits the electric signal with the first frequency to the touch panel.

In one embodiment, when the transmitter determines the beacon signal with the second beacon signal frequency being interfered, it becomes to receive the beacon signal with a specify beacon signal frequency and relatively emits the electric signal with the second frequency to the touch panel.

One of the features of the present invention is to provide a controlling method of the transmitter including receiving a beacon signal from a touch panel, and relatively emitting an electric signal with a first frequency to the touch panel so as to let a touch sensitive processing apparatus connecting to the touch panel know a position the transmitter corresponding to the touch panel. Wherein, when the transmitter determines the beacon signal with a first beacon signal frequency being interfered, it becomes to receive the beacon signal with a second beacon signal frequency and relatively emits the electric signal with the first frequency to the touch panel.

In one embodiment, the controlling method further includes when determining the beacon signal with the second beacon signal frequency being interfered, turning to receive the beacon signal with a specify beacon signal frequency and relatively emitting the electric signal with the second frequency to the touch panel.

One of the features of the present invention is to provide a touch sensitive processing apparatus used to connect to a touch panel to emit a beacon signal with a first beacon signal frequency to a transmitter and through the touch panel to receive an electric signal with a first frequency emitted by the transmitter so as to know a position the transmitter corresponding to the touch panel. Wherein, when the touch sensitive processing apparatus determines the electric signal with a first frequency being interfered, it further emits the beacon signal with a specify beacon signal frequency and relatively receives the electric signal with a second frequency.

In one embodiment, the controlling method further includes that when the touch sensitive processing apparatus does not receive the electric signal with the first frequency, it turns to emit the beacon signal with a second beacon signal frequency to the transmitter.

One of the features of the present invention is to provide a controlling method for a touch sensitive processing apparatus. The controlling method includes emitting a beacon signal with a first beacon signal frequency by a touch panel to a transmitter, and receiving an electric signal with a first frequency emitted by the transmitter through the touch panel so as to know a position the transmitter corresponding to the touch panel. Wherein, when the touch sensitive processing apparatus determines the electric signal with the first frequency being interfered, it further emits the beacon signal with a specify beacon signal frequency and relatively receives the electric signal with a second frequency.

In one embodiment, the controlling method further includes that when the touch panel does not receive the electric signal with the first frequency, it turns to emit the beacon signal with a second beacon signal frequency to the transmitter.

Please refer to FIG. 1 and FIG. 34A to FIG. 34D. One of the features of the present invention is to provide a transmitter used to receive a beacon signal from a touch panel and relatively emitting an electric signal to the touch panel such that a touch sensitive processing apparatus connecting to the touch panel know a position the transmitter corresponding to the touch panel. Wherein, the transmitter is further used to actively scan the frequencies of the beacon signal and the electric signal that may be interfered and selects a set of non-interfered frequency of the beacon signal and the electric signal based on an order.

In one embodiment, the transmitter is further used to emit the interfered signal of interfered frequency acquired by actively scanning.

In one embodiment, when the transmitter determines the beacon signal with a first beacon signal frequency being interfered, it becomes to receive the beacon signal with a second beacon signal frequency and relatively emits the electric signal with the first frequency to the touch panel. In another embodiment, when the transmitter determines the beacon signal with the second beacon signal frequency being interfered, it turns to receive the beacon signal with a specify beacon signal frequency and relatively emits the electric signal with a second frequency to the touch panel.

One of the features of the present invention is to provide a controlling method for a transmitter. The controlling method includes receiving a beacon signal from a touch panel, relatively emitting an electric signal with a first frequency to the touch panel such that a touch sensitive processing apparatus connecting to the touch panel knows a position the transmitter corresponding to the touch panel, and actively scanning the frequencies of the beacon signal and the electric signal that may be interfered and selecting a set of non-interfered frequency of the beacon signal and the electric signal based on an order.

In one embodiment, the controlling method further includes emitting the interfered signal of interfered frequency acquired by actively scanning.

In one embodiment, the controlling method further includes that when the transmitter determines the beacon signal with a first beacon signal frequency being interfered, it becomes to receive the beacon signal with a second beacon signal frequency and relatively emits the electric signal with the first frequency to the touch panel. In another embodiment, the controlling method further includes that when the transmitter determines the beacon signal with the second beacon signal frequency being interfered, it turns to receive the beacon signal with a specify beacon signal frequency and relatively emits the electric signal with a second frequency to the touch panel.

One of the features of the present invention is to provide a touch sensitive processing apparatus used to connect to a touch panel to emit a beacon signal to a transmitter and receive an electric signal emitted by the transmitter through the touch panel so as to know a position the transmitter corresponding to the touch panel. Wherein, the touch sensitive processing apparatus is further used to actively scan the frequencies of the beacon signal and the electric signal that may be interfered and select a set of non-interfered frequency of the beacon signal and the electric signal based on an order.

In one embodiment, the touch sensitive processing apparatus is further used to emit the interfered signal of interfered frequency acquired by actively scanning.

In one embodiment, when the touch sensitive processing apparatus determines the electric signal with the first frequency being interfered, it further emits the beacon signal with a specify beacon signal frequency and relatively receives the electric signal with a second frequency. In another embodiment, when the touch sensitive processing apparatus does not receive the electric signal with the first frequency, it turns to emit the beacon signal with a second beacon signal frequency to the transmitter.

One of the features of the present invention is to provide a controlling method for a touch sensitive processing apparatus. The controlling method includes emitting a beacon signal to a transmitter through a touch panel, receiving an electric signal emitted by the transmitter through the touch panel so as to know a position the transmitter corresponding to the touch panel, and actively scanning the frequencies of the beacon signal and the electric signal that may be interfered and selecting a set of non-interfered frequency of the beacon signal and the electric signal based on an order.

In one embodiment, the controlling method further includes emitting the interfered signal of interfered frequency acquired by actively scanning.

In one embodiment, the controlling method further includes that when the touch sensitive processing apparatus determines the electric signal with the first frequency being interfered, it further emits the beacon signal with a specify beacon signal frequency and relatively receives the electric signal with a second frequency. In another embodiment, the controlling method further includes that when the touch sensitive processing apparatus does not receive the electric signal with the first frequency, it turns to emit the beacon signal with a second beacon signal frequency to the transmitter.

One of the features of the present invention is to provide a touch sensitive system including a transmitter, a touch panel, and a touch sensitive processing apparatus connecting to the touch panel. Wherein, the transmitter is used to receive a beacon signal from the touch panel and relatively emit an electric signal with a first frequency to the touch panel such that the touch sensitive processing apparatus knows a position the transmitter corresponding to the touch panel. Wherein, when the transmitter determines the beacon signal with a first beacon signal frequency being interfered, it becomes to receive the beacon signal with a second beacon signal frequency and relatively emits the electric signal with the first frequency to the touch panel.

In one embodiment, when the transmitter determines the beacon signal with the second beacon signal frequency being interfered, it turns to receive the beacon signal with a specify beacon signal frequency and relatively emits the electric signal with a second frequency to the touch panel.

In one embodiment, when the touch sensitive processing apparatus determines the electric signal with the first frequency being interfered, it further emits the beacon signal with a specify beacon signal frequency and relatively receives the electric signal with a second frequency. In another embodiment, when the touch sensitive processing apparatus does not receive the electric signal with the first frequency, it turns to emit the beacon signal with a second beacon signal frequency to the transmitter.

In one embodiment, the touch sensitive processing apparatus is further used to actively scan the frequencies of the beacon signal and the electric signal that may be interfered and select a set of non-interfered frequency of the beacon signal and the electric signal based on an order. In another embodiment, the touch sensitive processing apparatus is further used to emit the interfered signal of interfered frequency acquired by actively scanning.

One of the features of the present invention is to provide a touch sensitive system including a transmitter, a touch panel, and a touch sensitive processing apparatus connecting to the touch panel. The touch sensitive processing apparatus is used to emit a beacon signal with a first beacon signal frequency to the transmitter and through the touch panel to receive an electric signal with a first frequency emitted by the transmitter so as to know a position the transmitter corresponding to the touch panel. Wherein, when the touch sensitive processing apparatus determines the electric signal with a first frequency being interfered, it further emits the beacon signal with a specify beacon signal frequency and relatively receives the electric signal with a second frequency.

In one embodiment, when the touch sensitive processing apparatus does not receive the electric signal with the first frequency, it turns to emit the beacon signal with a second beacon signal frequency to the transmitter.

In one embodiment, when the transmitter determines the beacon signal with a first beacon signal frequency being interfered, it becomes to receive the beacon signal with a second beacon signal frequency and relatively emits the electric signal with the first frequency to the touch panel. In another embodiment, when the transmitter determines the beacon signal with the second beacon signal frequency being interfered, it turns to receive the beacon signal with a specify beacon signal frequency and relatively emits the electric signal with a second frequency to the touch panel.

In one embodiment, the transmitter is further used to actively scan the frequencies of the beacon signal and the electric signal that may be interfered and select a set of non-interfered frequency of the beacon signal and the electric signal based on an order.

One of the features of the present invention is to provide a touch sensitive system including a transmitter, a touch panel, and a touch sensitive processing apparatus connecting to the touch panel. Wherein, the transmitter is used to receive a beacon signal from the touch panel and relatively emit an electric signal with a first frequency to the touch panel such that the touch sensitive processing apparatus knows a position the transmitter corresponding to the touch panel. Wherein, the transmitter is further used to actively scan the frequencies of the beacon signal and the electric signal that may be interfered and select a set of non-interfered frequency of the beacon signal and the electric signal based on an order. Wherein, the touch sensitive processing apparatus is further used to actively scan the frequencies of the beacon signal and the electric signal that may be interfered and select a set of non-interfered frequency of the beacon signal and the electric signal based on the order.

In one embodiment, the touch sensitive processing apparatus is further used to emit the interfered signal of interfered frequency acquired by actively scanning.

In one embodiment, the transmitter is further used to emit the interfered signal of interfered frequency acquired by actively scanning.

One of the features of the present invention is to provide a touch sensitive processing apparatus used to connect multiple first and second electrodes of a touch panel, select the electric signal received by at least one of the multiple first and second electrodes based on the signal strength of the electric signal emitted by a transmitter and received by the multiple first and second electrodes, and calculate a ratio of the electric signal included according to the electric signal received by the at least one electrode.

One of the features of the present invention is to provide a touch sensitive system including a touch panel and a touch sensitive processing apparatus connecting multiple first and second electrodes of the touch panel. The touch sensitive processing apparatus selects the electric signal received by at least one of the multiple first and second electrodes based on the signal strength of the electric signal emitted by a transmitter and received by the multiple first and second electrodes, and calculates a ratio of the electric signal included according to the electric signal received by the at least one electrode.

One of the features of the present invention is to provide a controlling method for a touch sensitive processing apparatus used to connect multiple first and second electrodes of a touch panel. The controlling method including selecting the electric signal received by at least one of the multiple first and second electrodes based on the signal strength of the electric signal emitted by a transmitter and received by the multiple first and second electrodes, and calculating a ratio of the electric signal included according to the electric signal received by the at least one electrode.

In one embodiment, the signal strength of the electric signal received by the at least one electrode is bigger than that of the electric signals received by other electrodes.

In one embodiment, when the touch sensitive processing apparatus selects multiple electrodes of the first and the second electrodes, it is further used to sum up the signal strength of the electric signal of the multiple electrodes and calculate a ratio of the summed electric signal included. In another embodiment, the multiple electrodes include one of the first electrodes and one of the second electrodes.

In one embodiment, the touch sensitive processing apparatus is further used to adjust the receiving value of the at least one electrode, and calculate a ratio of the electric signal included according to the electric signal received by the at least one electrode adjusted the receiving value.

In one embodiment, when the touch sensitive processing apparatus selects multiple electrodes of the first and the second electrodes, it is further used to adjust the receiving value of the multiple electrodes, and calculate a ratio of the electric signal included according to the electric signal received by the multiple electrodes adjusted the receiving value.

In one embodiment, the touch sensitive processing apparatus is further used to calculate a position of the transmitter based on the electric signal received by the multiple first and second electrodes, and select the electric signal received by at least one of the multiple first and second electrodes according to the position.

In one embodiment, the touch sensitive processing apparatus is further used to select the electric signal received by at least one of the multiple first and second electrodes based on the position in three areas. The three areas include a first area that the position is around the intersection of one of the first electrodes and one of the second electrodes, a second area that the position is in the middle of two of the first electrodes and two of the second electrodes, and a third area that the position is not in the first and the second areas. In another embodiment, the position in the third area is on or around one of the first electrode or one of the second electrode. In another embodiment, when the position is in the first area, the touch sensitive processing apparatus is further used to select the one of the first electrodes and/or the one of the second electrodes; when the position is in the first area, the touch sensitive processing apparatus is further used to select the two of the first electrodes and/or the two of the second electrodes; and when the position is in the third area, the touch sensitive processing apparatus is further used to select the one of the first electrodes or the one of the second electrodes where the position is.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A transmitter, comprising:
 a tip section;
 a first sensor; and
 a processing module, electrically coupled to the first sensor and the tip section, configured to transmit a first electric signal during a first time period and to transmit a fourth electric signal during a fourth time period, wherein the first electric signal represents a first digit of a digital sensing value of the first sensor in numeral system based on N, where N is bigger than 2, wherein the fourth electric signal represents a second digit of the digital sensing value of the first sensor in numeral system based on N,
 wherein a transmitting time length of the first electric signal relates to the first digit's value and a unit time length.

2. The transmitter of claim 1, wherein the digital sensing value is a pressure digital value the first sensor senses the tip section of the transmitter being pressed.

3. The transmitter of claim 1, wherein the first electric signal includes at least N−1 state values.

4. The transmitter of claim 1, wherein the first electric signal further includes any or any combination of redundancy code, error correcting code, and check code of the state value thereof.

5. The transmitter of claim 1, wherein the processing module is used to transmit a second electric signal during a second time period, the second electric signal is used to represent a second digit of the digital sensing value in numeral system based on M, where M is bigger than 2.

6. The transmitter of claim 5, wherein M is not equal to N.

7. The transmitter of claim 5, wherein the second electric signal includes at least M−1 state values.

8. The transmitter of claim 5, wherein the second electric signal further includes any or any combination of redundancy code, error correcting code, and check code of the state value thereof.

9. The transmitter of claim 5, wherein a transmitting time length of the second electric signal relates to the second digit's value and a unit time length, the electric signal is not transmitted in an interval between the first time period and the second time period.

10. The transmitter of claim 1, wherein the transmitter further includes a second sensor, the processing module is used to transmit a third electric signal during a third time period, the third electric signal is used to represent a digital sensing value of the second sensor.

11. The transmitter of claim 10, wherein the transmitter further includes a third sensor, and the third electric signal is further to represent a digital sensing value of the third sensor.

12. The transmitter of claim 10, wherein the third time period is after the transmitter receiving a beacon signal, the first time period is after the third time period.

13. The transmitter of claim 10, wherein the transmitter further includes a ring electrode surrounding the tip section, the third electric signal is transmitted by the tip section or the ring electrode or the combination of them.

14. A method for controlling a transmitter including a first sensor and a tip section, the method comprising:
    transmitting a first electric signal through the tip section during a first time period, wherein the first electric signal represents a first digit of a digital sensing value of the first sensor in numeral system based on N, where N is bigger than 2,
    transmitting a fourth electric signal through the tip section during a fourth time period, wherein the fourth electric signal represents a second digit of the digital sensing value of the first sensor in numeral system based on N,
    wherein a transmitting time length of the first electric signal relates to the first digit's value and a unit time length.

15. The method of claim 14, further comprising: using the first sensor to sense a pressure digital value of the tip section of the transmitter being pressed so as to get a digital sensing value of the first sensor.

16. The method of claim 14, wherein the first electric signal includes at least N−1 state values.

17. The method of claim 14, wherein the first electric signal further includes any or any combination of redundancy code, error correcting code, and check code of the state value thereof.

18. The method of claim 14, further comprising: transmitting a second electric signal during a second time period, the second electric signal is used to represent a second digit of the digital sensing value in numeral system based on M, where M is bigger than 2.

19. The method of claim 18, wherein M is not equal to N.

20. The method of claim 18, wherein the second electric signal includes at least M−1 state values.

21. The method of claim 18, wherein the second electric signal further includes any or any combination of redundancy code, error correcting code, and check code of the state value thereof.

22. The method of claim 18, wherein a transmitting time length of the second electric signal relates to the second digit's value and a unit time length, the electric signal is not transmitted in an interval between the first time period and the second time period.

23. The method of claim 14, wherein the transmitter further includes a second sensor, the method further includes transmitting a third electric signal during a third time period, the third electric signal is used to represent a digital sensing value of the second sensor.

24. The method of claim 23, wherein the transmitter further includes a third sensor, and the third electric signal is further to represent a digital sensing value of the third sensor.

25. The method of claim 23, wherein the third time period is after the transmitter receiving a beacon signal, the first time period is after the third time period.

26. The method of claim 23, wherein the transmitter further includes a ring electrode surrounding the tip section, and the third electric signal is transmitted by the tip section or the ring electrode or the combination of them.

* * * * *